US011048344B1

(12) United States Patent
Drezet et al.

(10) Patent No.: US 11,048,344 B1
(45) Date of Patent: Jun. 29, 2021

(54) COMBINING ELECTROPERMANENT MAGNETS AND MAGNETORHEOLOGICAL FLUID TO CONTROL AN OPERATION OF AN INPUT DEVICE

(71) Applicant: Logitech Europe S.A., Lausanne (CH)

(72) Inventors: Cyril Drezet, Lausanne (CH); Jan Stoeckli, Jongny (CH); Nicolas Ramond, Lurgrin (FR)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 17/107,648

(22) Filed: Nov. 30, 2020

(51) Int. Cl.
*G06F 3/0354* (2013.01)
*H01F 7/02* (2006.01)
*G06F 3/02* (2006.01)
*H01F 1/44* (2006.01)
*H01F 7/20* (2006.01)

(52) U.S. Cl.
CPC ........ *G06F 3/03543* (2013.01); *G06F 3/0202* (2013.01); *H01F 1/447* (2013.01); *H01F 7/0205* (2013.01); *H01F 7/20* (2013.01)

(58) Field of Classification Search
CPC .... G06F 3/03543; G06F 3/0202; H01F 1/447; H01F 7/0205; H01F 7/20
USPC ......................................................... 345/163
See application file for complete search history.

(56) References Cited

U.S. PATENT DOCUMENTS

| 10,592,008 | B1 * | 3/2020 | Wang ...................... G06F 3/016 |
| 2010/0321335 | A1 * | 12/2010 | Lim ....................... G06F 3/0447 345/174 |
| 2018/0219553 | A1 * | 8/2018 | Casparian ............. G06F 3/0238 |

* cited by examiner

*Primary Examiner* — Mark Edwards
(74) *Attorney, Agent, or Firm* — Kilpatrick Townsend & Stockton LLP

(57) ABSTRACT

Aspects of the invention include a computer peripheral device comprising an input element that operates based on a performance characteristic, an electropermanent magnet (EPM) assembly including a permanent magnet configured to generate a magnetic field and a magnetizing assembly configured to set an intensity of the magnetic field generated by the permanent magnet, and a magnetorheological (MR) material coupled to the input element. The MR material has a viscosity that changes based on the magnetic field and affects the performance characteristic of the input element.

20 Claims, 30 Drawing Sheets

980
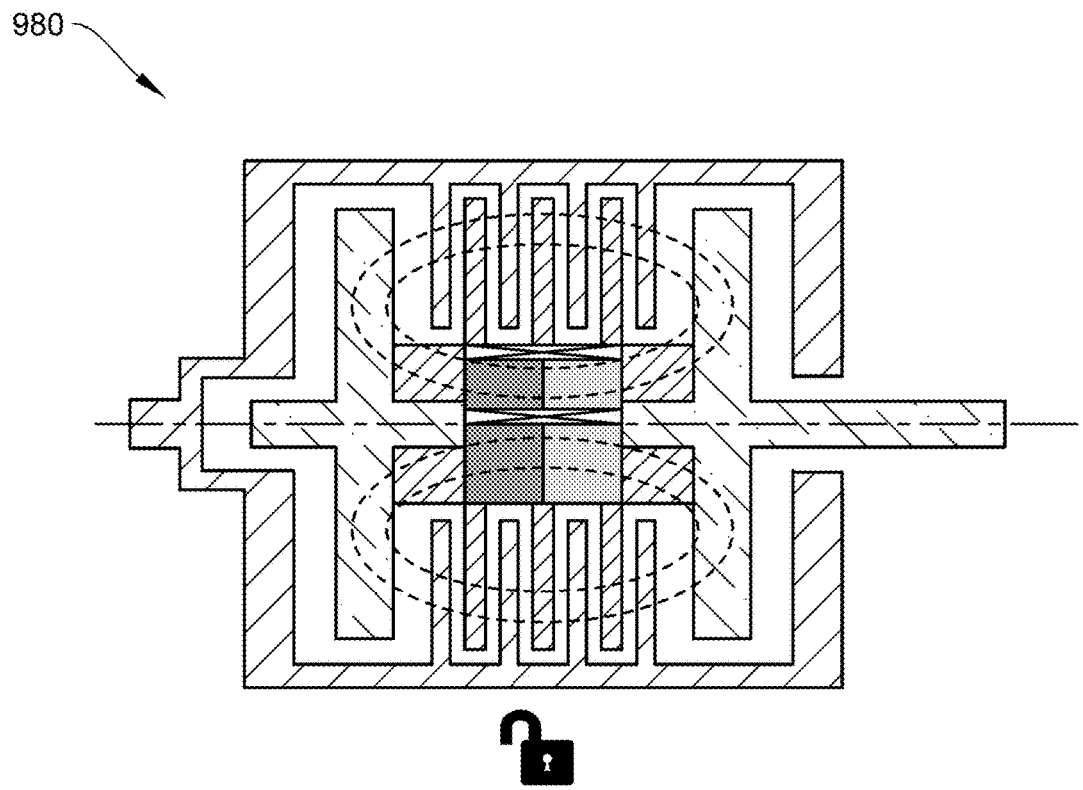
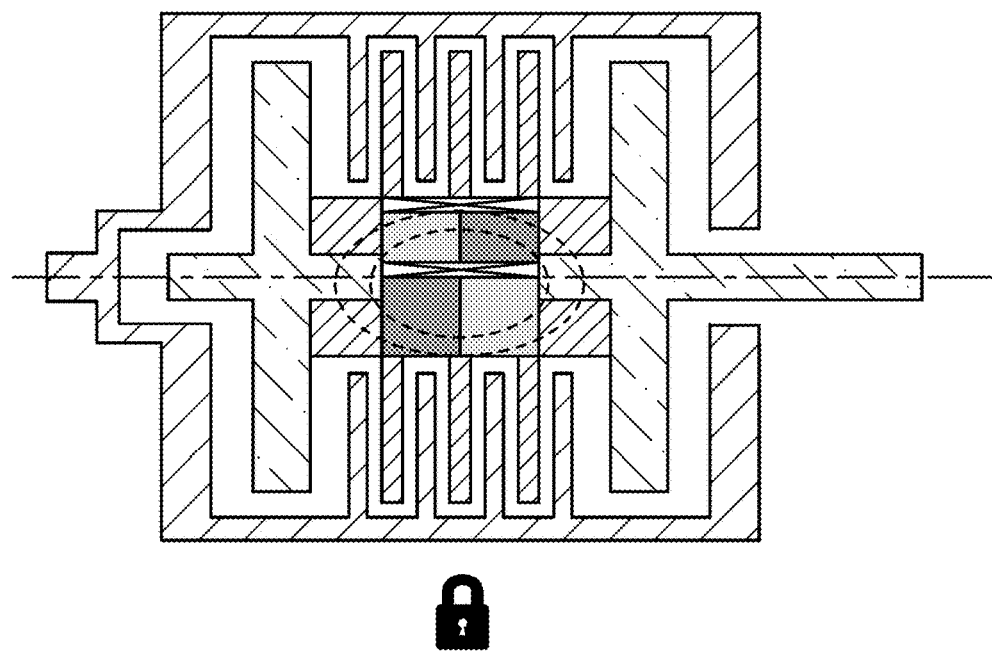
FIG. 9B

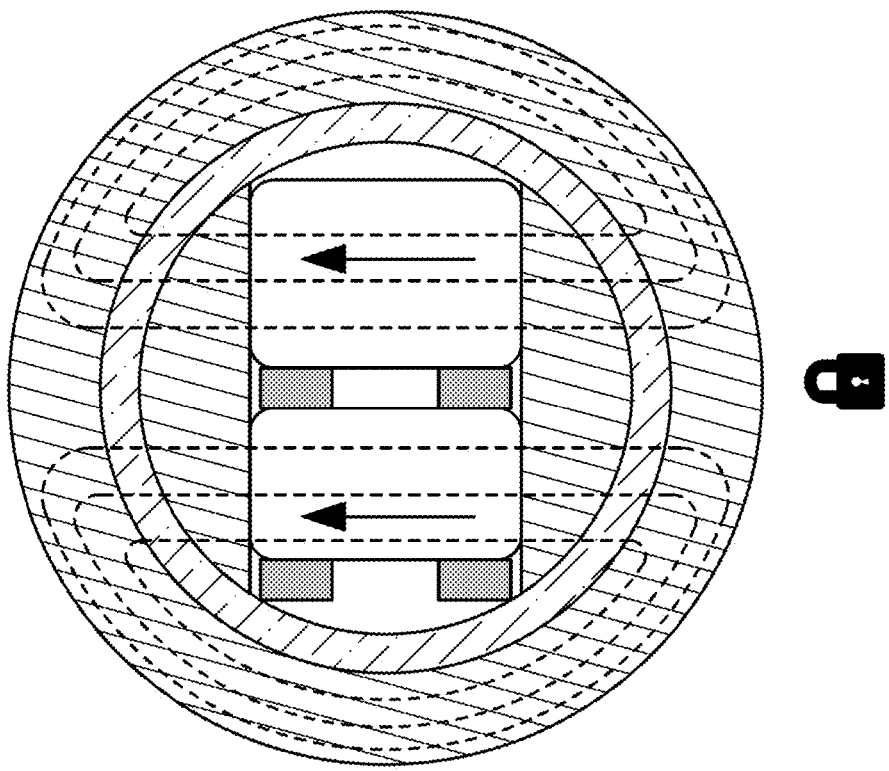
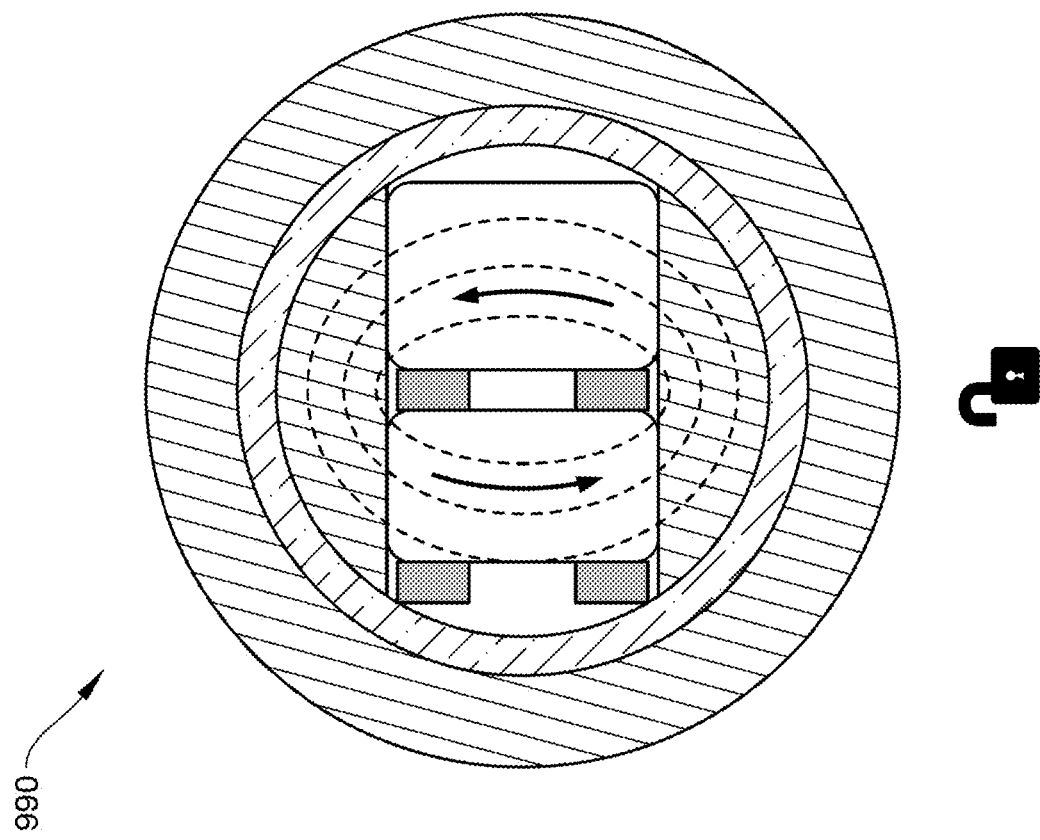
FIG. 9C

Pedal Assembly Combining EPM and MR

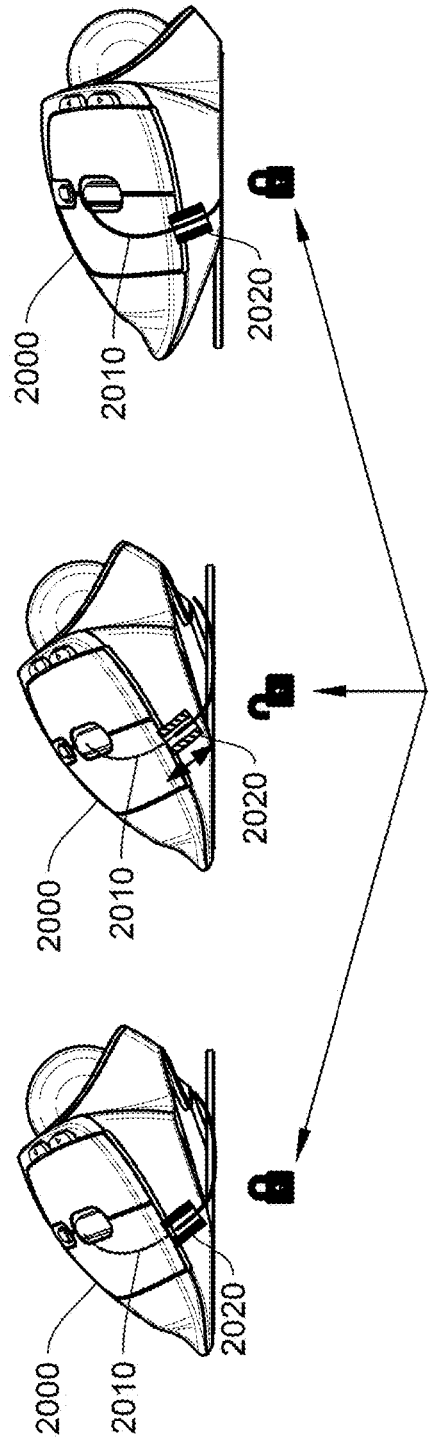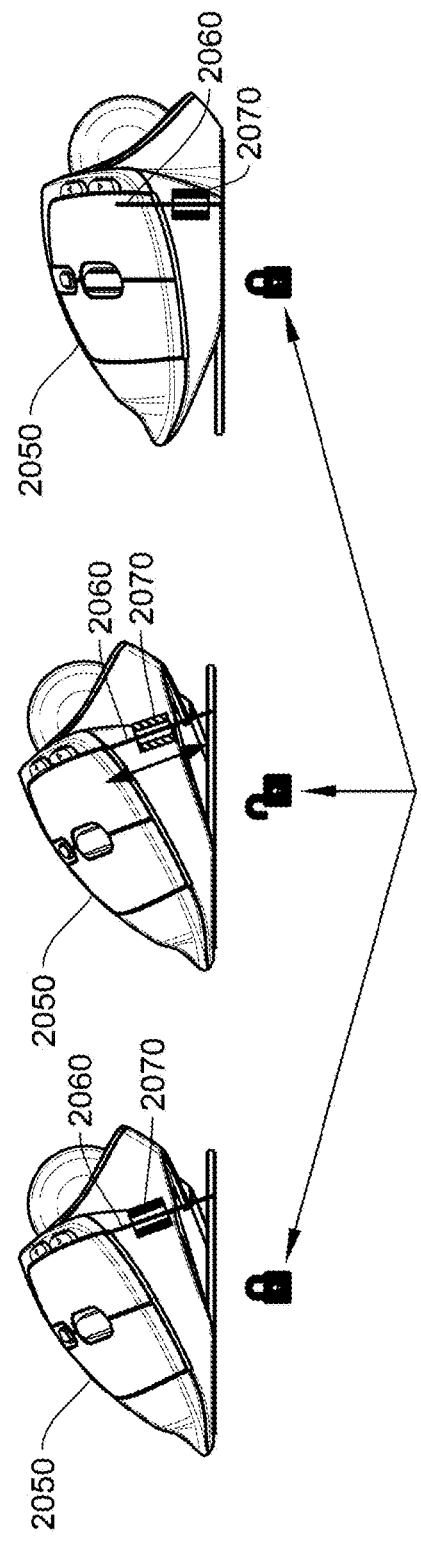

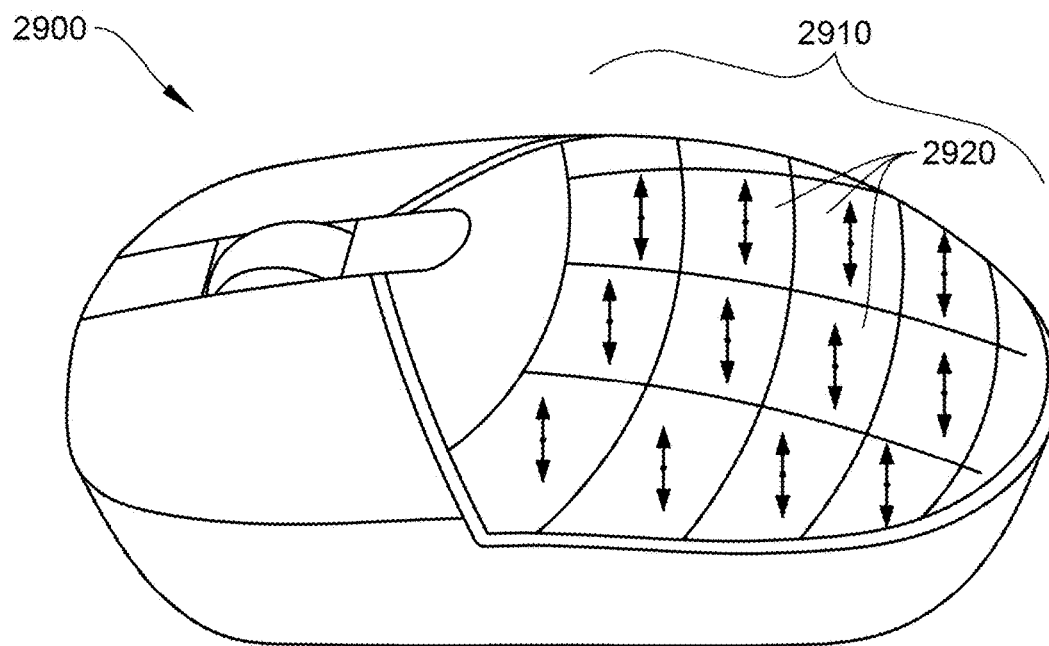
FIG. 29A
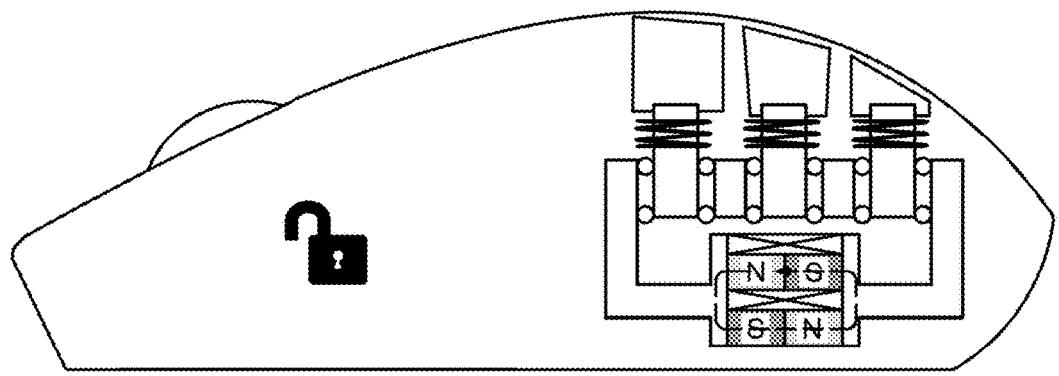
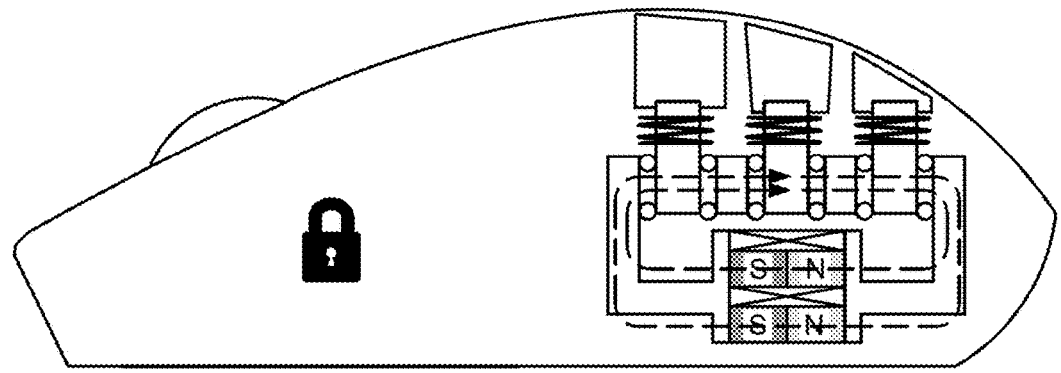
FIG. 29B

COMBINING ELECTROPERMANENT MAGNETS AND MAGNETORHEOLOGICAL FLUID TO CONTROL AN OPERATION OF AN INPUT DEVICE

BACKGROUND

Input devices are commonplace in modern society and are typically used to convert human-induced analog inputs (e.g., touches, clicks, motions, touch gestures, button presses, scroll wheel rotations, etc.) made in conjunction with an input device into digital signals for computer processing. An input device can include any device that can provide data and control signals to a computing system. Some non-limiting examples of input devices include computer mice, keyboards, virtual reality and/or augmented reality controllers, touch pads, remote controls, gaming controllers, joysticks, trackballs, and the like. Some non-limiting examples of computing systems include desktops, laptops, gaming consoles, tablets and "phablet" computers, smart phones, personal digital assistants, wearable devices (e.g., smart watches, glasses), virtual reality (VR) and/or augmented reality (AR) headsets and systems, and the like.

Input devices have undergone significant improvements in quality, functionality, accuracy, ergonomics, and versatility. Earlier designs of computer mice, for example, include various mechanically-based input elements such as scroll wheels, buttons, and the like, that added functionality using various spring types to provide restoring forces for buttons or magnets to create rotational resistance profiles, but these designs had limited applications, reliability issues, and performance was often materially affected by manufacturing tolerances. More contemporary designs incorporated electromagnets to implement certain functionality, but were not widely adopted due to manufacturing costs and very high power requirements, which particularly affected wireless input devices. Despite these developments and advantages, more improvements are needed for better performance and greater control of input devices.

Unless otherwise indicated herein, the materials described in this section are not prior art to the claims in this application and are not admitted to be prior art by inclusion in this section.

BRIEF SUMMARY

In some embodiments, a computer peripheral device comprises one or more processors, an input element that operates based on a performance characteristic, an electropermanent magnet (EPM) assembly including a permanent magnet configured to generate a magnetic field and a magnetizing assembly controlled by the one or more processors and configured to control the magnetic field generated by the permanent magnet, and a magnetorheological (MR) material coupled to the input element, the MR material having a viscosity, where the viscosity of the MR material changes based on the magnetic field the MR material affects the performance characteristic of the input element based on the viscosity of MR material. In some aspects, the magnetizing assembly is configured to set an intensity of the magnetic field of the permanent magnet, and the viscosity of the MR material is further based on the intensity of the magnetic field. In some embodiments, the magnetizing assembly further includes a coil and an electric circuit coupled to the coil, where the magnetizing assembly changes the intensity of the magnetic field of the permanent magnet by changing at least one of an amplitude or duration of a current pulse through the coil and the electric circuit, and the coil is configured to generate a magnetic field and magnetize the permanent magnet.

In some embodiments, once the current pulse through the coil sets the intensity of the magnetic field of the permanent magnet, the magnetic field of the permanent magnet permanently remains at the set intensity after the current through the coil is turned off until the magnetizing assembly reenergizes the coil and sets the intensity of the magnetic field of the permanent magnet to a new intensity. In further embodiments, the one or more processors may be configured to cause the input element to operate according to at least two modes of operation including a first mode of operation wherein the magnetic field of the permanent magnet is set to cause the viscosity of the MR material to change to a first viscosity that provides a first resistance to the operation of the input element, and a second mode of operation wherein the magnetic field of the permanent magnet is set to cause the viscosity of the MR material to change to a second viscosity that provides a second resistance to the operation of the input element, the second resistance being greater than the first resistance. The input element can further operate according to a third mode of operation wherein the magnetic field of the permanent magnet is set to cause the viscosity of the MR material to change to a third viscosity that provides a third resistance to the operation of the input element, the third resistance preventing the input element from being operated, the third resistance being greater than the second resistance and first resistance. In some cases, the performance characteristic of the input element is a translational motion of the input element along a range of motion, and wherein the one or more processors cause the magnetizing assembly to change the magnetic field of the permanent magnet such that the viscosity of the MR material causes the input element to operate according to a first mode of operation where the viscosity of the MR material is set by the magnetic field to provide a minimum resistance to translational motion of the input element along the range of motion and a second mode of operation where the viscosity of the MR material is set by the magnetic field to provide a maximum resistance to translational motion of the input element along the range of motion. In some cases, the one or more processors further cause the magnetizing assembly to change the magnetic field of the permanent magnet such that the viscosity of the MR material causes the input element to operate according to a third mode of operation where the viscosity of the MR material is set by the magnetic field to provide a resistance to translational motion of the input element along the range of motion that is between the minimum and maximum resistance.

In some embodiments, the performance characteristic of the input element is a linear translation of the input element along a linear range of motion. In such cases, the input element can be one of: a button that is depressible along the linear range of motion, a key that is depressible along the linear range of motion, a trigger that is depressible along the linear range of motion, or a support structure configured to support the computer peripheral device on an underlying surface, the support structure configured to be raised and lowered along the linear range of motion. In some aspects, the performance characteristic of the input element is a rotational translation along a circular range of motion, and the input element can be one of: a scroll wheel rotatable along the circular range of motion, a trackball rotatable along the circular range of motion, a knob rotatable along the circular range of motion, a hinge rotatable along the circular range of motion, a shifter and gimbal along the circular range of motion, a steering wheel rotatable along the circular range of motion, or a pedal depressible along the circular range of motion.

In some embodiments, a computer-implemented method can include: receiving, by one or more processors, input data indicating a selection of one of a plurality of modes of operation of an input device. In some cases, the input device includes an input element, an EPM assembly comprising a permanent magnet, a magnetizing assembly configured to set a magnetic field generated by the permanent magnet, and a MR material coupled to the input element, the MR material having a viscosity that changes based on the magnetic field and affects a performance characteristic of the input element. In response to the received input data corresponding to the selection of a first mode of operation of the plurality of modes of operation, the method may further include setting, by the magnetizing assembly, the magnetic field generated by the permanent magnet to a first intensity that causes the MR material to have a first viscosity that affects the performance characteristic of the input device. In response to the received input data corresponding to the selection of a second mode of operation of the plurality of modes of operation, the method may include setting, by the magnetizing assembly, the magnetic field generated by the permanent magnet to a second intensity that causes the MR material to have a second viscosity that affects the performance characteristic of the input device.

In certain embodiments, setting a magnetic field generated by the permanent magnet includes changing at least one of an amplitude or duration of a current pulse through a coil, which generates a corresponding magnetizing field that magnetizes the permanent magnet. The performance characteristic of the input element can be a translational motion of the input element along a range of motion, where in the first mode of operation the first viscosity of the MR material is set by the magnetic field to provide a minimum resistance to translational motion of the input element along the range of motion and wherein in the second mode of operation the second viscosity of the MR material is set by the magnetic field to provide a maximum resistance to translational motion of the input element along the range of motion. In response to the received input data corresponding to the selection of a third mode of operation of the plurality of modes of operation, the method may further include setting, by the magnetizing assembly, the magnetic field generated by the permanent magnet to a third intensity that causes the MR material to have a third viscosity that affects the performance characteristic of the input device, where in the third mode of operation the third viscosity of the MR material is set by the magnetic field to provide a resistance to translational motion of the input element along the range of motion that is between the minimum and maximum resistance. In some cases, the performance characteristic of the input element is a linear translation of the input element along a linear range of motion, where the input element can be one of a button that is depressible along the linear range of motion, a key that is depressible along the linear range of motion, a trigger that is depressible along the linear range of motion, or a support structure configured to support the computer peripheral device on an underlying surface, the support structure configured to be raised and lowered along the linear range of motion. In some cases, the performance characteristic of the input element is a rotational translation along a circular range of motion, where the input element may be one of a scroll wheel rotatable along the circular range of motion, a trackball rotatable along the circular range of motion, a knob rotatable along the circular range of motion, a hinge rotatable along the circular range of motion, a shifter and gimbal along the circular range of motion, a steering wheel rotatable along the circular range of motion, a pedal depressible along the circular range of motion, or the like.

In certain embodiments, a key for an input device can include a key frame, a key plunger configured to linearly traverse along a travel path within the key frame with one degree-of-freedom of movement, an electropermanent magnet (EPM) assembly coupled to the key frame and including a permanent magnet configured to generate a magnetic field and a magnetizing assembly configured to set the magnetic field generated by the permanent magnet, and a magnetorheological (MR) material disposed within the key frame and coupled to the key plunger, the MR material having a viscosity that changes based on the magnetic field, where the MR material is configured to provide a resistance to the linear traversal of the key plunger along the travel path within the key frame, the resistance based on the viscosity of the MR material. In some cases, the key frame may be comprised of ferrite and is configured to conduct and couple the magnetic field generated by the permanent magnet to the MR material. The key plunger may comprised of ferrite and can be configured to conduct and couple the magnetic field generated by the permanent magnet to the MR material. In some cases, the ferrite key frame and/or key plunger can be contoured such that as the key is pressed, the conduction of the magnetic field through the MR material may change, which can generate a dynamic resistance profile that changes as the key moves relative to the key frame.

In some embodiments, the key can further include a biasing mechanism, where the travel path of the key plunger includes a first position corresponding to the key plunger being in an undepressed state and a second position corresponding to the key plunger being in a fully depressed state, and where the biasing mechanism provides a restoring force to the key plunger that causes the key plunger to return to the second position. The key may include a plurality of o-rings configured to form a sealed reservoir cavity between the key frame and the key plunger, wherein the MR material is a fluid that is contained within the sealed reservoir cavity. The key can be configured to operate in a plurality of modes of operation including a first mode of operation where the magnetizing assembly sets the magnetic field of the permanent magnet such that the MR material has a first viscosity that provides a first resistance to the linear traversal of the key plunger along the travel path, and a second mode of operation where the magnetizing assembly sets the magnetic field of the permanent magnet such that the MR material has a second viscosity that provides a second resistance to the linear traversal of the key plunger along the travel path, where the second resistance is greater than the first resistance. In some cases, the key can further include a second permanent magnet configured to generate a second magnetic field, where in the first mode of operation, the permanent magnet and the second permanent magnet are magnetized such that a path of magnetic conduction of their corresponding magnetic fields is contained by the permanent magnet and second permanent magnet and does not pass through the MR material, and where in the second mode of operation, the permanent magnet and the second permanent magnet are magnetized such that the path of magnetic conduction of their corresponding magnetic fields pass through the MR material.

In some aspects, the key can further comprise one or more processors and a sensor configured to detect a position of the key plunger along the travel path within the key frame, the sensor controlled by the one or more processors, where the one or more processors are configured to cause the magnetizing assembly to dynamically set the magnetic field generated by the permanent magnet to cause the viscosity of the MR material to change according to a resistance profile based on the position of the key plunger along the travel path. The key may further include a switch configured to generate input data indicative of a key press event when the key plunger is depressed beyond a threshold position along the travel path. The input device can be a keyboard or other suitable input device, and the key can be one of a plurality of keys on the keyboard.

In some embodiments, a pedal assembly includes a base platform. a pedal arm rotatably coupled to the base platform at a first location such that the pedal arm moves relative to the base platform along an axis of rotation, a piston assembly that couples the pedal arm to the base platform at a second location and includes a piston housing, a piston configured to linearly traverse along a longitudinal path within the piston housing as the pedal arm rotates along the axis of rotation, an EPM assembly, a permanent magnet configured to generate a magnetic field, a magnetizing assembly configured to set the magnetic field generated by the permanent magnet, and an MR material having a viscosity, the MR material contained within the piston assembly and configured such that the piston travels through the MR material as it linearly traverses along the longitudinal path within the piston housing, where the MR material is configured to provide a resistance to the linear traversal of the piston along the longitudinal path based on the viscosity of the MR material. In some aspects, the pedal assembly can further include a plurality of o-rings configured to form a sealed reservoir cavity between the piston housing and the piston, wherein the MR material is a fluid that is contained within the sealed reservoir cavity. The pedal assembly can be configured to operate a plurality of modes of operation including a first mode of operation where the magnetizing assembly sets the magnetic field of the permanent magnet such that the MR material has a first viscosity that provides a first resistance to the linear traversal of the piston along the longitudinal path and a second mode of operation where the magnetizing assembly sets the magnetic field of the permanent magnet such that the MR material has a second viscosity that provides a second resistance to the linear traversal of the piston along the longitudinal path, where the second resistance is greater than the first resistance. The pedal assembly can include a second permanent magnet configured to generate a second magnetic field, where in the first mode of operation, the permanent magnet and the second permanent magnet are magnetized such that a path of magnetic conduction of their corresponding magnetic fields do not pass through the MR material, and in the second mode of operation, the permanent magnet and the second permanent magnet are magnetized such that the path of magnetic conduction of their corresponding magnetic fields pass through the MR material. The pedal assembly can include one or more processors, a sensor configured to detect a position of the piston with respect to the piston housing, the sensor controlled by the one or more processors, where the one or more processors are configured to cause the magnetizing assembly to dynamically set the magnetic field generated by the permanent magnet to cause the viscosity of the MR material to change according to a resistance profile based on the position of the key plunger along the travel path.

In some embodiments, a method of operating an input device includes receiving input data corresponding to a mode of operation of the input device, the mode of operation corresponding to a control of a movement of a moveable element of the input device along one degree-of-freedom; determining a selection of the mode of operation based on the input data; in response to the input data corresponding to a first mode of operation: causing a magnetizing assembly to set a first magnetic field intensity of a permanent magnet that controls a viscosity of MR material coupled to the moveable element, the MR material under the first magnetic field intensity providing a first resistance to the movement of the moveable element along the one degree-of-freedom; and in response to the input data corresponding to a second mode of operation: causing a magnetizing assembly to set a second magnetic field intensity of the permanent magnet, the MR material under the second magnetic field intensity providing a second resistance to the movement of the moveable element along the one degree-of-freedom, wherein the second magnetic field intensity is higher than the first magnetic field intensity. In some aspects, in the first mode of operation the MR material has a minimum viscosity, and wherein in the second mode of operation the MR material has a maximum viscosity. The method can further include: in response to the input data corresponding to a third mode of operation: causing a magnetizing assembly to set a third magnetic field intensity of the permanent magnet, the MR material under the third magnetic field intensity providing a third resistance to the movement of the moveable element along the one degree-of-freedom, wherein the third magnetic field intensity is higher than the first magnetic field intensity and less than the second magnetic field intensity. In some aspects, the one degree-of-freedom corresponds to a linear movement of the moveable element, and wherein the moveable element is one of: a button depressible along the linear one degree-of-freedom; a key depressible along the linear one degree-of-freedom; a trigger actuable depressible along the linear one degree-of-freedom; or a support structure configured to support the input device in a plurality of configurations, the support structure extendable and retractable along the linear one degree-of-freedom. In some embodiments, the one degree-of-freedom corresponds to a rotational movement of the moveable element, and wherein the moveable element is one of: a scroll wheel rotatable along the rotational one degree-of-freedom; a trackball rotatable along the rotational one degree-of-freedom; a knob rotatable along the rotational one degree-of-freedom; a hinge rotatable along the rotational one degree-of-freedom; a steering wheel rotatable along the rotational one degree-of-freedom; or a pedal depressible along the rotational one degree-of-freedom.

In certain embodiments, a computer mouse comprises: a housing; a depressible element, a first side of the depressible element configured to be depressed by a user; an actuator coupled to a second side of the depressible element that opposes the first side, the actuator configured to linearly traverse along a travel path within the housing with one degree-of-freedom of movement when the depressible element is depressed by the user; a collapsible membrane that provides a first resistance to the actuator from linearly traversing along the travel path within the housing, the collapsible membrane configured to collapse and provide a haptic feedback in response to receiving a threshold force from the actuator, the collapsible membrane being comprised of a ferrous material and having a hollow portion; an electropermanent magnet (EPM) assembly coupled to the housing, the EPM assembly including: a permanent magnet configured to generate a magnetic field; and a magnetizing assembly configured to set the magnetic field generated by the permanent magnet; and a magnetorheological (MR) material disposed within the hollow portion of the collapsible membrane, wherein the housing includes a ferrite portion that creates a magnetic field conduction path that conducts the magnetic field from a first pole of the permanent magnet through the collapsible membrane and to a second pole of the permanent magnet, and wherein the MR material is configured to cause the collapsible membrane to provide an additional resistance to the linear traversal of the actuator along the travel path within the housing, the additional resistance based on the magnetic field passing through the MR material in the hollow portion of the collapsible membrane that affects a viscosity of the MR material. In some aspects, the magnetizing assembly is configured to set an intensity of the magnetic field of the permanent magnet, and the viscosity of the MR material is further based on (affected by) the intensity of the magnetic field.

The computer mouse can include one or more processors configured to cause the depressible element to operate according to at least two modes of operation including: a first mode of operation wherein the magnetic field of the permanent magnet is set to cause the viscosity of the MR material within the hollow portion of the collapsible membrane to change to a first viscosity that provides a first additional resistance to the linear traversal of the actuator along the travel path within the housing; and a second mode of operation wherein the magnetic field of the permanent magnet is set to cause the viscosity of the MR material within the hollow portion of the collapsible membrane to change to a second viscosity that provides a second additional resistance to the linear traversal of the actuator along the travel path within the housing, the second additional resistance being greater than the first additional resistance. The computer mouse can further include a switch coupled to the one or more processors, the switch being configured to generate a control signal in response to being activated, wherein the switch is activated when the collapsible membrane collapses. In some implementations, the depressible element may be a left or right mouse button on the computer mouse.

In some embodiments, an input device comprises: a housing; a palm region coupled to the housing, the palm region configured to receive a user's palm when the input device is operated by the user, the palm region formed, in part, by a plurality of submodules, wherein each submodule includes: a frame; a plunger configured to traverse along a travel path within the frame; an electropermanent magnet (EPM) assembly coupled to the frame, the EPM assembly including: a permanent magnet configured to generate a magnetic field; and a magnetizing assembly configured to set the magnetic field generated by the permanent magnet; and a magnetorheological (MR) material disposed within the frame and coupled to the plunger, the MR material having a viscosity that changes based on the magnetic field. The MR material can be configured to provide a resistance to the traversal of the plunger along the travel path within the frame, the resistance based on the viscosity of the MR material. In some embodiments, the input device includes one or more processors configured to cause each of the submodules to operate according to at least two modes of operation including: a first mode of operation wherein the magnetic field of the permanent magnet is set to cause the viscosity of the MR material to change to a first viscosity that provides a first resistance to the traversal of the plunger along the travel path within the frame; and a second mode of operation wherein the magnetic field of the permanent magnet is set to cause the viscosity of the MR material to change to a second viscosity that provides a second resistance to the traversal of the plunger along the travel path within the housing. The first resistance can allow each of the submodules to traverse along the travel path in response to receiving an applied force along the travel path, and the second resistance can prevent each of the submodules from traversing along the travel path in response to receiving the applied force, the second resistance being higher than the first resistance.

In further embodiments, when each of the submodules are operating in the first mode of operation, the magnetic field generated by the permanent magnet does not pass through the MR material, and when each of the submodules are operating in the second mode of operation, the magnetic field generated by the permanent magnet passes through the MR material. In some embodiments, the input device only consumes power by the EPM assembly when switching between the at least two modes of operation. In some implementations, the input device further includes a cover plate coupled to the palm region, wherein the cover plate covers the palm region or a portion thereof, wherein a first side of the cover plate forms a user-accessible surface of the palm region, and wherein a second side of the cover plate opposite of the first side is coupled to and supported by a top surface of each of the submodules. In some embodiments, when each of the submodules are operating in the first mode of operation the cover plate is adjustable in at least two degrees-of-freedom, and when each of the submodules are operating in the second mode of operation the cover plate is not adjustable. In some cases, the EPM assembly is a single EPM assembly that is common to each of the plurality of submodules. Alternatively, each submodule or a portion thereof may have its own EPM assembly. The palm region may have a surface contour, and each submodule can include a top portion that forms a part of the surface contour of the palm region.

In certain embodiments, a method of operating an input device comprises: receiving input data corresponding to a mode of operation of the input device, the mode of operation corresponding to a control of a surface contour of a palm region of the input device, the palm region formed, in part, by a plurality of submodules, wherein each submodule has a moveable element that is configured to traverse along a linear travel path within the frame; determining a selection of the mode of operation based on the input data; in response to the input data corresponding to a first mode of operation: causing a magnetizing assembly to set a first magnetic field intensity of a permanent magnet that controls a viscosity of MR material coupled to the moveable element, the MR material under the first magnetic field intensity providing a first resistance to a movement of the moveable element along the linear travel path; and in response to the input data corresponding to a second mode of operation: causing the magnetizing assembly to set a second magnetic field intensity of the permanent magnet, the MR material under the second magnetic field intensity providing a second resistance to the movement of the moveable element along the linear travel path, wherein the second magnetic field intensity is higher than the first magnetic field intensity. In some cases, in the first mode of operation the MR material has a minimum viscosity, and in the second mode of operation the MR material has a maximum viscosity. The first resistance may allow each of the submodules to traverse along the travel path in response to receiving an applied force along the linear travel path, and the second resistance may prevent each of the submodules from traversing along the linear travel path in response to receiving the applied force, the second resistance being higher than the first resistance.

In some aspects, the input device includes a cover plate coupled to the palm region, wherein the cover plate covers the palm region, where a first side of the cover plate forms a user-accessible surface of the palm region, and where a second side of the cover plate opposite of the first side is coupled to and supported by a top surface of each of the submodules. In some cases, when each of the submodules are operating in the first mode of operation the cover plate is adjustable in at least two degrees-of-freedom, and when each of the submodules are operating in the second mode of operation the cover plate is not adjustable. The palm region can have a surface contour, and each submodule (or subset of the plurality of submodules) can include a top portion that forms a part of the surface contour of the palm region. The magnetizing assembly can be a single magnetizing assembly that is common to each of the plurality of submodules, or each submodule or a portion of the plurality of submodules may have their own magnetizing assembly.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which:

FIG. 9B shows a second magnetorheological-based clutch system 980 with an electropermanent magnet assembly configured to apply a magnet field to MR material to control clutch engagement, according to certain embodiments;

FIG. 9C shows a third magnetorheological-based clutch system 990 with an electropermanent magnet assembly configured to apply a magnet field to MR material to control clutch engagement, according to certain embodiments;

FIG. 20A shows a computer mouse configured to be tilted on an underlying platform, according to certain embodiments;

FIG. 20B shows a computer mouse configured to be tilted on an underlying platform, according to certain embodiments;

FIG. 29A shows a computer mouse with an adjustable palm rest, according to certain embodiments;

FIG. 29B shows a simplified cross-sectional view of a computer mouse with a plurality of EPM/MR controlled submodules, according to certain embodiments;

Throughout the drawings, it should be noted that like reference numbers are typically used to depict the same or similar elements, features, and structures.

DETAILED DESCRIPTION

Figure 1:
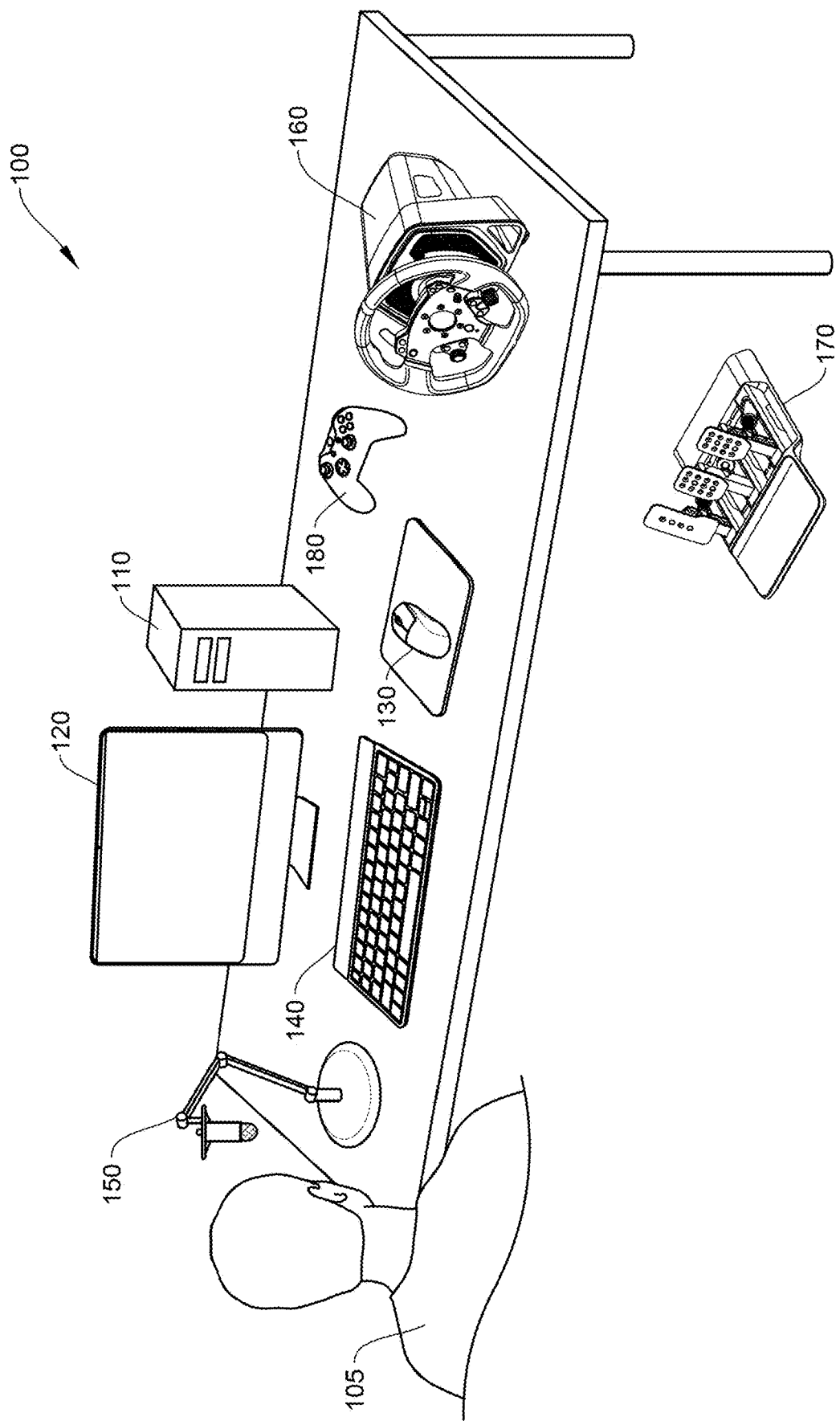
FIG. 1 shows an example of a computer system 100 that can include any of a variety of host computing devices and computer peripheral devices, including peripheral devices (e.g., a computer mouse, keyboard, etc.) that can be configured to perform aspects of the various inventive concepts described herein.

Aspects of the present disclosure relate generally to electronic devices, and more particularly to computer peripheral devices that utilize electropermanent magnets and magnetorheological fluid to control characteristics of certain features (e.g., input elements) on the computer peripheral device, according to certain embodiments.

In the following description, various examples of devices utilizing both EPM and MR technologies are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high level summary is intended to provide a basic understanding of some of the novel innovations depicted in the figures and presented in the corresponding descriptions provided below. Aspects of the invention relate to various improved computer peripheral devices and electronic devices more generally (also referred to as input devices) that incorporate aspects of electropermanent magnet (EPM) systems and magnetorheological (MR) materials to control a performance characteristic (e.g., translational movement) of one or more elements (e.g., input elements such as button, keys, scroll wheels, etc.) on the computer peripheral device.

In early computer peripheral devices, various mechanical springs and magnets were used to provide a restoration force on a button, or set a friction profile on a scroll wheel, for example. However, many of these designs had limited control (e.g., binary settings) and application, and in some cases were subject to challenging manufacturing tolerances as well as wear-and-tear issues. Subsequent designs incorporated electromagnets to provide more control over the magnet fields that were configured to control one or more input elements, however due to their relatively high cost and demanding power requirements, such designs were not practicable in battery powered wireless input devices. In some cases, deformable MR materials were used on input device surfaces, for instance, for a malleable and customizable housings. MR materials typically have a viscosity that can change when the MR material is subjected to a magnetic field. The various embodiments described herein incorporate both EPM systems with MR materials, which have many applications and require very little power to implement. For instance, once the EPM system momentarily drives a coil with an electric pulse, a corresponding magnet is magnetized with a magnetic field of a particular intensity (e.g., based on the amplitude and duration of the pulse) and remains magnetized when the electric pulse is removed. While some power is needed to change the magnetic field and/or the intensity of the magnetic field, no power is needed to maintain it, making it an overall power efficient solution. The magnetic field can be set to any suitable value, which can change the viscosity of the MR material accordingly (e.g., from highly pliable to very stiff) for a number of useful applications.

For example, in some application an input element may be depressible or moveable along a linear range of motion (e.g., linear translational movement). The MR material may be used in conjunction with the input element to control how easily the input element may be linearly moved. For instance, the input element may be easily depressible when the MR is exposed to a first intensity of a magnetic field, and very difficult to depress when the magnetic field is removed. Some examples of input elements that may have a linear translational movement include buttons (e.g., of a computer mouse), a key (e.g., keyboard key), a trigger (e.g., a trigger for a controller of a gaming console), a support structure (e.g., a leg/foot configured to support a keyboard, speaker, lamp, etc.), or other device, and some are described below with respect to FIGS. 10-12, 15-20B, and 25A-26B.

In further examples, an input element may be rotatable (rotational translation) or moveable along a circular range of motion (e.g., circular translational movement). The MR material may be used in conjunction with the input element to control how easily the input element may be rotated. For instance, the input element may be easily rotatable when the MR is exposed to a first intensity of a magnetic field, and very difficult to rotate when the magnetic field is removed. Some examples of input elements that may have a rotational movement include a scroll wheel, a gaming wheel, a gaming pedal, a hinge, or the like, and some embodiments of these input elements are described below at least with respect to FIGS. 21-24. In some aspects, the contours of an input device can be conformable and customizable using aspects of EPM and MR, as further described below at least with respect to FIGS. 29A-32. Any type of structure (e.g., moveable, manipulable, etc.) can be used in conduction with EPM and MR in the manner described herein and in ways not necessarily expressly described, but still within the purview of the spirit of the present disclosure, as would be appreciated by one of ordinary skill in the art with the benefit of this disclosure.

It is to be understood that this high level summary is presented to provide the reader with a baseline understanding of some of the novel aspects of the present disclosure and a roadmap to the details that follow. This high level summary in no way limits the scope of the various embodiments described throughout the detailed description and each of the figures referenced above are further described below in greater detail and in their proper scope.

FIG. 1 shows an example of a computer system 100 that can include any of a variety of host computing devices and computer peripheral devices, including peripheral devices (e.g., a computer mouse, keyboard, etc.) that can be configured to perform aspects of the various inventive concepts described herein. Computer system 100 shows a user 105 operating a host computing device (shown as a desktop computer) 110 and a number of computer peripheral devices communicatively coupled to and integrated with the host computing device, including a display device 120, a computer mouse 130, a keyboard 140, a microphone 150, a gaming wheel 160, a gaming pedal system 170, a gaming console controller 180, and may include any other suitable input device. Each computer peripheral device 120-180 can be communicatively coupled to host computing device 110.

Although the host computing device is shown as a desktop computer, other types of host computing devices can be used including gaming systems, laptop computers, set top boxes, entertainment systems, tablet or "phablet" computers, stand-alone head mounted displays ("HMD"), or any other suitable host computing device (e.g., smart phone, smart wearable, or the like). In some cases, multiple host computing devices may be used and one or more of the computer peripheral devices may be communicatively coupled to one or both of the host computing devices (e.g., a computer mouse may be coupled to multiple host computing devices). A host computing device may also be referred to herein as a "host computer," "host device," "computing device," "computer," or the like, and may include a machine readable medium (not shown) configured to store computer code, such as driver software, firmware, and the like, where the computer code may be executable by one or more processors of the host computing device(s) to control aspects of the host computing device, for instance via the one or more computer peripheral devices.

A typical computer peripheral device can include any suitable input device, output device or input/output device including those shown (e.g., a computer mouse) and not shown (e.g., remote control, wearables (e.g., gloves, watch, head mounted display), AR/VR controller, a CAD controller, joystick, simulation shifter, stylus device, or other suitable device) that can be used, for example, to convert analog inputs into digital signals for computer processing. By way of example, a computer peripheral device (e.g., computer mouse 130) can be configured to provide control signals for movement tracking (e.g., x-y movement on a planar surface, three-dimensional "in-air" movements, etc.), touch and/or gesture detection, lift detection, orientation detection (e.g., in 3 degrees-of-freedom (DOF) system, 6 DOF systems, etc.), power management capabilities, input detection (e.g., buttons, scroll wheels, etc.), output functions (e.g., LED control, haptic feedback, etc.), or any of myriad other features that can be provided by a computer peripheral device, as would be appreciated by one of ordinary skill in the art. Computer mouse 130, for instance, can include a housing and input buttons with a rotary control ("scroll wheel") configured there between. The buttons and/or the scroll wheel mechanism can include an EPM actuator and MR materials for changing a friction profile associated with the pressing of the buttons or the rotation of the scroll wheel, as further described in certain embodiments that follow.

A computer peripheral device may be referred to as an "input device," "peripheral input device," "peripheral," or the like. The majority of the embodiments described herein generally refer to computer peripheral devices 130-180, however it should be understood that a computer peripheral device can be any suitable input/output (I/O) device (e.g., user interface device, control device, input unit, or the like) that may be adapted to utilize the novel embodiments described and contemplated herein.

A System for Operating a Computer Peripheral Device

Figure 2:
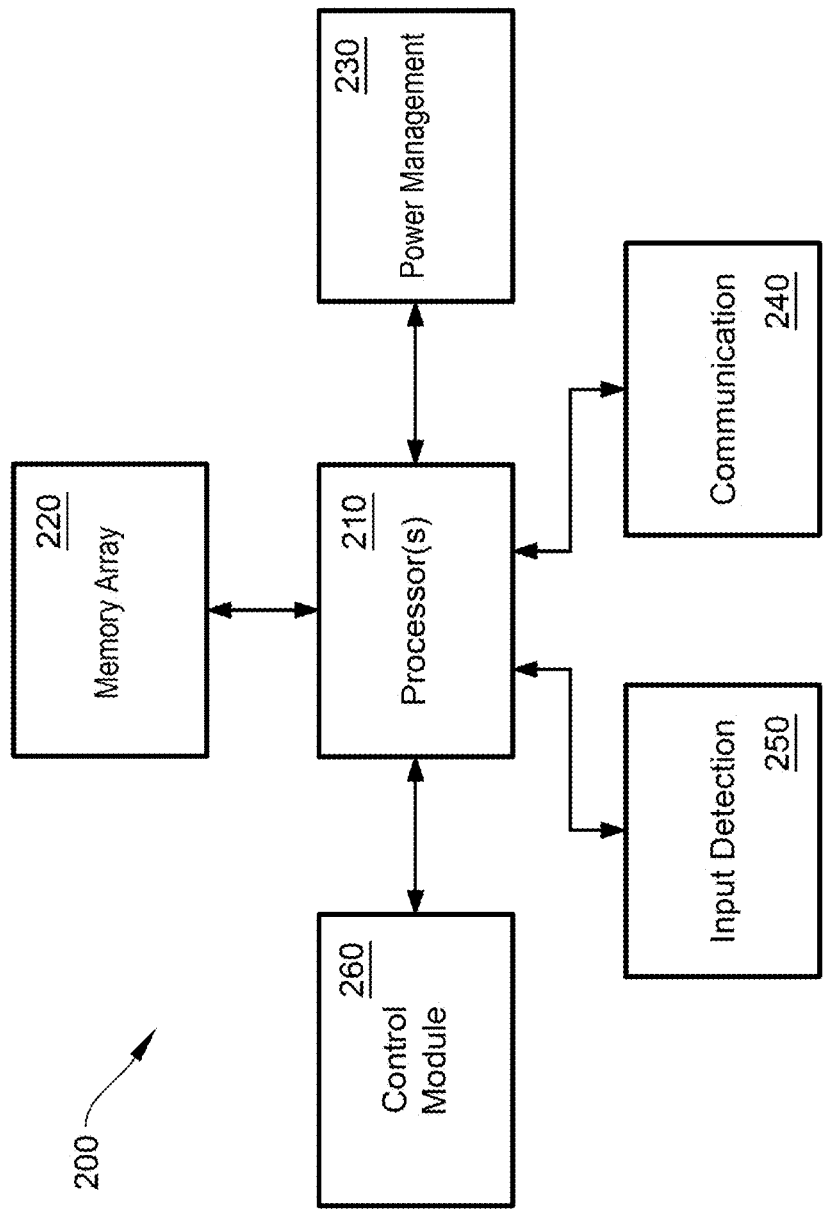
FIG. 2 shows a system 200 for operating a computer peripheral device 130, according to certain embodiments.

FIG. 2 shows a system 200 for operating a computer peripheral device 150, according to certain embodiments. System 200 may be configured to operate any of the computer peripheral devices specifically shown or not shown herein but within the wide purview of the present disclosure. System 200 may include processor(s) 210, memory 220, a power management system 230, a communication module 240, an input detection module 250, and an output control module 260. Each of the system blocks 220-260 can be in electronic communication with processor(s) 210 (e.g., via a bus system). System 200 may include additional functional blocks that are not shown or discussed to prevent obfuscation of the novel features described herein. System blocks 220-260 (also referred to as "modules") may be implemented as separate modules, or alternatively, more than one system block may be implemented in a single module. In the context described herein, system 200 can be incorporated into any input device described herein and may be configured to perform any of the various methods of combining EPM and MR, as described below at least with respect to FIGS. 6-32, as would be appreciated by one of ordinary skill in the art with the benefit of this disclosure.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of computer peripheral device 150 (e.g., system block 220-260). Alternatively or additionally, some of system blocks 220-260 may include an additional dedicated processor, which may work in conjunction with processor(s) 210. For instance, MCUs, µCs, DSPs, and the like, may be configured in other system blocks of system 200. Communications block 240 may include a local processor, for instance, to control aspects of communication with host computer 110 (e.g., via Bluetooth, Bluetooth LE, RF, IR, hardwire, ZigBee, Z-Wave, Logitech Unifying, or other communication protocol). Processor(s) 210 may be local to the peripheral device (e.g., contained therein), may be external to the peripheral device (e.g., off-board processing, such as by a corresponding host computing device), or a combination thereof. Processor(s) 210 may perform any of the various functions and methods (e.g., methods 600) described and/or covered by this disclosure in conjunction with any other system blocks in system 200. In some implementations, processor 302 of FIG. 3 may work in conjunction with processor 210 to perform some or all of the various methods described throughout this disclosure. In some embodiments, multiple processors may enable increased performance characteristics in system 200 (e.g., speed and bandwidth), however multiple processors are not required, nor necessarily germane to the novelty of the embodiments described herein. One of ordinary skill in the art would understand the many variations, modifications, and alternative embodiments that are possible.

Memory block ("memory") 220 can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for execution by processing devices (e.g., processor(s) 210). Software can be implemented as a single program or a collection of separate programs and can be stored in non-volatile storage and copied in whole or in-part to volatile working memory during program execution. In some embodiments, memory 220 may store data corresponding to inputs on the peripheral device, such as a detected movement of the peripheral device a sensor (e.g., optical sensor, accelerometer, etc.), activation of one or more input elements (e.g., buttons, sliders, touch-sensitive regions, etc.), or the like. Stored data may be aggregated and send via reports to a host computing device.

In certain embodiments, memory array ("memory") 220 can store the various data described throughout this disclosure. For example, memory 220 can store and/or include optical data, dynamically adjustable memory pages, and more germane to the present disclosure the memory array can store various settings for the EPM magnetizing assembly to magnetize one or more magnets at a polarity and/or any number of intensity levels to control, for example, a viscosity of MR materials on an input device. In some cases, the intensity can be referred to as a magnetic field strength, commonly measure in SI base units of ampere per meter (A/m). Memory 220 can be used to store any suitable data to perform any function described herein and as would be appreciated by one of ordinary skill in the art with the benefit of this disclosure. Memory array 220 can be referred to as a storage system or storage subsystem, and can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein.

Power management system 230 can be configured to manage power distribution, recharging, power efficiency, haptic motor power control, and the like. In some embodiments, power management system 230 can include a battery (not shown), a Universal Serial Bus (USB)-based recharging system for the battery (not shown), and power management devices (e.g., voltage regulators—not shown), and a power grid within system 200 to provide power to each subsystem (e.g., communications block 240, etc.). In certain embodiments, the functions provided by power management system 230 may be incorporated into processor(s) 210. Alternatively, some embodiments may not include a dedicated power management block. For example, functional aspects of power management block 240 may be subsumed by another block (e.g., processor(s) 210) or in combination therewith. The power source can be a replaceable battery, a rechargeable energy storage device (e.g., super capacitor, Lithium Polymer Battery, NIMH, NiCd), or a corded power supply. The recharging system can be an additional cable (specific for the recharging purpose) or it can use a USB connection to recharge the battery.

In some embodiments, power management system 230 may control aspects of the EPM assembly's magnetizing assembly that sets a polarity and intensity of a magnetic field of one or more magnets. For instance, power management system 230 may set a current pulse amplitude, duration, and/or frequency that drives a coil that is operable to generate a magnetizing field that magnetizes the one or more magnets. Typically, a single pulse is used to change the magnetization and/or polarization of the magnet(s). In some cases, AC current can be used to completely remove the magnet's magnetization. In certain embodiments, multiple pulses might be used to quickly change the state of the MR for haptic effects or the like. Any number of drive settings (e.g., different combinations of current pulse amplitude, duration, and/or frequency) may be stored that can affect the viscosity of the MR material (typically placed adjacent to the magnet, in close proximity to the magnet, and at least sometimes within the magnetic field of the magnet). One of ordinary skill in the art with the benefit of this disclosure would appreciate the many modifications, variations, and alternative embodiments thereof.

Communication system 240 can be configured to enable wireless communication with a corresponding host computing device (e.g., 110), or other devices and/or peripherals, according to certain embodiments. Communication system 240 can be configured to provide radio-frequency (RF), Bluetooth®, Logitech proprietary communication protocol (e.g., Unifying, Gaming Light Speed, or others), infra-red (IR), ZigBee®, Z-Wave, or other suitable communication technology to communicate with other computing devices and/or peripheral devices. System 200 may optionally comprise a hardwired connection to the corresponding host computing device. For example, computer peripheral device 130 can be configured to receive a USB, FireWire®, Thunderbolt®, or other universal-type cable to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection module 250, output control modules 260, etc.). In some aspects, communication system 240 can send reports generated by the processor(s) 210 (e.g., HID data, streaming or aggregated data, etc.) to a host computing device. In some cases, the reports can be generated by the processor(s) only, in conjunction with the processor(s), or other entity in system 200. Communication system 240 may incorporate one or more antennas, oscillators, etc., and may operate at any suitable frequency band (e.g., 2.4 GHz), etc. One of ordinary skill in the art with the benefit of this disclosure would appreciate the many modifications, variations, and alternative embodiments thereof.

Input detection module 250 can control the detection of a user-interaction with input elements (also referred to as "elements") on an input device. For instance, input detection module 250 can detect user inputs from motion sensors, keys, buttons, roller wheels, scroll wheels, track balls, touch pads (e.g., one and/or two-dimensional touch sensitive touch pads), click wheels, dials, keypads, microphones, GUIs, touch-sensitive GUIs, proximity sensors (e.g., infra-red, thermal, etc.), image sensor based detection such as gesture detection (e.g., via webcam), audio based detection such as voice input (e.g., via microphone), or the like, as would be appreciated by one of ordinary skill in the art with the benefit of this disclosure. Alternatively, the functions of input detection module 250 can be subsumed by processor 210, or in combination therewith.

In some embodiments, input detection module 250 can detect a touch or touch gesture on one or more touch sensitive surfaces on input device 130. Input detection block 250 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of computer peripheral device 150 may or may not utilize touch detection or touch sensing capabilities.

Input detection block 250 can include touch and/or proximity sensing capabilities. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, strain gages, etc.), capacitive sensors (e.g., surface capacitance, self-capacitance, mutual capacitance, etc.), optical sensors (e.g., infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), inductive sensors, magnetic sensors (e.g., Hall Effect), or the like.

Input detection module 250 may include a movement tracking sub-block that can be configured to detect a relative displacement (movement tracking) of the computer peripheral device 150. For example, input detection module 250 optical sensor(s) such as IR LEDs and an imaging array of photodiodes to detect a movement of computer peripheral device 150 relative to an underlying surface. Computer peripheral device 150 may optionally include movement tracking hardware that utilizes coherent (laser) light. Moving tracking can provide positional data (e.g., delta X and delta Y data from last sampling) or lift detection data. For example, an optical sensor can detect when a user lifts computer peripheral device 130 off of an underlying surface (also referred to as a "work surface") and can send that data to processor 210 for further processing. In some embodiments, processor 210, the movement tracking block (which may include an additional dedicated processor), or a combination thereof, as would be appreciated by one of ordinary skill in the art with the benefit of this disclosure.

In certain embodiments, accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers (e.g., in a "3D air mouse," HMD, or other device). Accelerometers can further determine if the input device 150 has been lifted off of an underlying surface and can provide movement data that may include the velocity, physical orientation, and acceleration of computer peripheral device 150. In some embodiments, gyroscope(s) can be used in lieu of or in conjunction with accelerometer(s) to determine movement or input device orientation.

In some embodiments, output control module 260 can control various outputs for a corresponding computer peripheral device. For instance, output control module 260 may control a number of visual output elements (e.g., LEDs, LCD screens), displays, audio outputs (e.g., speakers), haptic output systems, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus system to transfer power and/or data to and from the different systems therein. It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices (e.g., computer peripheral devices) implemented using any combination of circuitry and software. Furthermore, aspects and/or portions of system 200 may be combined with or operated by other sub-systems as required by design. For example, input detection module 250 and/or memory 220 may operate within processor(s) 210 instead of functioning as a separate entity. In addition, the inventive concepts described herein can also be applied to any electronic device. Further, system 200 can be applied to any of the computer peripheral devices described in the embodiments herein, whether explicitly, referentially, or tacitly described (e.g., would have been known to be applicable to a particular computer peripheral device by one of ordinary skill in the art). The foregoing embodiments are not intended to be limiting and those of ordinary skill in the art with the benefit of this disclosure would appreciate the myriad applications and possibilities.

System for Operating a Host Computing Device

Figure 3:
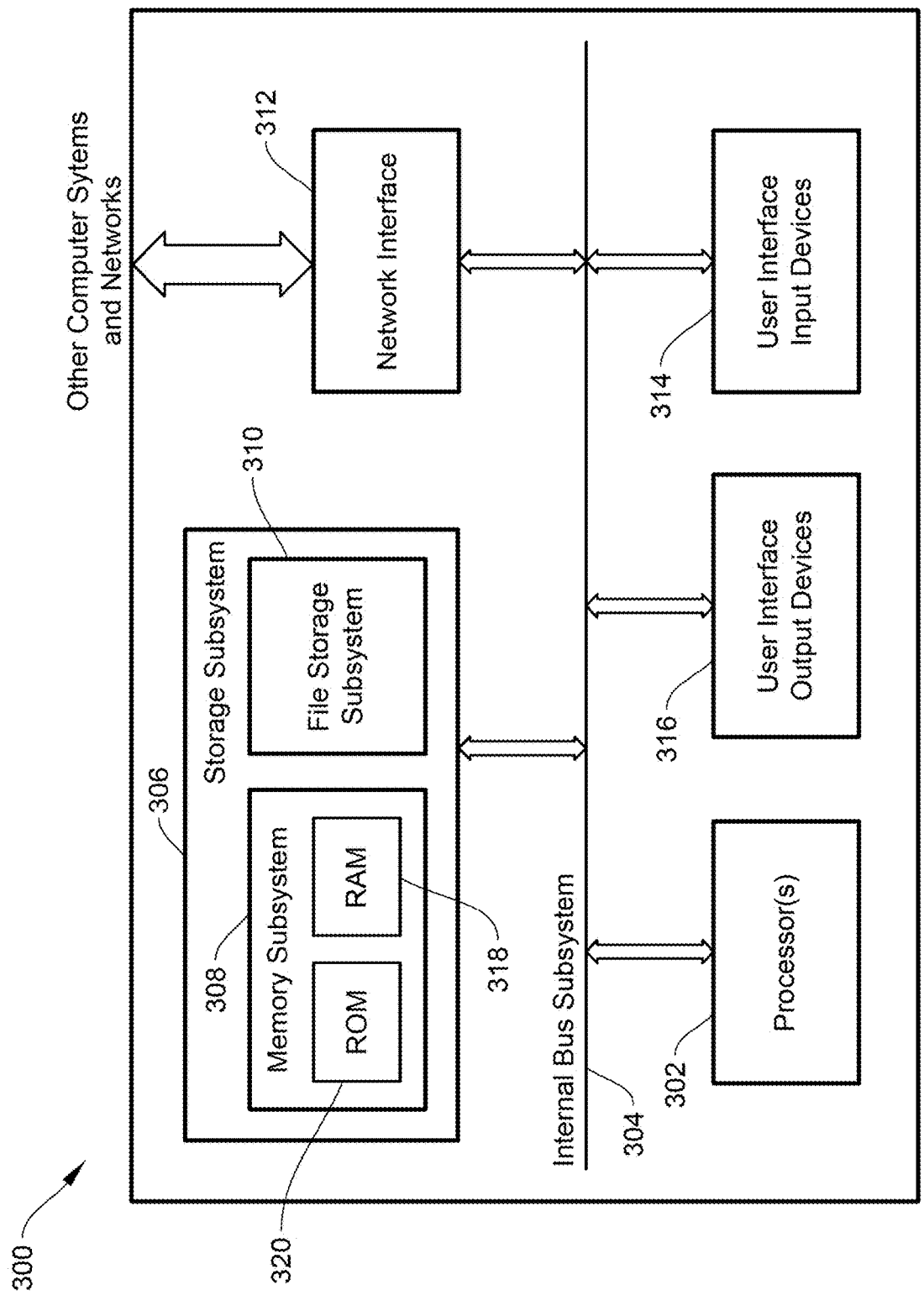
FIG. 3 shows is a simplified block diagram of a host computing device 300, according to certain embodiments.

FIG. 3 is a simplified block diagram of a host computing device 300, according to certain embodiments. Host computing device 300 can implement some or all functions, behaviors, and/or capabilities described above that would use electronic storage or processing, as well as other functions, behaviors, or capabilities not expressly described. Host computing device 300 can include a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, host computing device 300 can be implemented in any suitable computing device, such as a desktop or laptop computer (e.g., desktop 110), mobile device (e.g., tablet computer, smart phone, mobile phone), wearable device, media device, or the like, or in peripheral devices (e.g., keyboards, etc.) in certain implementations.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., surface classification) may be performed by software stored in storage subsystem 306, stored in memory 220 of a computer peripheral device, or both. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a host computing device 110 to perform corresponding actions. The instructions may be configured to run in sequential order, in parallel (such as under different processing threads), or in a combination thereof. After loading a code module on a general purpose computer system, the general purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium).

Storage subsystem 306 can also store information useful for establishing network connections using the communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of system 300 as an integrated system. In some cases, such as in laptop computers, this may be the case as keyboards and input elements as well as a display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Electropermanent Magnets (EPM) and Aspects of Operation

Electropermanent magnets present a number of advantages over more conventional system utilizing permanent magnets and/or electromagnets. A permanent magnet can be an object made from a material that is magnetized and creates its own persistent magnetic field. Materials that can be magnetized, which are also the same materials that are strongly attracted to a magnet, are called ferromagnetic materials and typically include at least one of the elements iron, nickel and cobalt and their alloys, some alloys of rare-earth metals, and some naturally occurring minerals such as lodestone. Ferromagnetic materials can comprised of magnetically "soft" materials like annealed iron, which can be magnetized but do not tend to stay magnetized, and magnetically "hard" materials, which tend to stay magnetized. Permanent magnets are made from "hard" ferromagnetic materials such as alnico (e.g., iron alloy typically comprised of aluminum, nickel, and cobalt, as well as copper and/or titanium) and ferrite (e.g., ceramic material comprised of iron (III) oxide (e.g., $Fe_2O_3$, rust) blended with barium, manganese, nickel, and/or zinc) that are subjected to processing in a strong magnetic field during manufacture to align their internal microcrystalline structure, making them very hard to demagnetize. In order to demagnetize a saturated magnet, a certain magnetic field must be applied, and this threshold depends on a coercivity of the respective material. "Hard" materials typically have high coercivity, whereas "soft" materials typically have low coercivity. The overall strength of a magnet is measured by its magnetic moment or, alternatively, the total magnetic flux it produces. For the purposes of this disclosure, this can be referred to as the magnetic field intensity. A significant drawback of using permanent magnets is that their application can be limited as one magnetic field intensity typically cannot be practicably increased or decreased to control, for instance, different levels of rotational friction on a scroll wheel. When applied to an MR material, only one viscosity level can be set (based on the magnetic field intensity of the magnet's magnetic field), without the use of a complex and likely costly mechanical system to shuttle the permanent magnet and corresponding magnetic field to-and-from the location of the MR material.

An electromagnet is comprised of a coil of wire that operates as a magnet when an electric current passes through it but stops operating like a magnet when the current stops. Often, the coil is wrapped around a core of "soft" ferromagnetic material such as mild steel, which can substantially increase the magnetic field produced by the coil. As described above, although an electromagnet can generate a range of magnetic field intensities, which can be useful when combined with an MR material to achieve different viscosities and more possibilities for application, an electromagnet requires continuous power to maintain the magnetic field, which can prohibit practical use in most battery powered input devices because of the high power consumption and the likely significant corresponding reduction in battery life.

With the combination of an electropermanent magnet and magnetorheological materials, any number of magnetic intensity settings of the EPM and corresponding viscosities on the MR material can be used to achieve myriad applications with more precise control and without the drawback of high power requirements. In an EPM circuit, once the magnet is magnetized (e.g., both polarity and magnetic intensity) by the EPM system via the coil, the power through the coil can be shut off and the magnet maintains its magnetic field intensity without any additional power. As such, multiple viscosities of the MR can be achieved, thereby allowing multiple settings for certain features such as linearly adjustable input elements (e.g., buttons, keys, triggers, support structures, etc.), rotationally adjustable input elements (e.g., scroll wheels, knobs, gaming wheels and/or pedals, hinges, etc.), or the like, as described below. A magnetic field in an EPM can be shut off in a similar manner, as well as different levels of magnetic intensity by varying the current pulse and amplitude, as would be appreciated by one of ordinary skill in the art with the benefit of this disclosure.

Figure 4A:
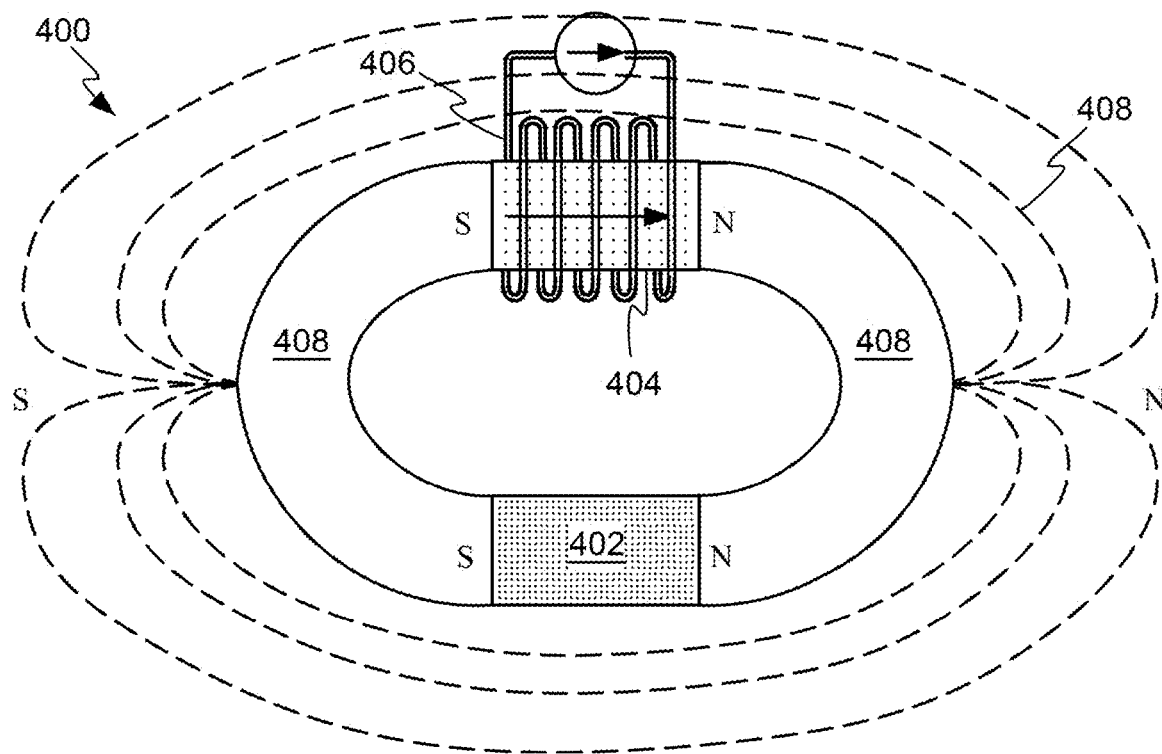
FIG. 4A shows an example of an electropermanent magnet system 400 operating in a first mode of operation, according to certain embodiments.
Figure 4B:
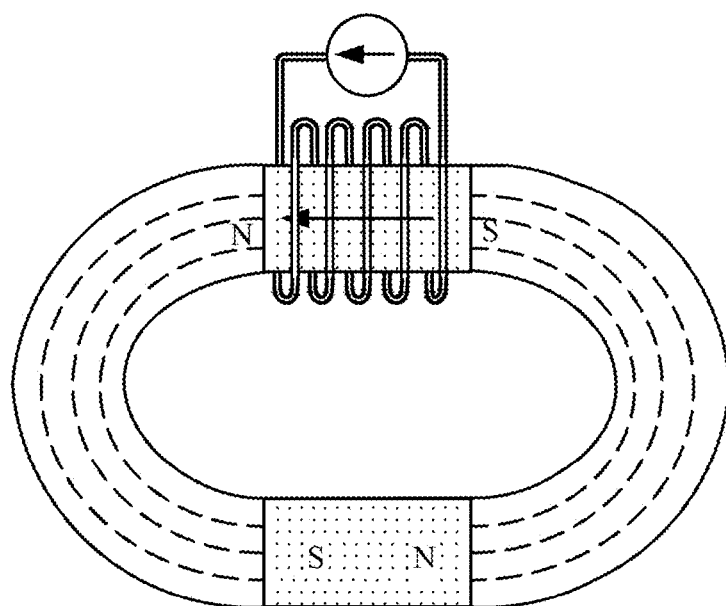
FIG. 4B shows an example of the electropermanent magnet system 400 operating in a second mode of operation, according to certain embodiments.

FIGS. 4A-4B show an example of a simplified electropermanent magnet 400 that utilizes two magnets rather than one as is used in many of the embodiments described herein, however the operational principles are the same as would be appreciated by one of ordinary skill in the art with the benefit of this disclosure. In the particular simplified embodiments of FIGS. 4A and 4B, electropermanent magnet 400 includes a first permanent magnet 402 and a second permanent magnet 404. First permanent magnet 402 can have a higher intrinsic coercivity than second permanent magnet 404. In some embodiments, as described above, permanent magnet 402 can take the form of a rare earth (e.g., Neodymium Iron Boron or Samarium Cobalt) magnet and second permanent magnet 404 can take the form of a Ferromagnetic (e.g., Alnico or ferrite) magnet. The lower intrinsic coercivity of second permanent magnet 404 allows for a magnetizing coil 406 to emit a magnetic field of sufficient strength to reverse a polarity of the magnetic field emitted by second permanent magnet 404 without affecting the magnetization of first permanent magnet 402. For example, in some embodiments, an intrinsic coercivity of first permanent magnet 402 can be over ten times greater than an intrinsic coercivity of second permanent magnet 404. The lower intrinsic coercivity of second permanent magnet 404 also reduces the amount of electrical energy expended to flip the polarity of second permanent magnet 404, thereby allowing for more efficient operation of electropermanent magnet 400. First permanent magnet 402 and second permanent magnet 404 are each positioned between and in direct contact or at least close contact with ferromagnetic poles 408. Ferromagnetic poles 408 can be formed from a ferritic material such as mild steel, having an even lower intrinsic coercivity than second permanent magnet 404. Ferromagnetic poles 408 helps guide the magnetic fields emitted by first permanent magnet 402 and second permanent magnet 404. In some embodiments a size and shape of ferromagnetic poles 408 can be adjusted to produce a magnetic field having a desired size and shape.

FIG. 4A shows dashed lines 408 depicting a magnetic flux emitted by electropermanent magnet 400 that show how with both first and second permanent magnets 402 and 404 oriented in the same direction, magnetic flux is released from electropermanent magnet 400 to create well defined north and south poles. This magnetic field is symmetrical, as depicted, when the strengths of the magnetic fields emitted by the two permanent magnets are about the same.

FIG. 4B shows how when the polarity of first permanent magnet 402 is opposite the polarity of second permanent magnet 404, the magnetic flux generated by both permanent magnets remains substantially contained within and circulating through ferromagnetic poles 408, first permanent magnet 402 and second permanent magnet 404. This results in electropermanent magnet 400 emitting little to no magnetic field. These principles can be applied to the embodiments that follow utilizing a single magnet or multiple magnets in the EPM system.

Magnetorheological Materials (MR) and Aspects of Operation

As described above, Magnetorheological (MR) materials (e.g., fluids, elastomers, etc.) change their viscosity/stiffness in response to an intensity of the magnetic field in which they are subject to. In the absence of a magnetic field, or in very low intensity magnetic fields, MR materials tend to have very low viscosity/stiffness and can be malleable and compliant. In the presence of a relatively high intensity magnetic field, MR materials tend to have a high viscosity/stiffness and can be rigid and unyielding. By way of non-limiting example, MR materials can have a magnetic excitation field in the range of 0 to 200-300 kA/m, which can result in a magnetic induction in the range of 0 to 1-1.5 Tesla. The EPM can be designed to achieve that range by changing the magnet size, strength, and/or dimensions including the air gap. In some embodiments, a typical MR material may include Lord© MRF-132DG or similar product. One of ordinary skill in the art with the benefit of this disclosure would appreciate the many modifications, variations, and alternative embodiments thereof.

Figure 5A:
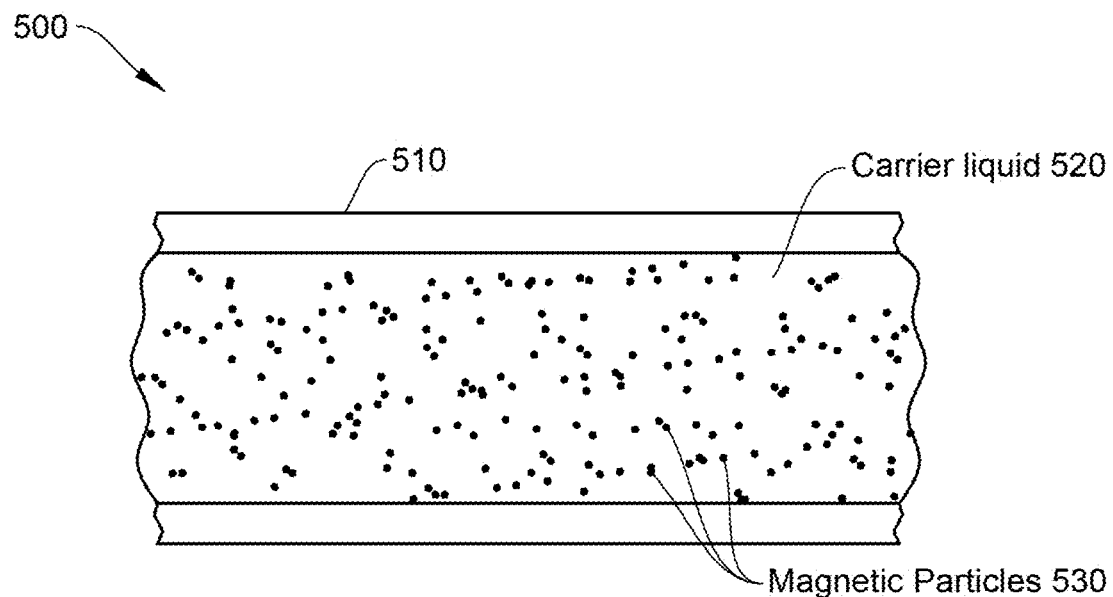
FIG. 5A shows an example of certain properties of magnetorheological materials in the absence of a magnetic field, according to certain embodiments.

FIG. 5A shows an example of certain properties of a magnetorheological material 500 in the absence of a magnetic field, according to certain embodiments. The MR material 500 includes a housing structure 510 that contains a carrier liquid 520. In some embodiments, the carrier liquid can be Hydrocarbon based (e.g., oil) with additives (e.g., surfactants) to avoid decantation and/or sedimentation. The mass concentration of the ferric particles may be approximately 80%, but can higher or lower in some cases. Magnetic particles 530 (e.g., ferrite-based particles) are typically micrometer or nanometer scale (e.g., 0.1-10 μm) spheres or ellipsoids and are suspended within carrier oil 520 and distributed randomly in suspension under normal circumstances, as shown in FIG. 5A. Housing structure 510 can be any suitable structure to contain the carrier liquid 520. For example, housing structure 510 may be in the form of a reservoir, piston, shock absorber, or other suitable form factor, as shown in the various embodiments below and as would be appreciated by one of ordinary skill in the art with the benefit of this disclosure.

Figure 5B:
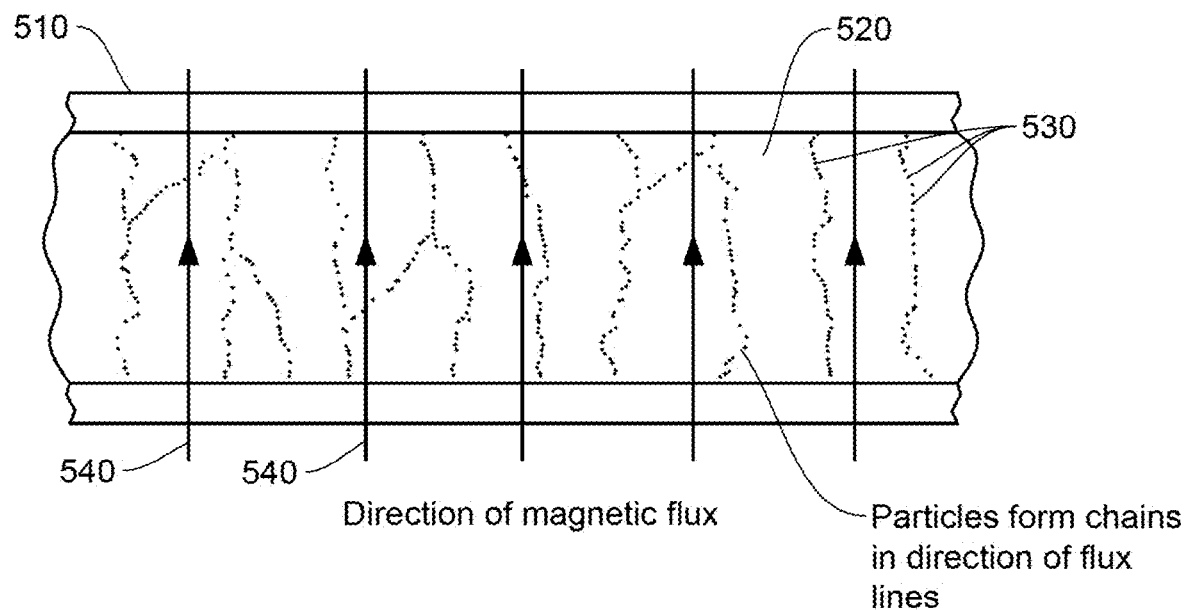
FIG. 5B shows an example of certain properties of magnetorheological materials in the presence of a magnetic field, according to certain embodiments.

FIG. 5B shows an example of certain properties of magnetorheological materials in the presence of a magnetic field, according to certain embodiments. When a magnetic field is applied, microscopic particles 530 may align themselves along the lines of magnetic flux 540, as shown in FIG. 5B. By way of example, a magnetorheological damper is filled with magnetorheological fluid, which is controlled by a magnetic field and provided by an EPM system, as described above. This allows the damping characteristics to be continuously controlled by varying the power of the EPM when the change in viscosity is desired. Fluid viscosity increases within the damper as the electromagnet magnetic intensity increases. The dampening quality can be a performance characteristic of an input device. For example, a linear translation of a button can change based on the state of the MR materials. The button may operate in a plunger style fashion, with the plunger passing through or submerged in the MR material. Thus, through dynamic control of the EPM and corresponding MR material, any type of button resistance profile can be created, as further described in the examples that follow.

Figure 6:
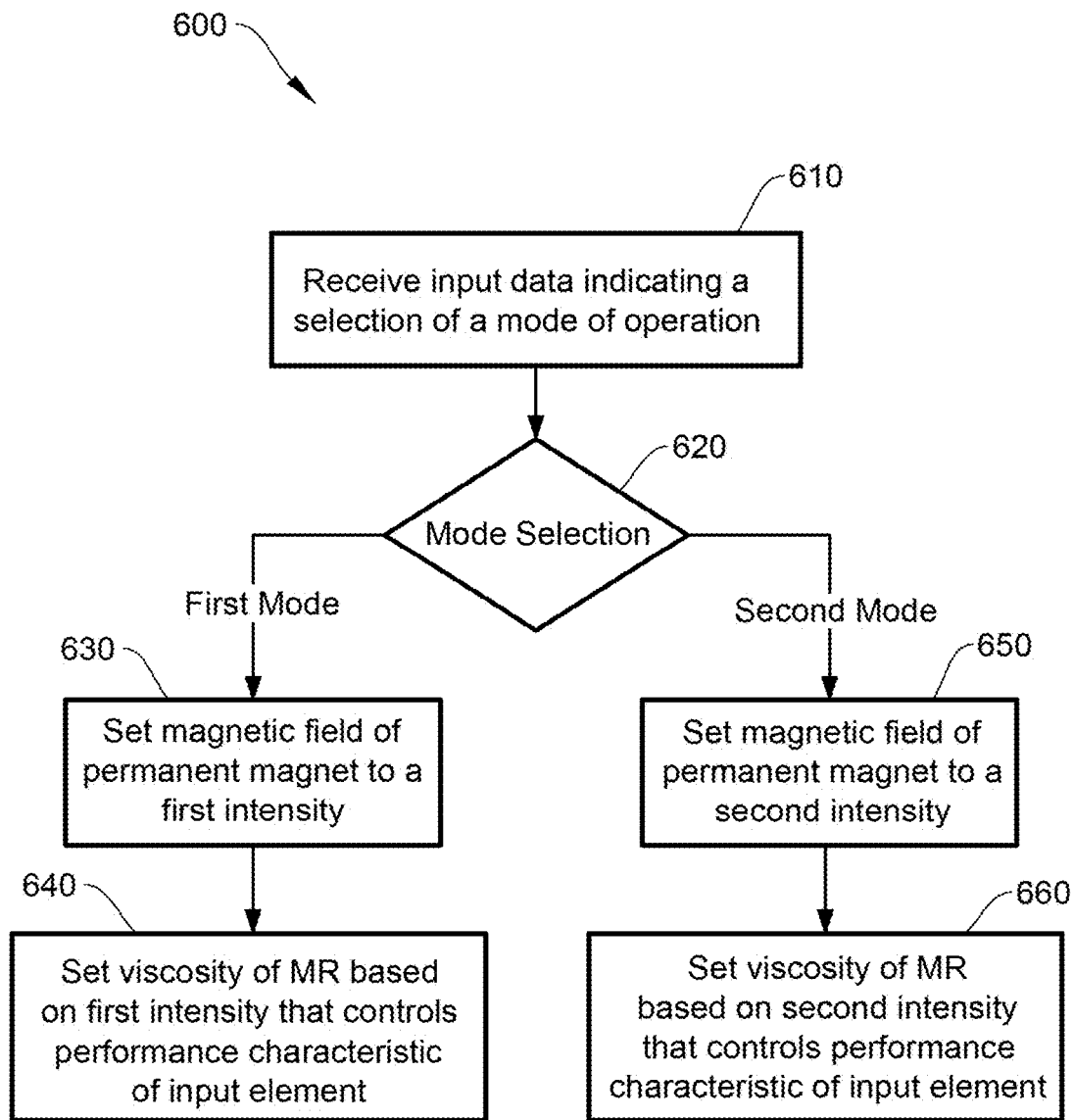
FIG. 6 is a flow chart showing aspects of a method for controlling performance characteristics of an input element on an input device using a electropermanent magnet system and magnetorheological materials, according to certain embodiments.

FIG. 6 is a simplified flow chart showing aspects of a method 600 of controlling a performance characteristic of an input element on an input device using a electropermanent magnet system and magnetorheological materials, according to certain embodiments. Method 600 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 600 can be performed by aspects of processor(s) 210, memory array 220, power management block 230, input detection 250, or a combination thereof, as would be appreciated by one of ordinary skill in the art with the benefit of this disclosure.

At operation 610, method 600 can include receiving input data indicating a selection of one of a plurality of modes of operation of an input device, according to certain embodiments. The input data can be received in any form and from any suitable source. For example, the input device may include a selection element such as a button, touch sensitive surface, switch, knob, or the like, that can be used to select the one of the plurality of modes of operation of the input device. In some aspects, the selection may be made via a microphone or camera that is communicatively coupled to the input device and configured to determine a selection based on an audio input or visual cue/gesture by a user, respectively. In some embodiments, the selection may be made via a selection element on the input device or on a remote device (e.g., host computing device). In certain embodiments, the input device includes an input element, an EPM assembly with a permanent magnet and a magnetizing assembly configured to set a magnetic field generated by the permanent magnet. The input device can further include an MR material coupled to the input element, the MR material having a viscosity that changes based on the magnetic field and affects a performance characteristic of the input element. The input element can be any suitable element on an input device such as, but not limited to, input elements that can perform a translation motion along a path. For instance, some input elements may have a translational motion along a linear translational path, such as a button or key (e.g., depressible), a switch, a support structure (e.g., extends or retracts to set a height of the input device), or the like. Some input elements may have a translational motion along a rotational translational path, such as knobs, trackballs, scroll wheels, triggers, hinges, pedals, or the like, and as further described below in a number of examples. In such cases, the performance characteristic of the input element may correspond to the translational movement of the input element (e.g., a degree of freedom of movement, such as a linear or rotational movement). In certain embodiments, the MR material can be coupled to the input element in a manner that the state of the MR material (e.g., the viscosity) can affect how easily or how difficult it can be for a user to move the input element along its translational path (e.g., a button is easy to press or hard to press based on the viscosity of the MR material).

In some embodiments, in response to the received input data corresponding to the selection (operation 620) of a first mode of operation of the plurality of modes of operation, method 600 can include setting, by the magnetizing assembly, the magnetic field generated by the permanent magnet to a first intensity (operation 630), thereby causing the MR material to have a first viscosity that affects the performance characteristic of the input device (operation 640), according to certain embodiments. In some implementations, the magnetic field intensity may be zero (e.g., the magnet is demagnetized) or very low such that the MR material is at or near its minimal viscosity state and the performance characteristic (e.g., translational movement) is such the MR material provides a minimal resistance to translational movement of the input element.

In some embodiments, in response to the received input data corresponding to the selection (operation 620) of a second mode of operation of the plurality of modes of operation, method 600 can include setting, by the magnetizing assembly, the magnetic field generated by the permanent magnet to a second intensity (operation 650) thereby causing the MR material to have a second viscosity that affects the performance characteristic of the input device (operation 660), according to certain embodiments. In some implementations, the magnetic field intensity may be high (e.g., the magnet is saturated) some fluids used such that the MR material is at or near its maximum viscosity state and the performance characteristic (e.g., translational movement) is such the MR material provides a maximum resistance to translational movement of the input element.

It should be appreciated that the specific steps illustrated in FIG. 6 provide a particular method 600 for controlling performance characteristics of an input element on an input device using a electropermanent magnet system and magnetorheological materials, according to certain embodiments. Other sequences of steps may also be performed according to alternative embodiments. Furthermore, additional steps may be added or removed depending on the particular applications. For example, the present example included a minimum and maximum viscosity of the MR material. Other states are possible and any suitable viscosity setting can be used. In some aspects, more than two modes of operation are possible. Any combination of changes can be used and one of ordinary skill in the art with the benefit of this disclosure would understand the many variations, modifications, and alternative embodiments thereof.

Certain Embodiments of EPM+MR Based Applications

As described above, a basic principle of utilizing EPM with MR material is that it allows a user to dynamically control, for instance, a braking of a given mechanical degree of freedom (DOF) by way of the viscosity of the MR material, where the mechanical degree of freedom can be linear translational movement, rotational translational movement, or other type, as would be appreciated by one of ordinary skill in the art with the benefit of this disclosure.

Implementations that utilize a permanent magnet typically require that one or more permanent magnets have to physically move with respect to MR materials to change the magnet field intensity imparted on the MR material. Thus, an additional mechanical degree of freedom typically needs to be added to the system to facilitate the movement between the permanent magnet and the MR material. Consequently, the mechanical complexity of the system may be increased, which can lead to higher risks of component failure and overall cost of the system.

Clutch Systems

Figure 7:
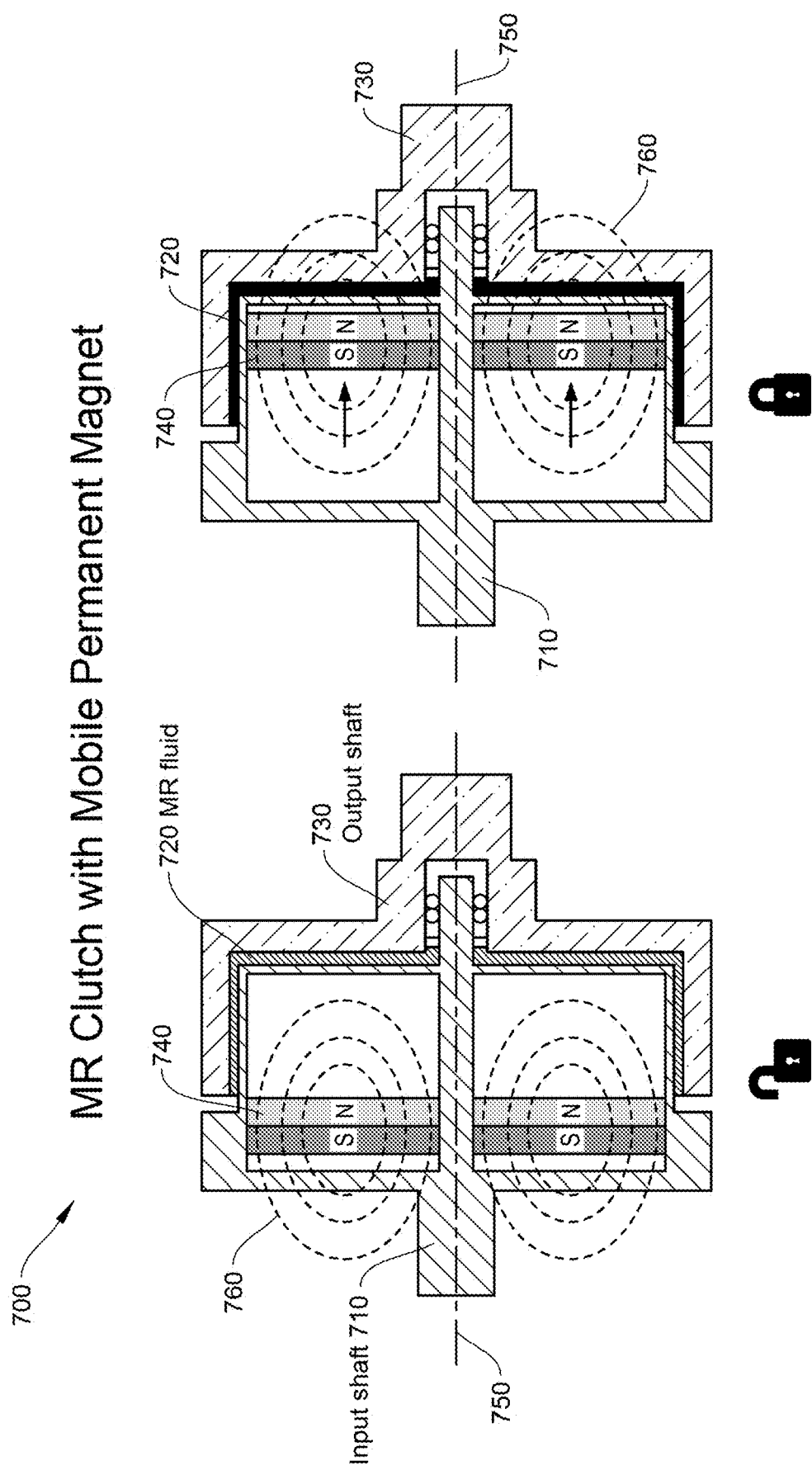
FIG. 7 shows a magnetorheological-based clutch system with a permanent magnet assembly.

FIG. 7 shows a magnetorheological-based clutch system 700 that uses a permanent magnet assembly to apply a magnet field to MR material to control clutch engagement. MR-based clutch system 700 includes a clutch input shaft 710, an output shaft 730, and a mechanically moveable magnet assembly 740 with one or more permanent magnets that continuously generate a magnetic field 760. MR fluid 720 is configured in a cavity between input shaft 710 and output shaft 730. Input shaft 710 is coupled to output shaft 730 by way of MR fluid 720, such that the amount of frictional coupling between input shaft 710 and output shaft 730 depends in large part on the viscosity of MR fluid 720. The mechanical degree of freedom being controlled by the state of the MR fluid 720 is a rotational translation movement between input shaft 710 and output shaft 730. In the left image, magnet assembly 740 is positioned in a first position (e.g., left-most position) such that MR fluid 720 is not subject to (or minimally subject to) magnetic field 760. In such cases, MR-based clutch system 700 can be described as in an "unlocked" state where the MR fluid 720 has a relatively low viscosity and input shaft 710 has a very weak frictional coupling with output shaft 730 and can rotate relatively freely with respect to each other. In the right image, magnet assembly 740 is positioned in a second position (e.g., right-most position) such that MR fluid 720 is subject to continuous magnetic field 760. In such cases, MR-based clutch system 700 can be described as in a "locked" state where the MR fluid 720 has a relatively high viscosity (e.g., effectively solid) and input shaft 710 thereby has a very strong frictional coupling with output shaft 730 as the viscous fluid "locks" the input and output shafts together, as would be appreciated by one of ordinary skill in the art with the benefit of this disclosure. As described above, an additional degree of freedom is required to mechanically move the magnet assembly 740 to apply and remove MR fluid 720 from magnetic field 760, which can increase system cost and complexity, and can reduce reliability and negatively impact system longevity.

In some implementations, an electromagnet can be used to apply a magnetic field to the MR material to dynamically change its viscosity. As described above, an electromagnet is comprised of a coil of wire that operates as a magnet when an electric current passes through it but stops operating like a magnet when the current stops. Although an electromagnet can generate a range of magnetic field intensities, which can be useful when combined with an MR material to achieve different viscosities and more possibilities for application, an electromagnet requires continuous power to maintain the magnetic field, which can prohibit practical use in most battery powered input devices because of the high power consumption and the likely significant corresponding reduction in battery life. For instance, if the system needs to block or hold the particular degree of freedom for a long period of time (e.g., the MR material needs to be held in a high viscosity state), the system's power consumption can substantially increase since a continuous current has to drive the electromagnet.

Figure 8:
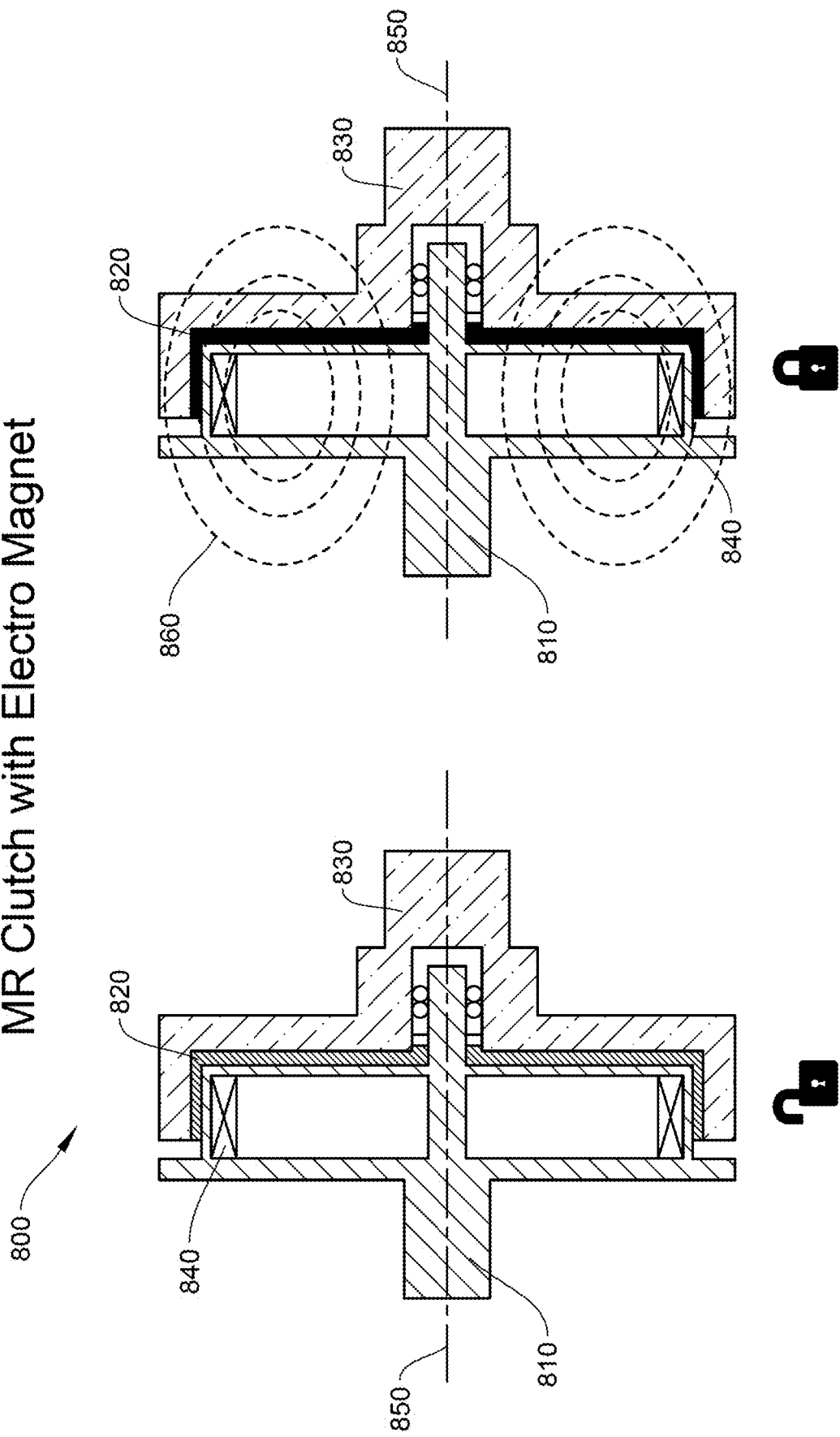
FIG. 8 shows a magnetorheological-based clutch system with an electromagnet assembly.

FIG. 8 shows a magnetorheological-based clutch system 800 that uses an electromagnet assembly to apply a magnet field to MR material to control clutch engagement. MR-based clutch system 800 includes a clutch input shaft 810, an output shaft 830, and an electromagnet 840 with magnetic field 860. Electromagnet 840 can include an electric circuit with at least one coil (not shown) that, when powered, generates the magnetic field 860, as would be appreciated by one of ordinary skill in the art with the benefit of this disclosure. MR fluid 820 is configured in a cavity between input shaft 810 and output shaft 830. Input shaft 810 is coupled to output shaft 830 by way of MR fluid 820, such that the amount of frictional coupling between input shaft 810 and output shaft 830 depends on the viscosity of MR fluid 820. The mechanical degree of freedom being controlled by the state of the MR fluid 820 is a rotational translation movement between input shaft 810 and output shaft 830. In the left image, the electromagnet is not powered (e.g., no current is driving the coil) and no magnetic field 860 is generated. In this case, MR-based clutch system 800 can be described as in an "unlocked" state where the MR fluid 820 has a relatively low viscosity and input shaft 810 has a very weak frictional coupling with output shaft 830 and can thus freely rotate with respect to each other. In the right image of FIG. 8, electromagnet 840 is powered (e.g., a current is driving the coil) and magnetic field 860 is generated. In such cases, MR-based clutch system 800 can be described as in a "locked" state where MR fluid 820 has a relatively high viscosity and input shaft 810 thereby has a very strong frictional coupling with output shaft 830 as the viscous fluid "locks" the input and output shafts together, as would be appreciated by one of ordinary skill in the art with the benefit of this disclosure. As noted above, although electromagnets provide more control over the magnet fields configured to control one or more input elements (e.g., magnetic field intensity can be changed), due to their relatively high cost, large footprint, and demanding power requirements, electromagnets are typically impracticable in small and/or battery powered wireless input devices.

In some embodiments, electropermanent magnets are combined with MR materials to solve the problems described above with respect to permanent magnet and electromagnet implementations configured to control a mechanical degree of freedom of movement (e.g., linear movement, rotational movement, etc.). For instance, unlike a permanent magnet, an EPM can turn its magnetic field on or off, and can be set to any suitable magnetic field polarization and intensity without having to mechanically move the EPM between locations to expose and remove MR material from a magnetic field. Unlike an electromagnet, a short single current pulse can be used to set the EPM to have a particular magnetic field polarity and intensity (strength). The current can then be shut off with no further power consumption requirements and the EPM can then maintain its particular magnetic field (e.g., positive, negative, or no magnetic field) for any suitable period of time (e.g., permanently, until the EPM magnetic field is turned off or changed to a new polarization or intensity, etc.). In a typical arrangement, an electromagnet-based system as described above will utilize more power than an EPM-based system after approximately 1 second of use or less (e.g., at cm scale) when in a "hold" position when the electromagnet maintains the magnetic field to cause the MR material to have a high viscosity. As an added benefit, using MR fluid to constrain and control a mechanical DOF is that MR fluid is better at resisting shear stress than certain configurations that rely on magnetic restraint.

Figure 9A:
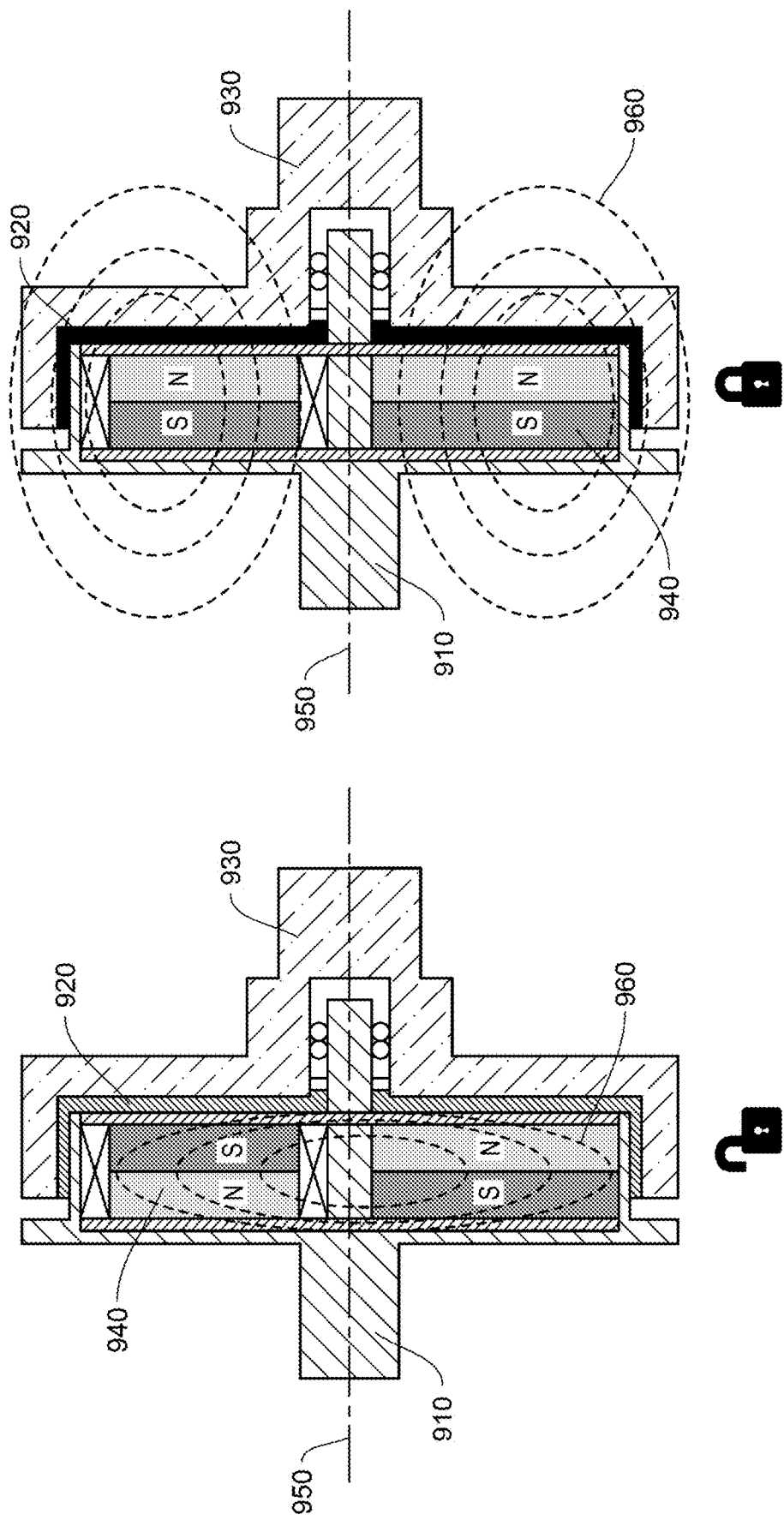
FIG. 9A shows a magnetorheological-based clutch system 900 with an electropermanent magnet assembly configured to apply a magnet field to MR material to control clutch engagement, according to certain embodiments.

FIG. 9A shows a magnetorheological-based clutch system 900 with an electropermanent magnet assembly configured to apply a magnet field to MR material to control clutch engagement, according to certain embodiments. MR-based clutch system 900 includes a clutch input shaft 910, an output shaft 930, and an EPM 940 with a controllable magnetic field. EPM 940 can include multiple magnets (e.g., having different coercivity values, as described above with respect to FIGS. 4A-4B) and an electric circuit with at least one coil (not shown) that, when powered, magnetizes at least one of the magnets of the EPM to generate the magnetic field 960. The polarization and intensity of the magnetic field can be set to any suitable settings, as would be appreciated by one of ordinary skill in the art with the benefit of this disclosure. MR fluid 920 is configured in a cavity between input shaft 910 and output shaft 930. Input shaft 910 is coupled to output shaft 930 by way of MR fluid 920, such that the amount of frictional coupling between input shaft 910 and output shaft 930 depends on the viscosity of MR fluid 920. The mechanical degree of freedom being controlled by the state of the MR fluid 920 is a rotational translation movement between input shaft 910 and output shaft 930. In the left image, the EPM is momentarily powered (e.g., via a current pulse that drives the coil) such that the two magnets have opposite polarity and the magnetic field conduction path is within magnets themselves such that the magnetic field does not come in contact with MR fluid 920. In this case, MR-based clutch system 900 can be described as in an "unlocked" state where the MR fluid 920 has a relatively low viscosity and input shaft 910 has a very weak frictional coupling with output shaft 930 and can thus freely rotate with respect to each other. In the right image of FIG. 9A, the EPM is momentarily powered (e.g., via a current pulse that drives the coil) such that the two magnets have the same polarities and the magnetic field conduction path is extended externally of the magnets such that the magnetic field traverses MR fluid 920. In such cases, MR-based clutch system 900 can be described as in a "locked" state where MR fluid 920 has a relatively high viscosity and input shaft 910 thereby has a very strong frictional coupling with output shaft 930 as the viscous fluid "locks" the input and output shafts together, as would be appreciated by one of ordinary skill in the art with the benefit of this disclosure. Thus, embodiments utilizing EPM with MR materials to dynamically control a braking of a mechanical DOF (e.g., linear or rotational translation) can do so without the need to add a second mechanical DOF (like configuration using permanent magnets, which reduce robustness and add cost), do not require power consumption to remain in either a "hold" or one or more "free" states.

FIG. 9B shows a second magnetorheological-based clutch system 980 with an electropermanent magnet assembly configured to apply a magnet field to MR material to control clutch engagement, according to certain embodiments. Clutch system 980 has an increased number of plates (e.g., a multi-plate clutch) that can provide larger frictional forces. FIG. 9B shows clutch system 980 in both a "locked" (e.g., friction applied) and "unlocked" configuration. In such embodiments, the EPM and MR system can have a decreased magnetic strength to achieve a target torque due to the larger frictional forces of the multi-plate clutch system.

FIG. 9C shows a third magnetorheological-based clutch system 990 with an electropermanent magnet assembly configured to apply a magnet field to MR material to control clutch engagement, according to certain embodiments. FIG. 9C shows clutch system 990 in both a "locked" (e.g., friction applied) and "unlocked" configuration. In this embodiments, the magnetic field for clutch system 990 is radial instead of axial, as shown in FIGS. 9A-9B. In other words, FIGS. 9A-9B show a "clutch" based approach, while FIG. 9C shows a "bearing" based approach. The rotor can be comprised of ferromagnetic material to conduct the magnetic field as shown to make for a robust, compact solution that can implement lower magnetic forces than other clutch system implementations. One of ordinary skill in the art with the benefit of this disclosure would appreciate the many modifications, variations, and alternative embodiments thereof.

Key Structures

Key structures can be used in any number of applications including keyboards, remote controls, gaming controls, or any suitable input device, internet-of-things (IoT) device, or the like. Conventional key structures typically incorporate mechanical structures, such as springs, to provide a resistance profile to a key press, and particular resistance profiles may be preferable to some users or in particular uses (e.g., gaming). However, conventional key structures are often limited to one or few resistance profiles and may be highly susceptible to wear and tear (e.g., a spring constant for a spring may change over time), as is often the case with mechanically moveable components. By combining an EPM and MR material, certain embodiments of key structures may be designed to have any suitable resistance profile by dynamically changing the viscosity of the MR material. Such embodiments may be applied to single key structures (see, e.g., FIGS. 10-12), multiple key structure (see, e.g., FIG. 15), and myriad profiles can be achieved, including linear and non-linear resistance profiles, which can include bumps or other resistance profile features found in contemporary, high-end input devices, as described below with respect to FIGS. 13-14C. The following non-limiting embodiments present some of the myriad implementations made possible by combining EPM and MR.

Figure 10:
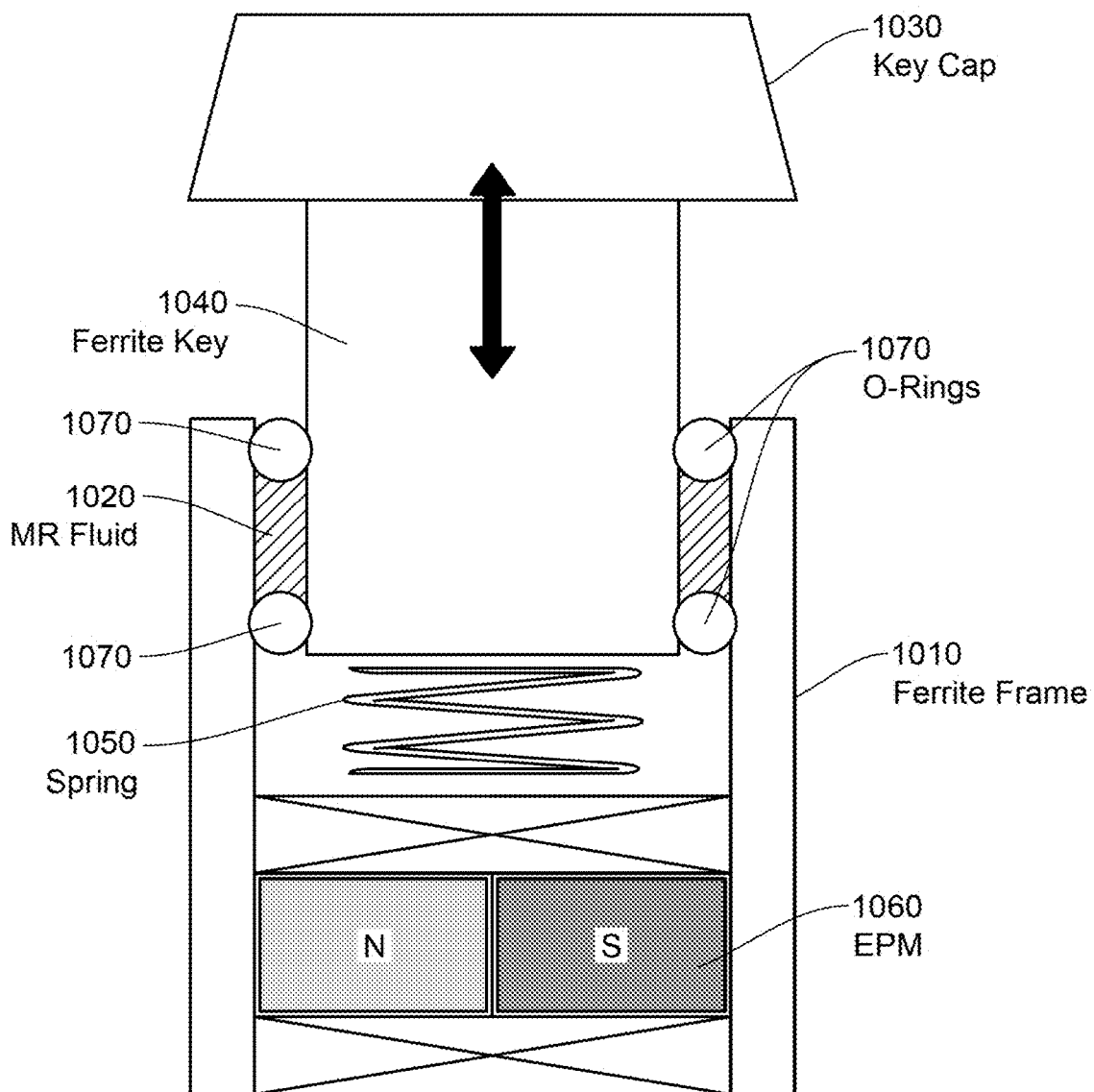
FIG. 10 shows a key structure that combines Electro-Permanent Magnets (EPM) and Magnetorheological (MR) material for improved performance characteristics, according to certain embodiments.

FIG. 10 shows a key structure 1000 that combines EPM and MR material for improved performance characteristics, according to certain embodiments. Key structure 1000 includes a key frame 1010, MR material 1020, a key plunger 1040, a key cap 1030 coupled to key plunger 1040, a biasing mechanism 1050, EPM 1060, and o-rings 1070. EPM 1060 may include an electric circuit and corresponding coil (e.g., a magnetizing assembly controlled by one or more processors) to set a magnetic field (e.g., set a polarity and intensity of the magnetic field) of EPM 1060. In operation, the key structure is configured to be pressed by a user, as a typical key would be pressed on a keyboard. A user would typically press keycap 1030 (shown in an initial position at rest) with a downward force, causing key cap 1030 and key plunger 1040 to linearly traverse downward along a travel path relative to key frame 1010, and the biasing mechanism 1050 would provide a restoring force that causes key plunger 1040 and keycap 1030 to move back upward (e.g., after the downward force is remove) and return to the initial position. Typically, the upward/downward movement is linear and mechanically one degree-of-freedom (DOF), although non-linear paths are possible. O-rings 1070 are configured to form a sealed reservoir cavity between key frame 1010 and key plunger 1040, and MR material 1020 (e.g., a fluid) is contained within the sealed reservoir cavity. As key plunger 1040 moves up and down within key frame 1010, portions of an outer surface of key plunger 1040 remain in contact with MR material 1020 as shown and as would be appreciated by one of ordinary skill in the art with the benefit of this disclosure.

Figure 11:
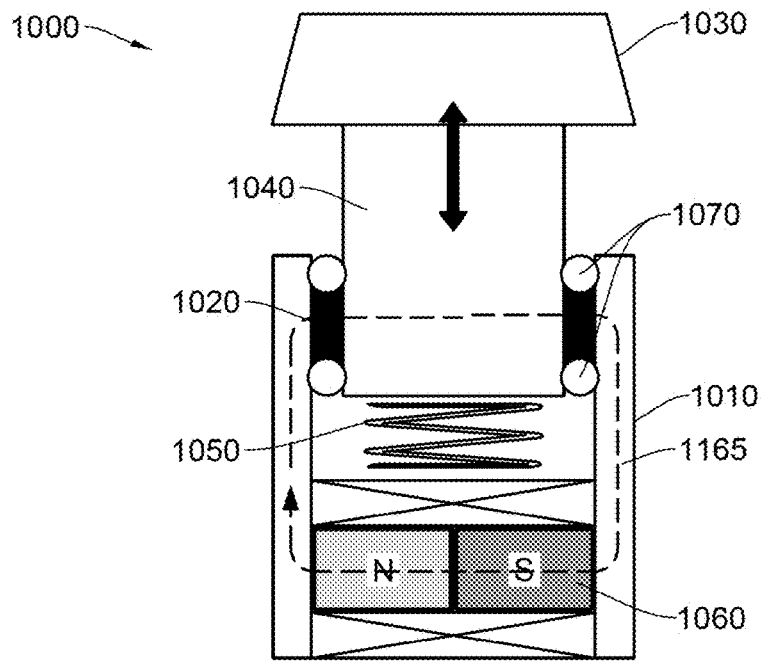
FIG. 11 shows an operation of a single-EPM key structure configuration with MR material, according to certain embodiments.
Figure 12:
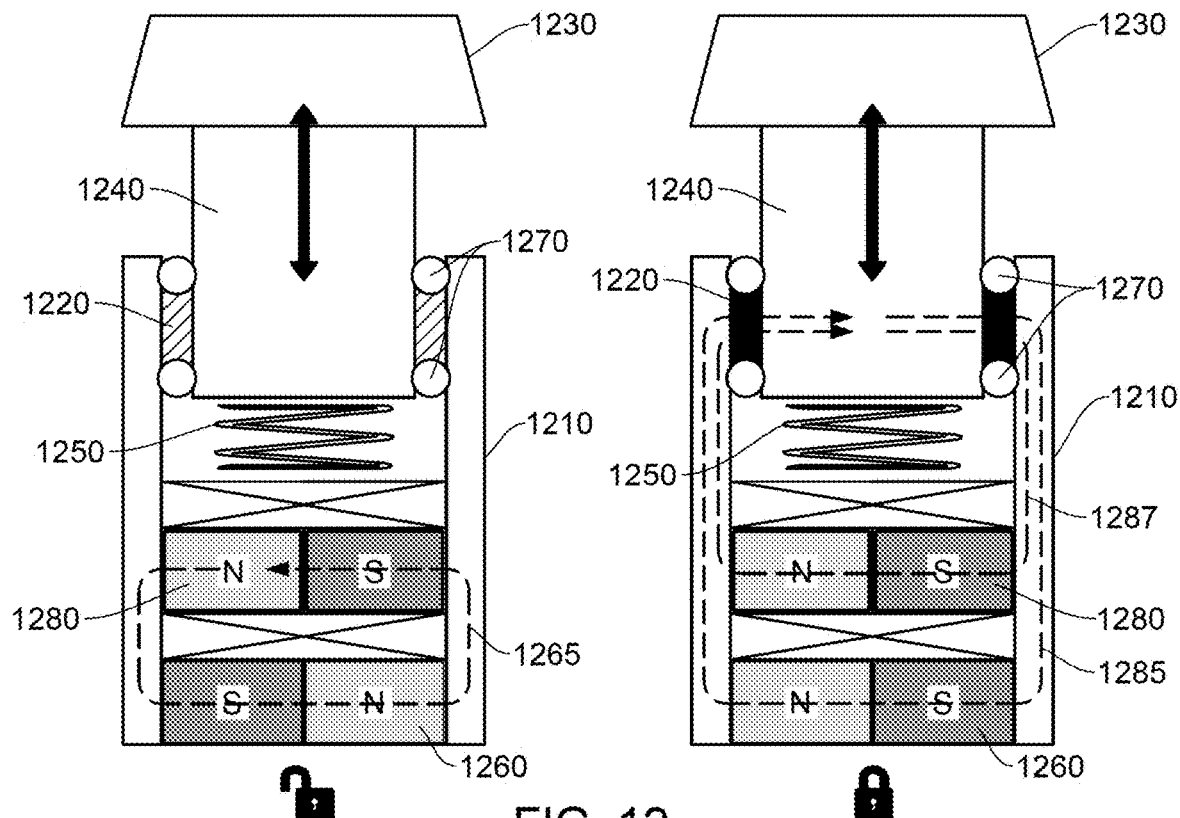
FIG. 12 shows an operation of a dual-EPM key structure configuration with MR material, according to certain embodiments.

EPM 1060 can be set to generate a magnetic field having any suitable polarity and intensity. As shown in FIGS. 11 and 12, the magnetic field can be conducted through components of key structure 1000 to direct the magnetic field to MR materials 1020 and control its corresponding viscosity to create a resistance (e.g., a braking) to the movement of key plunger 1040 for its 1 DOF along the linear travel path. For instance, key frame 1010 and key plunger 1040 can be comprised of a ferrite material, which can readily conduct the magnetic field of EPM 1060 through MR material 1020, as shown in the following embodiments. Some embodiments may employ a single EPM (see, e.g., FIGS. 10-11) or multiple EPMs (see, e.g., FIG. 12), but can function in a similar manner where the viscosity of MR material is changed dynamically to affect a resistance profile for the key structure as it is depressed and released. Biasing mechanism 1050 may be a spring, dome structure, or any suitable implementation that provides a restoring force to key plunger 1040. Some embodiments may not include a biasing mechanism. Key structure 1000 may include other features not shown to prevent obfuscation of the primary novelty presented herein. For instance, actuators (to detect a button press), position sensors (e.g., to detect a position of key plunger 1040 relative to key frame 1010), circuitry, etc., and the like may be included, as would be appreciated by one of ordinary skill in the art with the benefit of this disclosure. Some examples of a position sensor can include Hall Effect sensors, inductive-based sensors, light-based sensors and capacitive-based sensors. Furthermore, some embodiments may not include ferrite materials to conduct the magnetic field and instead may rely on a non-conducted magnetic field (e.g., strong enough to omni-directionally emit from EPM 1060 and pass through and affect the viscosity of MR material 1020) to control the resistance profile of key structure 1000. In some embodiments, a similar structure may be used in other applications including shock absorbing implementations or other structures with a similar linear traversal of elements with respect to each other.

Some typical embodiments of a key structure for an input device can include a key frame, a key plunger configured to linearly traverse along a travel path within the key frame with one degree-of-freedom of movement, EPM assembly coupled to the key frame and including at least one permanent magnet configured to generate a magnetic field and a magnetizing assembly configured to set the magnetic field generated by the permanent magnet, MR material disposed within the key frame and coupled to the key plunger, the MR material having a viscosity that changes based on the magnetic field, where the MR material is configured to provide a resistance to the linear traversal of the key plunger along the travel path within the key frame, the resistance based on the viscosity of the MR material. The key frame and/or the key plunger can be comprised of ferrite and configured to conduct and couple the magnetic field generated by the permanent magnet to the MR material. Some embodiments may include a biasing mechanism (e.g., spring, dome structure), where the travel path of the key plunger includes a first position corresponding to the key plunger being in an undepressed state, and a second position corresponding to the key plunger being in a fully depressed state, where the biasing mechanism provides a restoring force to the key plunger that causes the key plunger to return to the second position. The key can include a plurality of o-rings or other containment structures configured to form a sealed reservoir cavity between the key frame and the key plunger, wherein the MR material is a fluid that is contained within the sealed reservoir cavity.

Continuing the general description of typical embodiments of a key structure, the key can be configured to operate in a plurality of modes of operation including a first mode of operation where the magnetizing assembly sets the magnetic field of the permanent magnet such that the MR material has a first viscosity that provides a first resistance to the linear traversal of the key plunger along the travel path, and a second mode of operation where the magnetizing assembly sets the magnetic field of the permanent magnet such that the MR material has a second viscosity that provides a second resistance to the linear traversal of the key plunger along the travel path, where the second resistance is greater than the first resistance. Some embodiments may employ a second permanent magnet configured to generate a second magnetic field, where in the first mode of operation, the permanent magnet and the second permanent magnet are magnetized such that a path of magnetic conduction of their corresponding magnetic fields is contained by the permanent magnet and second permanent magnet and the magnetic field does not pass through the MR material, and in the second mode of operation, the permanent magnet and the second permanent magnet are magnetized such that the path of magnetic conduction of their corresponding magnetic fields pass through the MR material. In some cases, in the first mode of operation, the EPM may be set to have no magnetic field, a low intensity magnetic field, etc., such that the magnetic field does not pass through the MR material, resulting in the MR material having a low viscosity and minimal resistance to a movement of the key plunger with respect to the key frame. In some cases, in the second mode of operation, the EPM may be set to have a high intensity magnetic field that passes through the MR material, resulting in the MR material having a high viscosity (e.g., maximum resistance) to a movement of the key plunger with respect to the key frame. The first and second modes of operation can be configured to control the MR material in any suitable manner, and additional modes of operation are possible, as would be appreciated by one of ordinary skill in the art with the benefit of this disclosure.

The key structure can further include one or more processors (which can be external to the key structure), a sensor configured to detect a position of the key plunger along the travel path within the key frame, the sensor controlled by the one or more processors, wherein the one or more processors are configured to cause the magnetizing assembly to dynamically set the magnetic field generated by the permanent magnet to cause the viscosity of the MR material to change according to a resistance profile based on the position of the key plunger along the travel path. Some embodiments may include a switch configured to generate input data indicative of a key press event when the key plunger is depressed beyond a threshold position along the travel path. The switch can be controlled by and/or be communicatively coupled to the one or more processors. In some aspects, the key structure can be part of a computer peripheral device, input device, or other suitable electronic device.

FIG. 11 shows an operation of a single-EPM key structure configuration 1000 with MR material, according to certain embodiments. For purposes of explanation, key structure 1000 is the same as shown in FIG. 10. When EPM 1060 is set to have a magnetic field of a polarity and intensity, the magnetic field 1165 is conducted through the key structure from the north pole EPM 1060 through the ferrite frame 1010, through MR material 1020, through ferrite key plunger 1040, through MR material 1020 on the other side, through the other side of ferrite key frame 1010, and to the south pole of EPM 1060. It should be understood that FIGS. 10-12 show a simplified cross-sectional view and the actual path that a magnetic field would take through the key structure includes a three-dimensional path, as would be appreciated by one of ordinary skill in the art with the benefit of this disclosure. Thus, the EPM assembly (EPM 1060 and corresponding circuit and coil (not shown)) control the density of the magnetic field through the MR materials (fluid) via the ferrite components described above, which thereby controls the friction between key plunger 1040 and MR material 1020 and thus the resistance profile of the key structure. While allowing the resistance profile customizability, this approach (using EPM with MR material) has a significant advantage compared to fully active solutions (e.g., electromagnets with MR) in that electric power is consumed only to change the overall key force constant (e.g., achieve by a short current pulse of a particular amplitude and duration), and during the extremely short burst of power to achieve a force bump, as shown and described below at least with respect to FIG. 13. Exact implementation can vary and one of ordinary skill in the art with the benefit of this disclosure would appreciate the many modifications, variations, and alternative embodiments thereof.

In some embodiments, the ferrite material design can also be adjusted to have magnetic field variation throughout the motion (e.g., with an EPM field change), which may cause a peak or "hole" of force through the motion without having to use a coil current spike to create a "haptic bump," as described below with respect to FIG. 13. In such designs the ferrite wall may not be flat and can have a variation of distance with the key as it is moved up and down. When the distance is shorter, the intensity of the magnetic field can increase locally. One of ordinary skill in the art with the benefit of this disclosure would appreciate the many modifications, variations, and alternative embodiments thereof. In further embodiments, the selection of the mode of operation can be made prior to the activation where the mode is active during the full stroke of the key, or during its activation the mode may change depending on the position of the key during its operation.

FIG. 12 shows an operation of a dual-EPM key structure configuration 1200 with MR material, according to certain embodiments. Key structure 1200 is in an "unlocked" position where the key can freely move up and down according to a resistance profile with a minimum resistance provided by MR material 1220. Key structure 1200 is in a "locked" position wherein the key is locked in place due to a high viscosity of MR material 1220 caused by a magnetic field pass through. Key structure 1200 can be similar to key structure 1000 in operation except for the inclusion of an additional EPM 1260. Key structure 1200 includes a key frame 1210, MR material 1220, a key plunger 1240, a key cap 1230 coupled to key plunger 1240, a biasing mechanism 1250, first EPM 1260, second EPM 1280, and o-rings 1270. EPMs 1260 and 1280 may each include magnetizing assembly (e.g., electric circuit and coil) to set their corresponding magnetic field. In some aspects, a single magnetizing assembly or separate magnetizing assemblies can be used to set a magnetic field for EPM 1260 and 1280. In operation, key structure 1200 is configured to be pressed by a user, as a typical key would be pressed on a keyboard. A user would typically press keycap 1230 (shown in an initial position at rest) with a downward force, causing key cap 1230 and key plunger 1240 to linearly traverse downward along a travel path relative to key frame 1210, and the biasing mechanism 1250 would provide a restoring force that causes key plunger 1240 and keycap 1230 to move back upward (e.g., after the downward force is remove) and return to the initial position. Typically, the upward/downward movement is linear and mechanically along one degree-of-freedom (DOF), although non-linear paths are possible. O-rings 1270 are configured to form a sealed reservoir cavity between key frame 1210 and key plunger 1240, and MR material 1220 (e.g., a fluid) is contained within the sealed reservoir cavity. As key plunger 1240 moves up and down within key frame 1210, portions of an outer surface of key plunger 1240 remain in contact with MR material 1220 as shown and similar to the embodiments of FIGS. 10-11.

Key structure 1200 differs from key structure 1000 in that two EPMs are used to control the viscosity and corresponding friction imparted on key plunger 1240 by MR material 1220. For example, in some embodiments the key structure 1200 can be in an "off" or "unlocked" state (e.g., where MR material 1220 is not subjected to a magnetic field and has a minimum viscosity) when EPM 1260 and EPM 1280 are magnetized with opposite polarities such that their corresponding magnetic fields 1265 pass through each other as shown. That is, the magnetic field from the north pole of EPM 1280 is conducted through key frame 1210 to the south pole of EPM 1260, continuing out of the north pole of EPM 1260, through the other side of key frame 1210 and to the south pole of EPM 1280 and completing the circuit, as shown in the left figure. In some embodiments, key structure 1200 can be in an "on" or "locked" state, when both EPM 1060 and EPM 1080 are magnetized to have a same polarity such that their corresponding magnetic fields (1285 and 1287, respectively) are conducted through key structure 1220 as shown. That is, the conduction path for both EPM 1260 and EPM 1280s magnetic fields pass out of their north poles, through ferrite frame 1210, through MR material 1220, through ferrite key plunger 1240, through MR material 1220 on the other side, through the other side of ferrite key frame 1210, and to the corresponding south poles of EPM 1260 and EPM 1280. In some embodiments, each EPM 1060, 1080 can be configured by the magnetizing assembly to have any suitable magnetic field to achieve any desired resistance profile.

Figure 13:
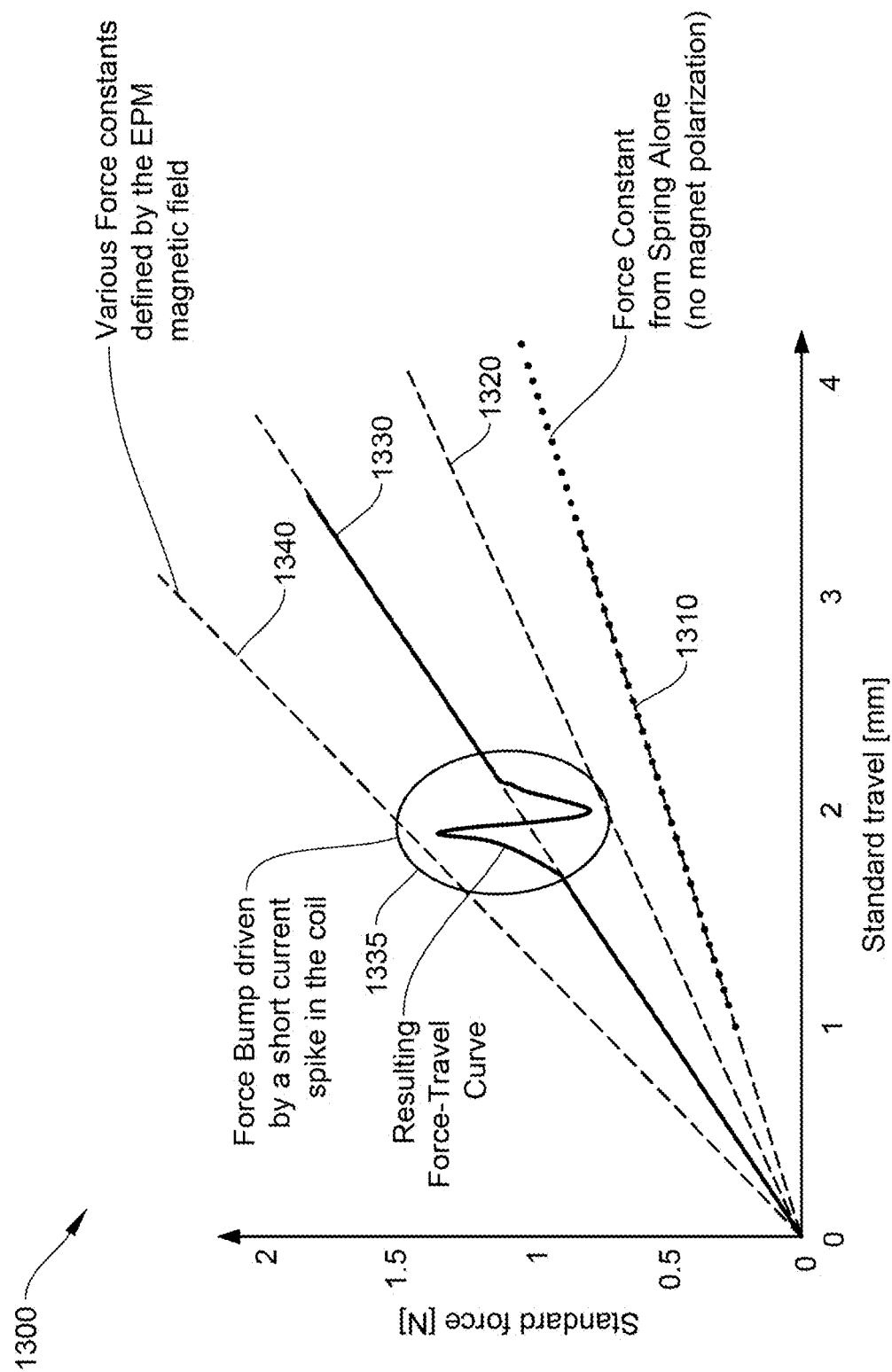
FIG. 13 shows a graph depicting a number of plots for various force profiles defined by an EPM magnetic field, according to certain embodiments.

FIG. 13 is a graph 1300 showing a number of plots for various force profiles for a keyboard key defined by an EPM magnetic field, according to certain embodiments. For the sake of explanation, graph 1300 may correspond to a performance characteristic (e.g., force/displacement curve defining a resistance profile) of key structure 1200, although any key structure utilizing EPM and MR material can be used, as would be appreciated by one of ordinary skill in the art with the benefit of this disclosure. Referring to FIG. 13, graph 1300 plots a force needed to depress the key structure over a range of displacement values. In some embodiments, the plots of graph 1300 show the force response curve as the key is depressed and not necessarily a representation of the force curve when the key is released. Plot 1310 shows a linear force constant provided by a biasing mechanism (1250) alone with no appreciable additional friction (e.g., resistance) provided by MR material 1220 to the depression of key structure 1200. That is, when MR material 1220 is not subjected to a magnetic field (or a magnetic field of negligible intensity), MR material 1220 has a minimum (or low) viscosity and provides a minimum (or low) resistance to the movement of key plunger 1240 through MR material 1220. The biasing mechanism provides both a small resistance during the keystroke and a restoring force to cause the key plunger to return to its initial position after the key structure is released (e.g., the user removes or reduces a downward force on the keycap).

When the EPM(s) are magnetized to have a particular polarity and magnetic field intensity (e.g., via a short current pulse of a corresponding amplitude and duration, with no power requirement after the short current pulse for the EPM to maintain the magnetic field) that is conducted or directed through MR material 1220, the MR material increases in viscosity and provides a corresponding increase in resistance to the key plunger's movement through the MR material relative to the key frame, as described above. In cases where the magnetic field is constant (e.g., the EPM(s) magnetic field are set once and maintained), the additional resistance provided by the MR material to the key plunger will linearly increase as the key displacement increases. For example, plots 1320 and 1340 show various force constants defined by the EPM magnetic field. As the key is depressed, the force required to further depress the key increases in a linear fashion. Plot 1340 shows that the EPM magnetic field has a higher intensity as compared to plot 1320.

Figure 14A:
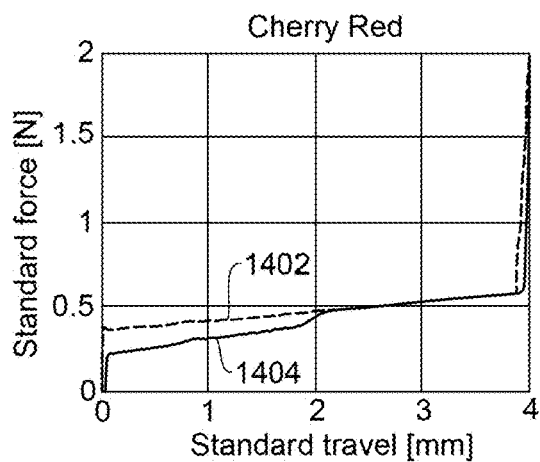
FIGS. 14A-14C shows various key resistance profiles, according to certain embodiments.
Figure 14B:
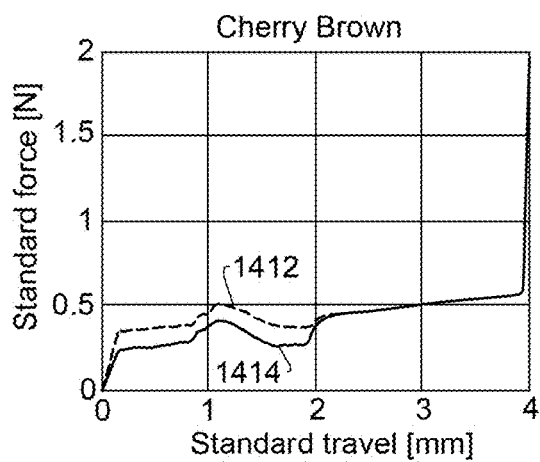
Figure 14C:
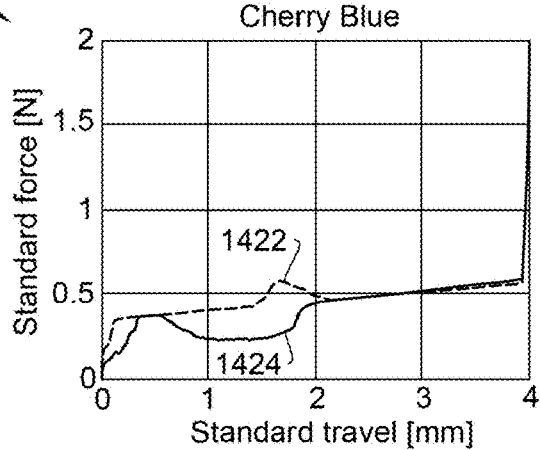

In some cases, more complex resistance profiles (force curves) can be achieved by incorporating non-linear behaviors that simulate mechanically-based key structure systems that are commonly used in contemporary mechanical key systems. For instance, plot 1330 shows a force constant with a force bump that is caused by a short current spike that drives the coil. This is indicative of a more "active" control of the resistance profile of the key structure, rather than a "passive" control where the EPM is initially set to have a particular magnetic field that provides a force constant through the full displacement of the key structure, as shown in plots 1320 and 1340. In an active control scenario, the EPM may be magnetized differently based on the position of the key plunger relative to the key frame. Referring back to plot 1330, the force vs. displacement curve is linear until a displacement sensor detects that the key plunger reaches a certain displacement and causes the EPM to change its magnetization to create the force bump effect. The resistance profile can be configured to change in any suitable way with one or more force bumps, force constants, or other effects at different locations along the displacement of the key structure, as would be appreciated by one of ordinary skill in the art with the benefit of this disclosure. This presents an unlimited number of resistance profile options that would not be possible in purely mechanical key structures, and would require a significant power draw in electromagnet-based embodiments. Thus, certain embodiments can replicate various key characteristics, such as force and travel, to match well known contemporary resistance profiles, such as linear profiles (e.g., Cherry Red—as shown in FIG. 14A with linear profiles 1402 and 1404), tactile profiles (e.g., Cherry Brown—as shown in FIG. 14B, with tactile profiles 1412, 1414), "clicky" profiles (e.g., Cherry Blue—as shown in FIG. 14C, with clicky profiles 1422 and 1424), or any other desired resistance profile. One of ordinary skill in the art with the benefit of this disclosure would appreciate the many modifications, variations, and alternative embodiments thereof. In some embodiments, a non-active, non-parametric based approach can be incorporated with or in replacement of the various embodiments described above. An example of a non-active, non-parametric based approach includes shaping the ferrite components (e.g., housing, plunger, etc.) so that as the key is depressed, the conduction of the magnetic field changes to create a particular profile (e.g., a tactile "bump"), as described above.

Figure 15:
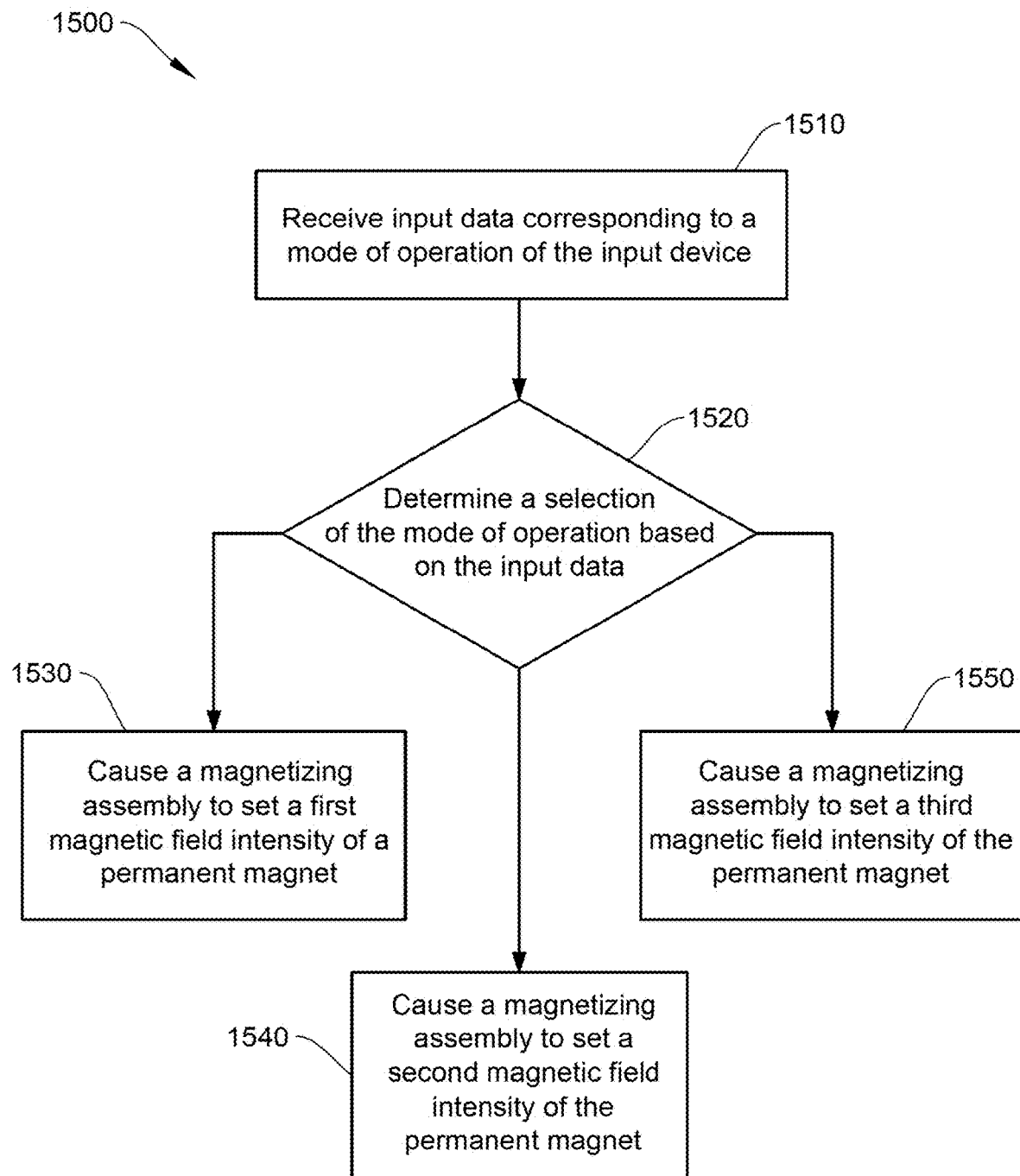
FIG. 15 is a simplified flow chart showing aspects of a method for controlling a performance characteristic of a key structure using an electropermanent magnet and MR material, according to certain embodiments.

FIG. 15 is a simplified flow chart showing aspects of a method 1500 for controlling a performance characteristic (e.g., resistance profile) of a key structure using an electropermanent magnet and MR material, according to certain embodiments. Method 1500 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1500 can be performed by: aspects of processor(s) 210 and/or other systems, blocks, or modules of system 200; processor(s) 302 and/or other systems, blocks, or modules of system 300; or a combination thereof.

At operation 1510, method 1500 can include receiving input data corresponding to a mode of operation of the input device, the mode of operation corresponding to a control of a movement of a moveable element of the input device along one degree-of-freedom, according to certain embodiments. In some aspects, the one degree-of-freedom may correspond to a linear movement of the moveable element, and wherein the moveable element is one of: a button depressible along the linear one degree-of-freedom, a key depressible along the linear one degree-of-freedom, a trigger actuable along the linear one degree-of-freedom, or a support structure configured to support the input device in a plurality of configurations, the support structure extendable and retractable along the linear one degree-of-freedom. One of ordinary skill in the art with the benefit of this disclosure would appreciate the many modifications, variations, and alternative embodiments thereof. In some implementations, the one degree-of-freedom may correspond to a rotational movement of the moveable element, where the moveable element is one of: a scroll wheel rotatable along the rotational one degree-of-freedom, a trackball rotatable along the rotational one degree-of-freedom, a knob rotatable along the rotational one degree-of-freedom, a hinge rotatable along the rotational one degree-of-freedom, a steering wheel rotatable along the rotational one degree-of-freedom, or a pedal depressible along the rotational one degree-of-freedom. One of ordinary skill in the art with the benefit of this disclosure would appreciate the many modifications, variations, and alternative embodiments thereof.

At operation 1520, method 1500 can include determining a selection of the mode of operation based on the input data, according to certain embodiments.

At operation 1530, in response to the input data corresponding to a first mode of operation, method 1500 can include causing a magnetizing assembly to set a first magnetic field intensity of a permanent magnet (EPM) that controls a viscosity of MR material coupled to the moveable element, the MR material under the first magnetic field intensity providing a first resistance to the movement of the moveable element along the one degree-of-freedom.

At operation 1540, in response to the input data corresponding to a second mode of operation, method 1500 can include causing a magnetizing assembly to set a second magnetic field intensity of the permanent magnet, the MR material under the second magnetic field intensity providing a second resistance to the movement of the moveable element along the one degree-of-freedom, wherein the second magnetic field intensity is higher than the first magnetic field intensity. In some embodiments, in the first mode of operation the MR material has a minimum viscosity, and in the second mode of operation the MR material has a maximum viscosity.

At operation 1550, in response to the input data corresponding to a third mode of operation, method 1500 can include causing a magnetizing assembly to set a third magnetic field intensity of the permanent magnet, the MR material under the third magnetic field intensity providing a third resistance to the movement of the moveable element along the one degree-of-freedom, wherein the third magnetic field intensity is higher than the first magnetic field intensity and less than the second magnetic field intensity.

It should be appreciated that the specific steps illustrated in FIG. 15 provide a particular method 1500 for controlling a performance characteristic of a key structure using an electropermanent magnet and MR material, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Multiple-Key Implementations

In some embodiments, multiple keys can be controlled by a single EPM system, rather having individual EPM systems disposed in every key structure. In some cases, a single EPM assembly can control an entire keyboard (e.g., 101 keys) or any size keyboard or subset thereof by using a key frame common to each individual key as a magnetic field bus system. For instance, an EPM assembly may set a magnetic field of one or more permanent magnets to a particular magnetic field polarity and intensity. That magnetic field may be conducted through the key frame (e.g., typically comprised of ferrite), which can route the magnetic field to pass through multiple keys with MR material and back to the permanent magnet to complete the circuit. A non-limited example of such an implementation is described below.

Figure 16:
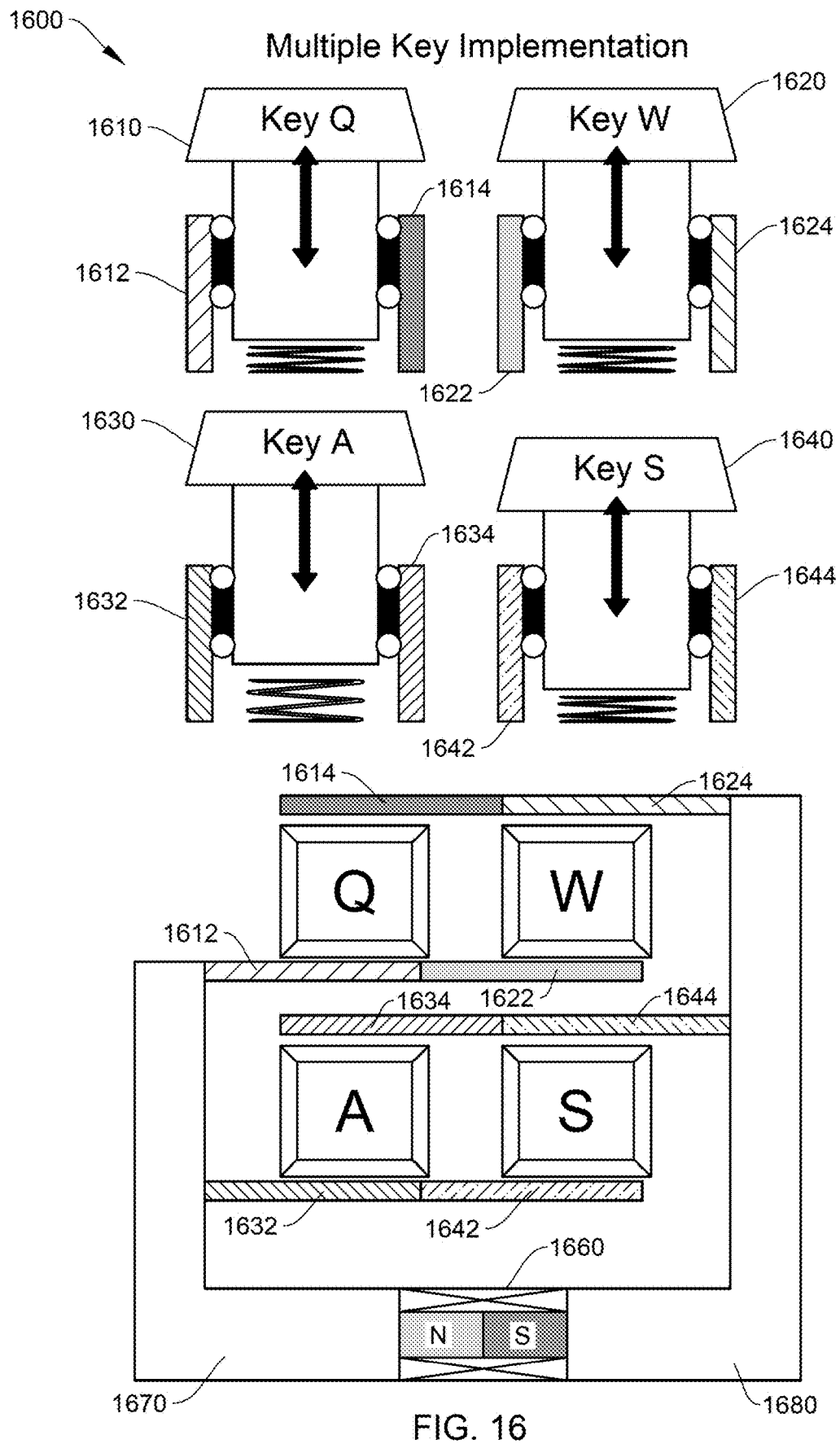
FIG. 16 shows a multiple key implementation for controlling a performance characteristic of multiple key structures using an electropermanent magnet and MR material, according to certain embodiments.

FIG. 16 shows a multiple key implementation for controlling a performance characteristic (e.g., resistance profile) of multiple key structures 1600 using an electropermanent magnet and MR material, according to certain embodiments. Four individual key structures are shown at the top of FIG. 16 in a side elevation view, and the same key structures are shown disposed in a common keyboard key frame and in a top plan view at the bottom of FIG. 16 showing how the keys are arranged with respect to each other, and how aspects of the key frame and EPM assembly are configured therewith. Each key structure operates similarly to the key structures of FIGS. 10-12 in that they include a key plunger, a key cap, MR material disposed within a cavity defined by o-rings configured between a key frame and the key plunger, and a biasing mechanism to provide a restoring force to the key plunger. The key structures differ in that they do not have an on-board EPM assembly for each key. An external EPM assembly 1660 provides a magnetic field (referred to herein as a "global magnetic field" to convey that the magnetic field affects more than one key structure) that is conducted through the entire keyboard key frame (or a portion thereof) and routed to pass through the individual keys and the corresponding MR material to affect the resistance profile of the individual keys, similar to the single-key embodiments described above. Further, the key frame architecture is different in the multi-key arrangement as described below.

Referring to the top plan view of FIG. 16, the key frame can be configured to be non-continuous to enable the conduction of the EPMs magnetic field in a circuit that passes through the key structures. More specifically, a first portion 1670 of a key frame 1670 can be comprised of ferrite and coupled to one side of the permanent magnet of the EPM assembly 1660 (a first pole), and a second portion 1680 of the key frame can be comprised of ferrite and coupled to the opposite side of the permanent magnet of the EPM assembly (a second pole). The first portion 1670 of the key frame can conduct the magnetic field (e.g., facilitated by the ferrite) from, e.g., the north pole of the permanent magnet of the EPM assembly 1660 and couple the magnetic field through each individual key and on to the second portion 1680 of the key frame on to the south pole of the permanent magnet to complete the magnetic circuit. Similar to the EPM magnet in FIG. 4B, the ferrite components facilitate a containment of the magnetic field to substantially within the circuit of ferrite components (e.g., key frame, key plunger, etc.), as opposed to an external omni-directional type of transmission, as would be the case with a typical permanent bar magnet and as shown in FIG. 4A. In some cases, the key frame can be configured to couple to (or be in close proximity to) each key, or ferrite conduits may be used to couple the key frame to each key structure.

Referring back to the side elevation views on the top of FIG. 16, the four individual key structures include key structure 1610 (key 'Q') with a section 1612 of key frame portion 1670 and a section 1614 of key frame 1680, key structure 1620 (key 'W') with a section 1622 of key frame portion 1670 and a section 1624 of key frame 1680, key structure 1630 (key 'A') with a section 1632 of key frame portion 1670 and a section 1634 of key frame 1680, and key structure 1640 (key 'S') with a section 1642 of key frame portion 1670 and a section 1644 of key frame 1680. In operation, when EPM assembly 1660 is set to have no magnetic field, or a negligible magnetic field that does not materially affect the viscosity of the MR material of each key structure, each key structure may operate according to a resistance profile that is primarily dominated by the resistance of the biasing mechanism (see, e.g., plot 1310), because the MR material will typically be at a minimal or relatively low viscosity and provide little resistance to movement of the key plunger up and down relative to the key frame, as described in the various embodiments above (see, e.g., FIG. 10). When EPM assembly 1660 is set to have a magnetic field that is strong enough to materially change the viscosity of the MR material of each key structure, the magnetic field can be conducted throughout the multi-key structure to cause each key to change their corresponding resistance profile.

The path of the magnetic field when conducted, e.g., through a ferrite-comprised key frame and key plunger can start from north pole of EPM assembly 1660, through key frame 1670, through each key structure 1610-1640, through key frame 1680 and back to the EPM assembly 1660 at the south pole. For key Q, the magnetic field passes from key frame 1670 to section 1612; through the MR material, key plunger, and MR material again; out through section 1614, section 1624, and then key frame 1680 to the south pole of EPM assembly 1660. For key W, the magnetic field passes from key frame 1670 to section 1612 then section 1622; through the MR material, key plunger, and MR material again; out through section 1624, and then key frame 1680 to the south pole of EPM assembly 1660. For key A, the magnetic field passes from key frame 1670 to section 1632; through the MR material, key plunger, and MR material again; out through section 1634, section 1644, and then key frame 1680 to the south pole of EPM assembly 1660. For key S, the magnetic field passes from key frame 1670 to section 1632 then section 1642; through the MR material, key plunger, and MR material again; out through section 1624, and then key frame 1680 to the south pole of EPM assembly 1660. In the interests of explaining some of the basic novel concepts presented herein, the key structures can be considered to be identical. However, it should be understood that each key may have a different amount, configuration, type of MR material; a different location/configuration of the key frame relative to the MR material; or different materials of the key frame, key plunger; a different number of EPM assemblies and conduction paths, etc., to achieve a different resistance profile in response to the global magnetic field. Any number of key structures are possible. One of ordinary skill in the art with the benefit of this disclosure would appreciate the many modifications, variations, and alternative embodiments thereof.

Pedal Implementations

Pedal assemblies that operate with host computing devices (e.g., gaming consoles, laptop/desktop computers, etc.) have substantially improved over the years with contemporary pedal assemblies often including various biasing mechanisms (e.g., mechanical springs, compressible/collapsible materials, etc.) to provide a particular resistance profile. An exemplary implementation is described in application Ser. No. 16/731,875 filed on Dec. 31, 2019, which is hereby incorporated by reference in its entirety for all purposes. In some contemporary pedal assemblies, changing the resistance profile of the pedal assembly typically involves a physical process of disassembly and reassembly to change out a biasing mechanism. Aspects of the present can dynamically change a resistance profile of one or more pedal assemblies (e.g., via software controlled by processors 210, 302, or a combination thereof) in real-time without requiring any disassembly or reassembly by using an EPM assembly with MR material to achieve any of a myriad of resistance profiles, according to certain embodiments. The embodiments described herein include a pedal assembly (e.g., FIG. 17) that can utilize an EPM and MR based piston-type assembly including implementations that can control the piston head directly (see, e.g., FIG. 18) or indirectly through a side path control (see, e.g., FIG. 18), however one of ordinary skill in the art with the benefit of this disclosure would appreciate that other implementations are possible (e.g., multiple pistons, side paths, etc.) that, at a basic level, control an ability of a piston to travel through a piston housing by controlling the viscosity of MR material contained with the piston housing that the piston traverses through, as further described in the non-limiting embodiments presented below.

Figure 17:
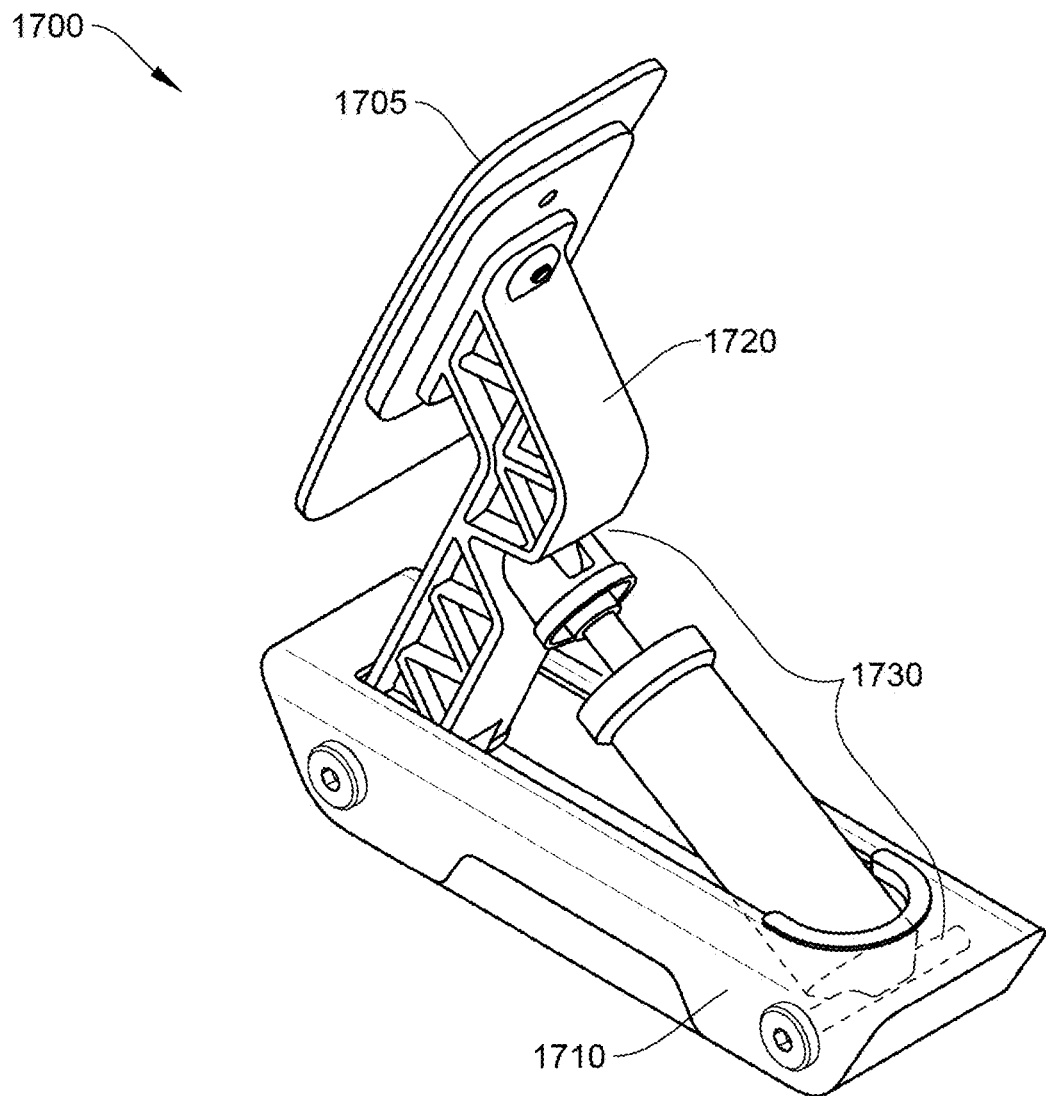
FIG. 17 shows a pedal assembly that uses an EPM assembly combined with an MR material to control a performance characteristic, according to certain embodiments.

FIG. 17 shows a pedal assembly 1700 that uses an EPM assembly combined with an MR material to control a performance characteristic (e.g., resistance profile), according to certain embodiments. Pedal assembly 1700 can include a base platform 1710, a pedal arm 1720, and a piston assembly 1740. Pedal arm 1720 may be rotatably coupled to base platform 1710 (also referred to as a "pedal base") at a first location such that pedal arm 1720 can move relative to base platform 1710 along a rotational path (e.g., an axis of rotation). A pedal platform 1705 can be coupled to pedal arm 1720 to receive a user's foot. Piston assembly 1740 can couple pedal arm 1720 to base platform 1700 at a second location. In some aspects, piston assembly 1740 can include a piston housing and a piston disposed in the piston housing and configured to linearly traverse along a longitudinal path within the piston housing. Piston assembly 1740 can further include an EPM assembly which may have permanent magnet(s) configured to generate a magnetic field, a magnetizing assembly (e.g., a coil and corresponding circuit) configured to set the magnetic field generated by the permanent magnet, and MR material having a viscosity that is contained within the piston assembly and configured such that the piston travels through the MR material as it linearly traverses along the longitudinal path within the piston housing, where the MR material is configured to provide a resistance (e.g., a dampening effect) to the linear traversal of the piston along the longitudinal path based on the viscosity of the MR material. The piston moves up and down within the piston housing as a typical piston head would, but with the movement being affected (e.g., impeded) by the viscosity of the MR materials therein. Although not shown, pedal assembly 1700 can include a biasing mechanism (e.g., spring) working in conduction with the piston assembly to provide a restoring force to bring the pedal assembly back to an initial position, similar to the operation of the key assemblies described above, and as would be appreciated by one of ordinary skill in the art with the benefit of this disclosure.

Figure 18:
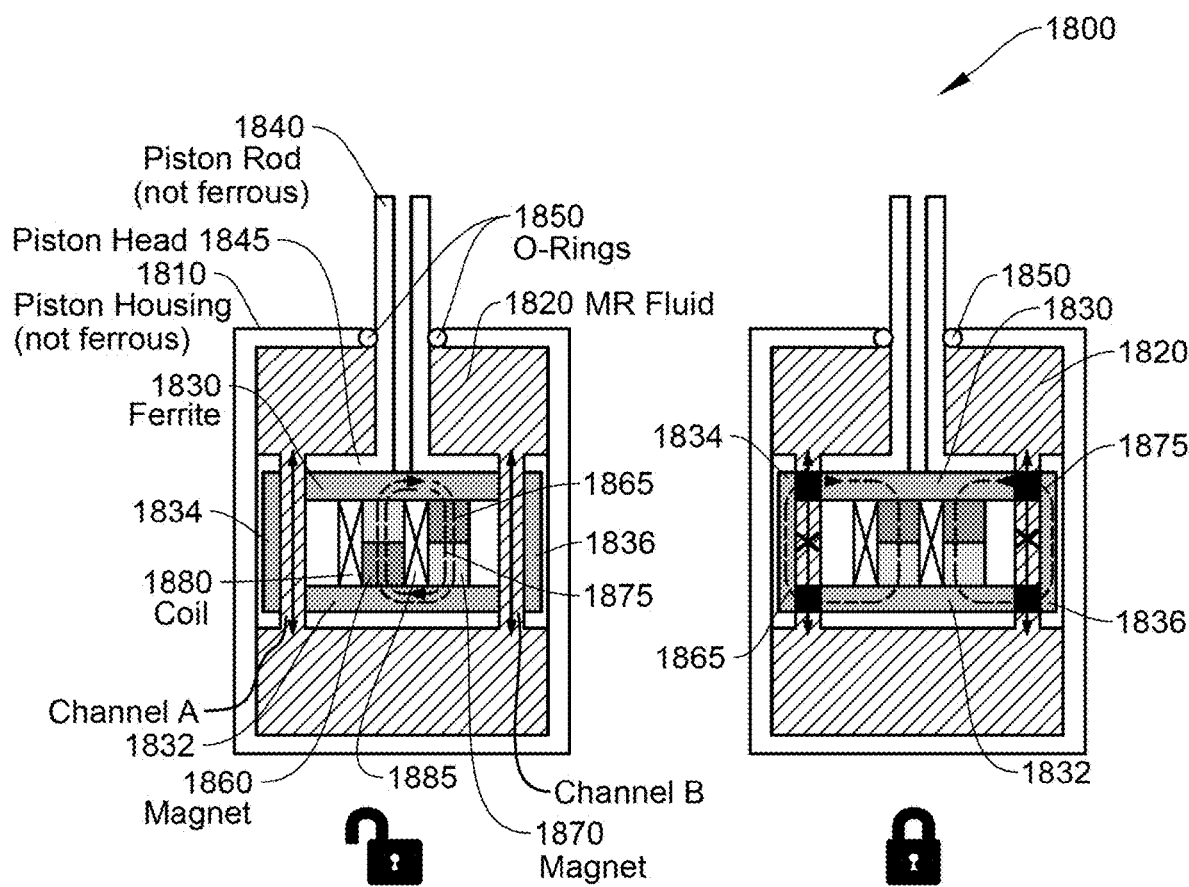
FIG. 18 shows a pedal dampening system configured to control a performance characteristic of a pedal system, according to certain embodiments.

FIG. 18 shows a pedal dampening system 1800 configured to control a performance characteristic of a pedal system, according to certain embodiments. Pedal dampening system 1800 includes a piston housing 1810, MR material (a fluid) 1820 contained within piston housing 1810 (e.g., due, in part, to o-rings 1850), and a piston including a piston rod 1840 and piston head 1845 that traverses linearly along a longitudinal path within piston housing 1810 (e.g., typically as a user depresses and releases a pedal platform of the pedal assembly). An EPM assembly is configured within piston head 1845 and includes two magnets 1860, 1870 with corresponding coils 1880, 1885, respectively. The electrical circuit and controlling processor(s) (e.g., one or more processors 210, 302, etc.—not shown) control a current through coils 1880, 1885 to set the magnetic fields generated by magnets 1860 (magnetic field 1865) and 1870 (magnetic field 1875). Piston head 1845 also includes ferrite sections 1830, 1832, configured on the poles of magnets 1860, 1870 and ferrite sections 1834 and 1836 configured on piston housing 1810 (the piston head itself may or may not be ferrous). The ferrite sections can be configured to conduct the magnetic fields of magnets 1860, 1870. Ferrite sections 1830 can also be configured on piston housing 1810 where the space between the piston housing and piston head are channels A and B that the MR material can flow though. When the MR material has a low viscosity (e.g., not exposed to a magnetic field), MR material 1820 can be displaced through channels A and B with minimal resistance as piston head 1845 moves within piston housing 1810. When MR material 1820 has a high viscosity (e.g., exposed to a magnetic field), MR material 1820 cannot be displaced through channels A and B, or displacement may be subject to a high resistance, which can define the resistance profile of the pedal assembly.

In the left side cross-sectional view, pedal dampening system 1800 is in an "unlocked" configuration where the EPM assembly is configured such that magnets 1860, 1870 have opposite polarities that causes their corresponding magnetic fields 1865, 1875 to be conducted directly to each other, which is facilitated by portions of ferrite sections 1830, 1840, as shown. In this configuration, the magnetic field is contained with piston head 1845 and does not come into contact with the surrounding MR material 1820. As such, the viscosity of MR material 1820 is low and the piston can freely move within the piston housing with a small or minimal resistance. In such cases, the resistance profile provided by the pedal dampening system may be largely defined by a biasing mechanism configured to return the pedal assembly to an initial position, and the resistance provided by MR material 1820 may be negligible.

In the right side cross-sectional view, pedal dampening system 1800 is in a "locked" configuration where the EPM assembly is configured such that magnets 1860, 1870 have the same polarities, which causes their corresponding magnetic fields 1865, 1875 to be conducted away from each other and through a circuit that passes through MR material 1820. More specifically, magnetic field 1865 passes from the north pole of magnet 1860, through ferrite section 1840, through channel A of MR material 1820, through ferrite section 1834, again through channel A of MR material 1820, through ferrite section 1830 and to the south pole of magnet 1860, as shown. In a similar but opposite manner, magnetic field 1875 passes from the north pole of magnet 1870, through ferrite section 1840, through channel B of MR material 1820, through ferrite section 1836, again through channel B of MR material 1820, through ferrite section 1830 and to the south pole of magnet 1870. Magnetic fields 1865, 1875 each pass through some of MR material 1820 in channels A and B, respectively, which causes MR material 1820 (at least in the areas where the magnetic fields pass through it) to increase in viscosity, which resists movement of piston head 1845 through piston housing 1810, thereby generating a resistance profile. The magnitude and polarity of the magnetic fields can be adjusted in real-time to change the resistance profile that can be based on software inputs (e.g., in-game events that trigger changes in a pedal resistance), positional data (e.g., changing the resistance profile based on a position of piston head 1845 within piston housing 1810, or other basis, and in any combination thereof. More or fewer magnets and corresponding magnetic fields may be used. Any resistance profile and its corresponding strength of resistance can be set in any manner, as would be appreciated by one of ordinary skill in the art with the benefit of this disclosure. In some embodiments, a biasing mechanism (not shown) can be included to return the piston head back up to the top position (like a mouse or keyboard button). In such cases, the biasing mechanism (e.g., a spring) may be placed between the bottom of the piston head and the bottom of the piston housing, or alternatively between the top of the piston head and the top of the piston housing, around the piston shaft. One of ordinary skill in the art with the benefit of this disclosure would appreciate the many modifications, variations, and alternative embodiments thereof. In another embodiment, the biasing mechanism.

Figure 19:
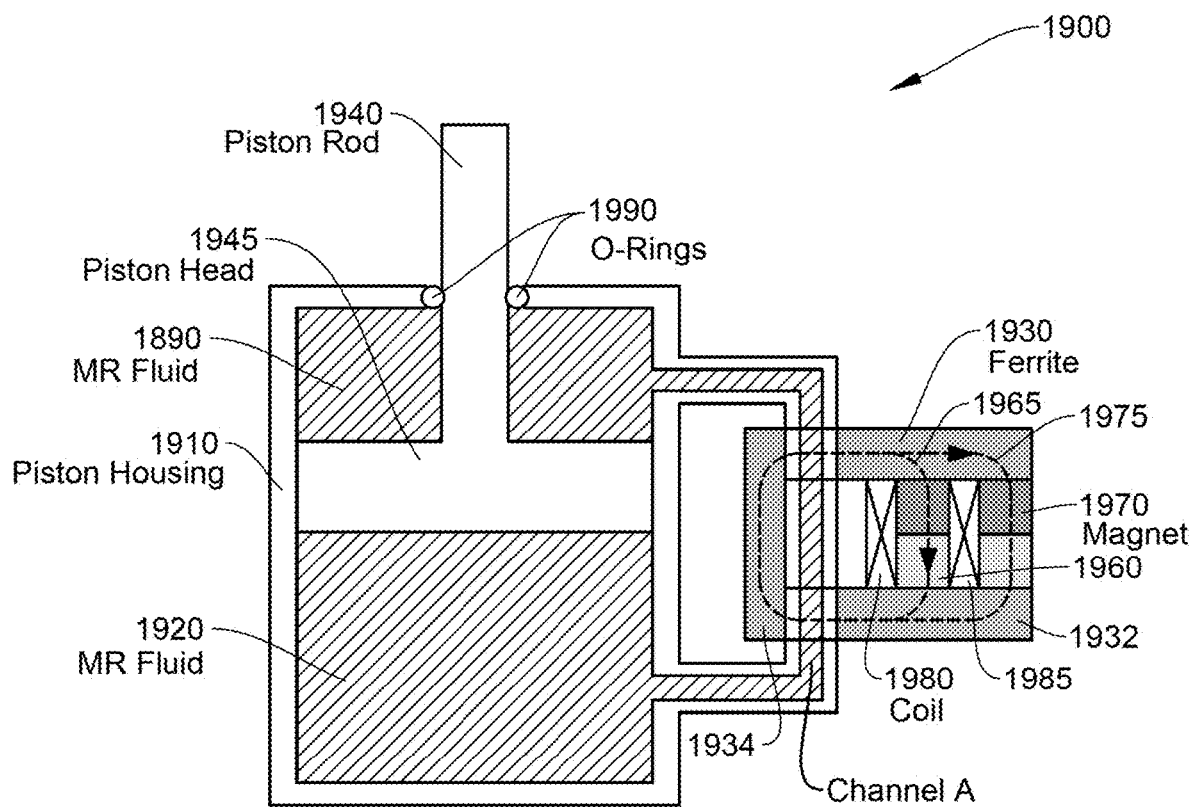
FIG. 19 shows a pedal dampening system configured to control a performance characteristic of a pedal system, according to certain embodiments.

FIG. 19 shows a pedal dampening system 1900 configured to control a performance characteristic of a pedal system, according to certain embodiments. Pedal dampening system 1900 may work similarly to pedal dampening system 1800, but the control system may be configured outside of the piston housing, which can present alternative manufacturing options, particularly with compact pedal assemblies with space limitations.

Pedal dampening system 1900 can include a piston housing 1910 with MR material contained within piston housing 1910 and sealed within via o-rings 1990. Pedal dampening system 1900 further includes a piston with a piston rod 1940 and piston head 1945 that traverses linearly along a longitudinal path within piston housing 1910. A side channel A connects a top portion of piston housing 1910 to a bottom portion of piston housing 1910. Side channel A provides a path for MR fluid 1920 to be displaced as piston head 1945 is moved up and down within piston housing 1910 to mitigate any resistance to movement of piston head 1945 due to a compression of MR fluid 1920, as would be appreciated by one of ordinary skill in the art with the benefit of this disclosure. An EPM assembly is configured off to the side of piston housing 1910 and along channel A. The EPM assembly includes two magnets 1960, 1970 with corresponding coils 1980, 1985, respectively. The electrical circuit and controlling processor(s) (e.g., one or more processors 210, 302, etc.—not shown) control a current through coils 1980, 1985 to set the magnetic fields generated by magnets 1960 (magnetic field 1965) and 1970 (magnetic field 1975). Piston head 1945 also includes ferrite sections 1930, 1932, configured on the poles of magnets 1960, 1970 and ferrite section 1934 configured on an opposite side of channel A. The ferrite sections can be configured to conduct the magnetic fields of magnets 1960, 1970. When pedal dampening system 1900 is in an "unlocked" position (now shown), the MR material has a low viscosity (e.g., not exposed to a magnetic field), MR material 1920 can be displaced through channel A with minimal resistance as piston head 1945 moves within piston housing 1910. When pedal dampening system 1900 is in a "locked" position (as shown), MR material 1920 has a high viscosity (e.g., exposed to a magnetic field) and cannot be displaced through channels A, or displacement may be subject to a high resistance that can define the resistance profile of the pedal assembly. More specifically, pedal dampening system 1900 is in a "locked" configuration when the EPM assembly is configured such that magnets 1960, 1970 have the same polarities, which causes their corresponding magnetic fields 1965, 1975 to be conducted away from each other and through a circuit that passes through MR material 1920. For instance, magnetic field 1965 passes from the north pole of magnet 1960, through ferrite section 1932, through channel A of MR material 1920, through ferrite section 1934, again through channel A of MR material 1920, through ferrite section 1930 and to the south pole of magnet 1960, as shown. In a similar manner, magnetic field 1975 passes from the north pole of magnet 1970, through ferrite section 1940, through channel A of MR material 1920, through ferrite section 1934, again through channel A of MR material 1920, through ferrite section 1930 and to the south pole of magnet 1970. Magnetic fields 1965, 1975 each pass through some of MR material 1920 in channel A, which causes MR material 1920 (at least in the areas where the magnetic fields pass through it) to increase in viscosity, which resists movement of piston head 1945 through piston housing 1910, thereby generating a resistance profile. The magnitude and polarity of the magnetic fields can be adjusted in real-time to change the resistance profile that can be based on software inputs (e.g., in-game events that trigger changes in a pedal resistance), positional data (e.g., changing the resistance profile based on a position of piston head 1945 within piston housing 1910, or other basis, and in any combination thereof. More or fewer magnets and corresponding magnetic fields may be used. Any resistance profile and its corresponding strength of resistance can be set in any manner, as would be appreciated by one of ordinary skill in the art with the benefit of this disclosure.

Additional Examples of EPM Combined with MR Material

The various embodiments described above show how and EPM and MR material can be used control, for instance, one degree of freedom of movement in a linear or rotational fashion. Some examples are provided below to present some of the myriad ways the novel techniques described herein can be applied in many different applications. The following embodiments are merely examples and are in no way exhaustive in the application of the implementation of and EPM with MR materials, and one of ordinary skill in the art with the benefit of this disclosure would appreciate the many modifications, variations, and alternative embodiments thereof.

FIG. 20A shows a computer mouse 2000 configured to be tilted on an underlying platform, according to certain embodiments. Computer mouse 2000 can operate similarly as the embodiments described in more detail in U.S. Pat. No. 10,365,730, filed on Jun. 9, 2017, and titled "Input Device with Trackball, which is hereby incorporated by reference in its entirety for all purposes, but for the inclusion of an EPM assembly and MR material as described herein. Computer mouse 2000 can be tilted along a track 2010 with an EPM assembly 2020 coupled thereto. In some embodiments, the EPM assembly may be coupled to MR material that resists movement of computer mouse 2000 along track 2010. The amount that MR material resists the movement can be based on the viscosity of the MR material. In the left image, computer mouse 2000 is shown to be tilted in a first position and in a "locked" state, where the EPM assembly generates a magnetic field that is applied to the MR material that locks or strongly resists movement of computer mouse 2000 along track 2010. In the center image, computer mouse 2000 is shown to be tilted in the first position and in an "unlocked" state, where the EPM assembly does not generate a magnetic field (or routes it away from the MR material), resulting in the MR material having a low viscosity, allowing computer mouse 2000 to freely tilt along track 2010. In the right image, computer mouse 2000 is shown to be tilted in a second position and in a "locked" state, where the EPM assembly (e.g., a magnet and magnetizing assembly) generates a magnetic field that is applied to the MR material that locks or strongly resists movement of computer mouse 2000 along track 2010. In some cases, the track can be linear, substantially linear, curved, etc., as would be appreciated by one of ordinary skill in the art with the benefit of this disclosure. FIG. 20B shows a computer mouse 2050 configured to be tilted on an underlying platform along a track 2060 with an EPM assembly 2070 configured to control a locked and unlocked state of computer mouse 2050 in a similar manner as described above with respect to FIG. 20B, but along a different track.

Figure 21:
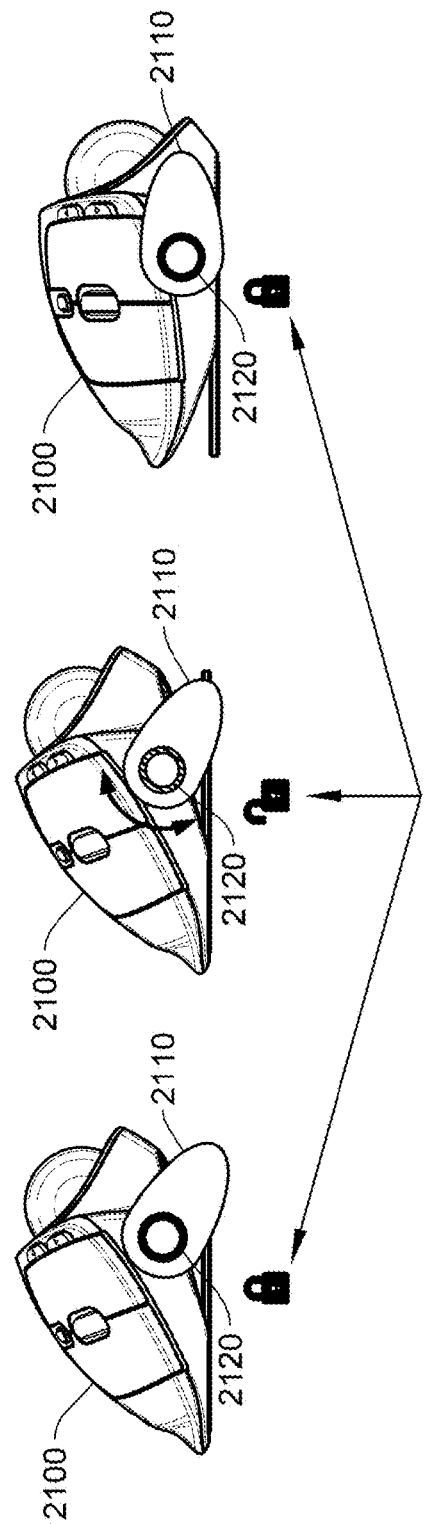
FIG. 21 shows a computer mouse configured to be tilted with respect to an underlying platform, according to certain embodiments.

FIG. 21 shows a computer mouse 2100 configured to be tilted with respect to an underlying platform, according to certain embodiments. Computer mouse 2100 differs from computer mice 2000, 2050 in the implementation of the tilting mechanism. Instead of moving along a linear track, computer mouse 2100 includes an oblong cam 2110 that rotates on an axis and provides a different tilt angle for computer mouse 2100 based on the position that cam 2110 is locked in. An EPM assembly 2120 uses a permanent magnet and magnetizing assembly with MR material to control rotation along the axis. When EPM assembly 2120 applies a magnetic field to the MR material, the MR material provides a resistance to rotation based on the viscosity of the MR material. In the left image, cam 2110 is locked by the EPM assembly 2120 so that computer mouse 2100 is locked in a first position. In the right image, cam 2110 is locked by the EPM assembly 2120 so that computer mouse 1200 is locked in a second position. In the center image, EPM assembly 2120 unlocks cam 2110 to freely rotate to set the computer mouse in any suitable position. The various embodiments of FIGS. 20A-21 provide an improvement over existing computer mice that can be tilted in that any position along the linear track or rotational axis can be locked into place using a EPM assembly and MR material, as described in the various embodiments above. One of ordinary skill in the art with the benefit of this disclosure would appreciate the many modifications, variations, and alternative embodiments thereof.

Figure 22:
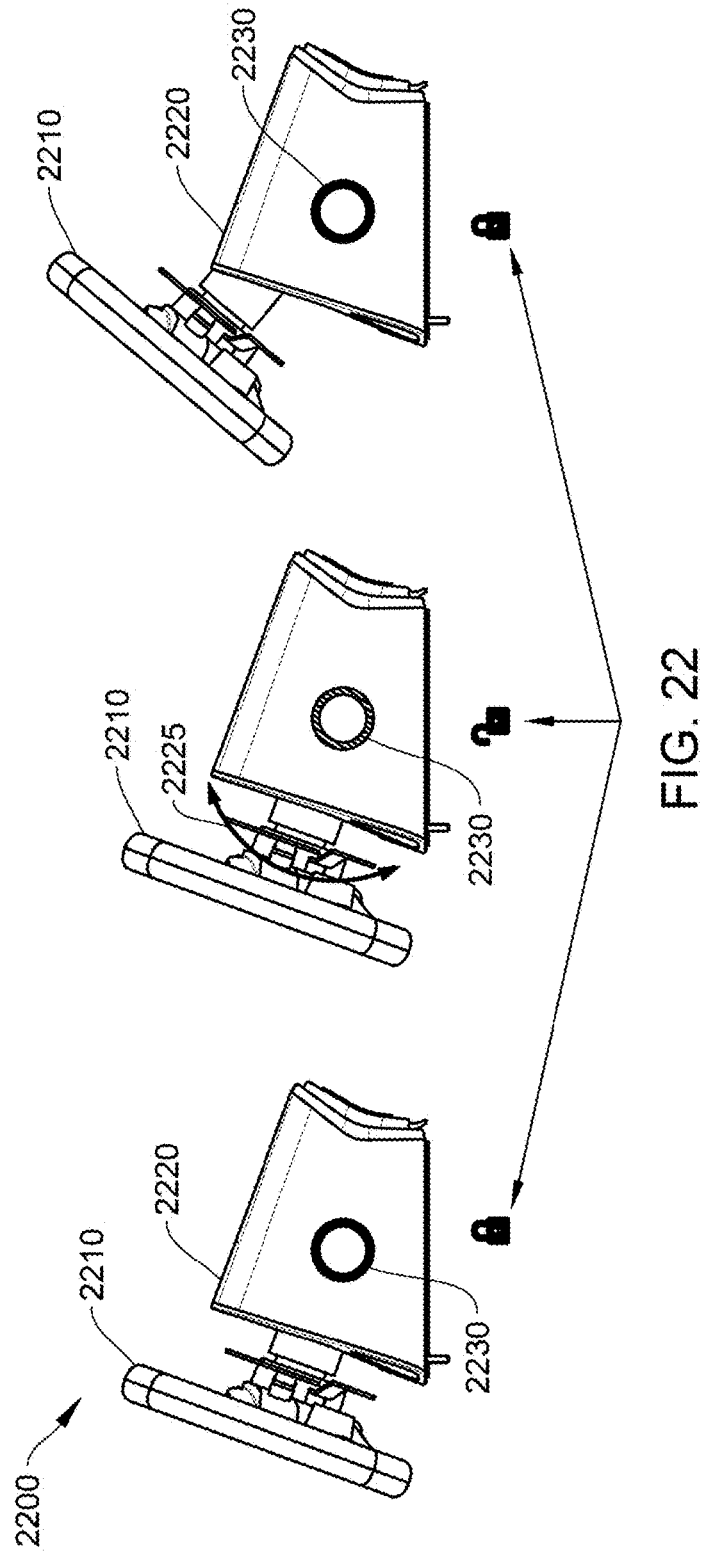
FIG. 22 shows a gaming wheel assembly, according to certain embodiments.

FIG. 22 shows a gaming wheel assembly 2200, according to certain embodiments. Gaming wheel assembly 2200 can include a wheel 2210, base 2220, and EPM assembly 2230, which may include one or more magnets, a magnetizing assembly, and MR material. The wheel 2210 can be tilted relative to base 2220 along an axis of rotation 2225. EPM assembly 2230 can be configured at the axis of rotation to lock and unlock wheel tilting by applying a magnetic field to MR material that is configured to provide a resistance to the wheel tilting based on the intensity of the magnetic field and corresponding viscosity of the MR material, as described in the various embodiments above. One of ordinary skill in the art with the benefit of this disclosure would appreciate the many modifications, variations, and alternative embodiments thereof.

Figure 23:
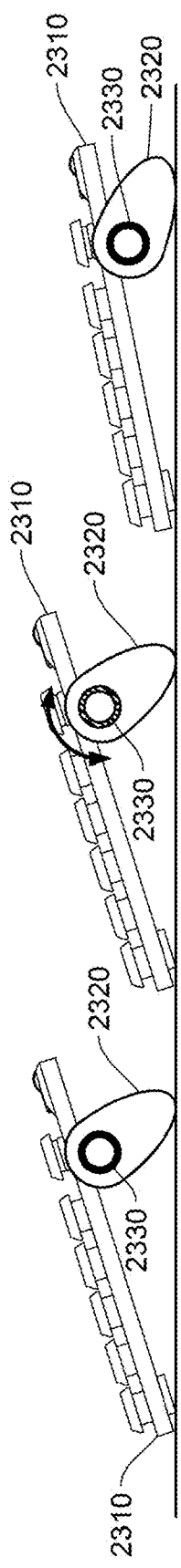
FIG. 23 shows a keyboard system, according to certain embodiments.

FIG. 23 shows a keyboard system 2300, according to certain embodiments. Keyboard system 2300 includes a keyboard 2310, a rotatable cam 2320 that can rotate on an axis, and an EPM assembly 2330. An EPM assembly 2330 uses a permanent magnet and magnetizing assembly with MR material (e.g., coupled to the keyboard at the axis of rotation) to control the rotation of cam 2320 along the axis of rotation. When EPM assembly 2330 applies a magnetic field to the MR material, the MR material provides a resistance to rotation based on the viscosity of the MR material. In the left image, cam 2320 is locked by the EPM assembly 2330 so that keyboard system 2300 is locked in a first position. In the center image, the EPM assembly 2330 removes or reroutes the magnetic field away from the MR material such that cam 2330 is freely rotatable along the axis of rotation, as shown. In this state, keyboard 2320 can be moved to any suitable tilt angle based on the position of cam 2320. In the right image, cam 2320 is locked again by EPM assembly 2330 and keyboard 2310 remains locked at that tilt angle. Thus, the performance characteristic (e.g., rotation of cam 2320 along an axis of rotation) is allows a user to set the keyboard 2310 at any desired height. Some embodiments may employ a linear telescoping support structure(s) that can be controlled by an EPM assembly and MR material in a similar manner as described in the embodiments above. One of ordinary skill in the art with the benefit of this disclosure would appreciate the many modifications, variations, and alternative embodiments thereof.

Figure 24:
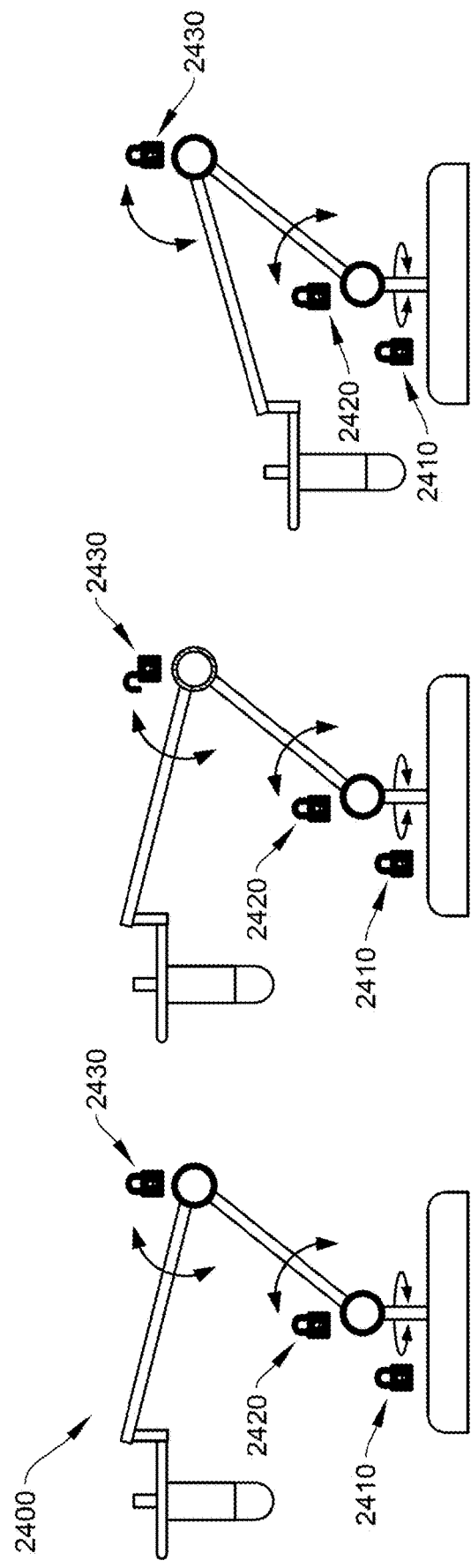
FIG. 24 shows a microphone stand, according to certain embodiments.

FIG. 24 shows a microphone stand 2400, according to certain embodiments. Microphone stand 2400 can be manipulated in a number of different configurations along different axes of rotation along rotational joints 2410, 2420, and 2430. There can be an EPM assembly configured at each rotational joint. For example, in some embodiments, the rotation joint may incorporate some or all features of FIG. 9, as would be appreciated by one of ordinary skill in the art with the benefit of this disclosure. In some embodiments, the rotation joints 2410-2430 may be coupled to MR material that provides a resistance to rotation based on the viscosity of the MR material. In some embodiments, a magnetizing assembly may be included at each rotation joint to independently control the rotation of each rotation joint separately. In some aspects, a single controlling entity (e.g., processors 210, 302, etc.) can be used to control the performance characteristics (resistance applied to MR material at each rotation joint) of microphone stand 2400. One of ordinary skill in the art with the benefit of this disclosure would appreciate the many modifications, variations, and alternative embodiments thereof.

In some embodiments, an EPM assembly and MR can be combined for an improved button on a computer mouse. Similar to the examples described above (see, e.g., FIGS. 10-16), a button (also referred to as an input element, depressible element, key plate, etc., as noted above) on a computer mouse (e.g., left/right click, side buttons, etc.) can change a click profile for static control (e.g., set button to a static profile—no movement, preset resistance, etc.) or dynamic control (e.g., the profile changes as the button is pressed, as shown in FIGS. 14A-14C. There are many ways to implement a button on a computer mouse in the manner described above including embodiments that use a membrane structure to provide a resistance to button displacement and a haptic feedback, like the embodiments of FIG. 25A-25B, and linear motion key implementations, which can be functionally similar to the key implementations of FIGS. 10-16, and is described below with respect to FIGS. 26A-26B. Other implementations are possible and one of ordinary skill in the art with the benefit of this disclosure would appreciate the many modifications, variations, and alternative embodiments thereof.

Figure 25A:
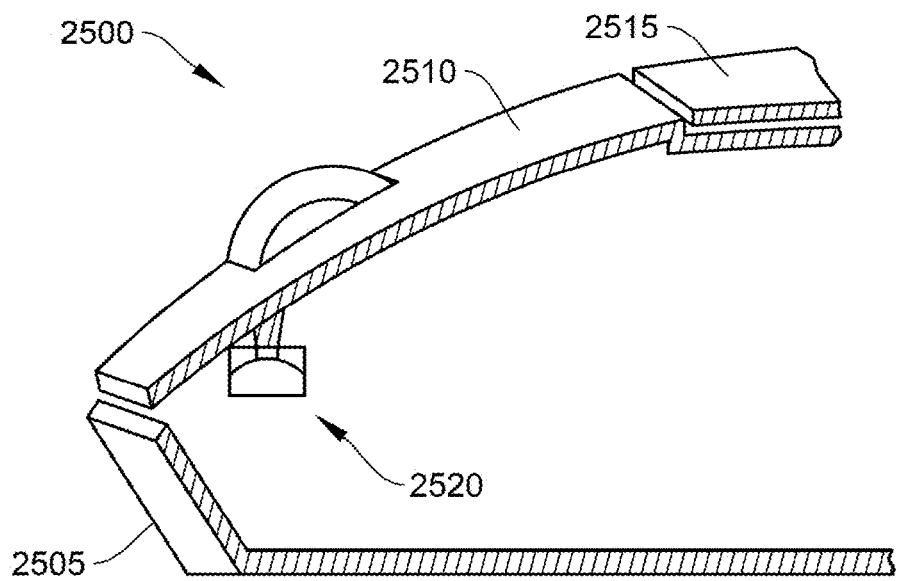
FIG. 25A shows an example of a cross section of an input element architecture on a computer mouse that combines EPM and MR for improved performance characteristics, according to certain embodiments.

FIG. 25A shows an example of a cross section of an input element architecture on a computer mouse 2500 that combines EPM and MR for improved performance characteristics, according to certain embodiments. This implementation is membrane based where MR material (e.g., fluid) can be utilized to adjust the "click" resistance of the input element. The collapsing or buckling of the membrane provides a haptic feedback associated with the click. Computer mouse 2500 can include a frame 2505, an depressible input element 2510 (e.g., left main button), and upper frame 2515. Frame 2505 and upper frame 2515 may couple together in a clam shell arrangement, as would be appreciated by one of ordinary skill in the art with the benefit of this disclosure. An EPM/MR structure 2520 can be coupled to input element 2510 to provide the resistance profile to input element 2510 as it is depressed (e.g., "clicked"), as further described below with respect to FIG. 25B.

Figure 25B:
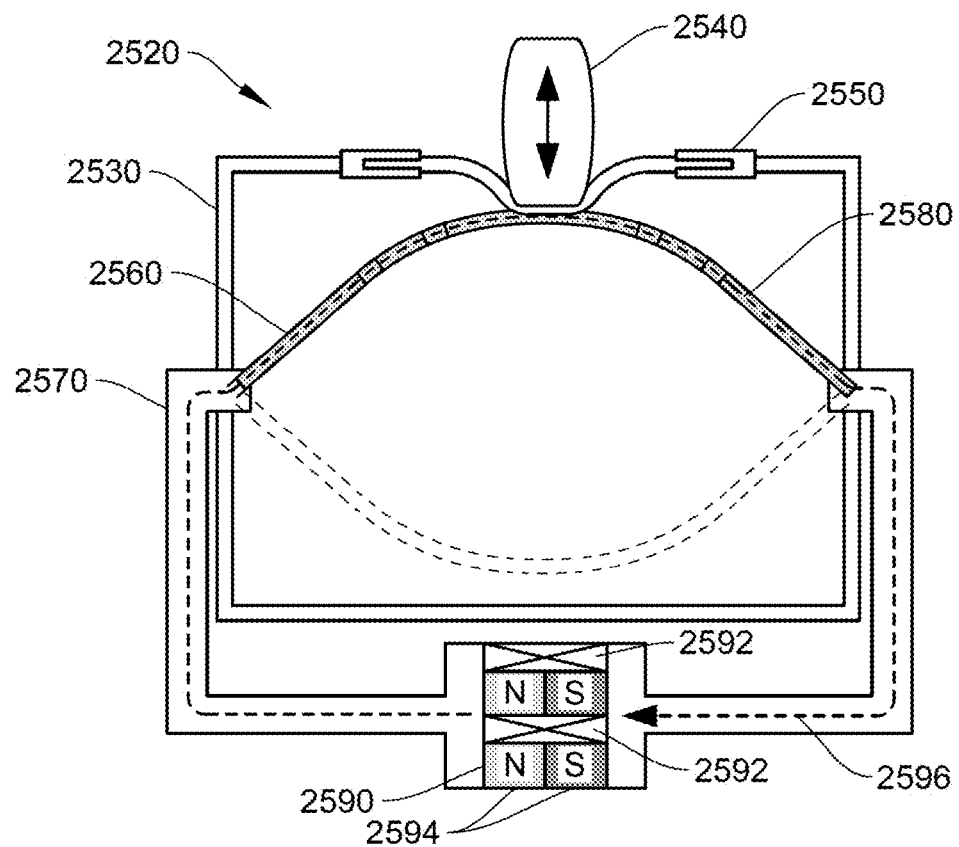
FIG. 25B shows a cross-sectional view of an input element architecture on a computer mouse that combines EPM and MR for improved performance characteristics, according to certain embodiments.

FIG. 25B shows a cross-sectional view of an input element architecture (EPM/MR structure 2520) on a computer mouse that combines EPM and MR for improved performance characteristics, according to certain embodiments. EPM/MR structure 2520 can include a casing 2530, an actuator 2540, a flexible membrane 2550, a ferrous membrane 2560 ("collapsible membrane"), a main casing 2570, MR fluid 2580, and an EPM/MR assembly 2590 with coils 2592 and magnets 2594 that produce a magnetic field 2596. Actuator 2540 can be coupled to the bottom side of depressible element 2510 and may traverse along a path (e.g., up/down) as the depressible element is depressed, as would be appreciated by one of ordinary skill in the art with the benefit of this disclosure. It should be appreciated that although many embodiments describe a linear traversal of certain features (e.g., actuator 2540), there may be some movement in other dimensions, such that an up/down movement (z-movement) of an actuator may also have some movement in other directions, such as x and y. Such considerations are not addressed in detail here as they obfuscate the novel embodiments described herein with details that would be appreciated by one of ordinary skill in the art with the benefit of this disclosure. Casing 2530 can be comprised of plastic, rubber, or other suitable material and may include flexible membrane 2550 (e.g., plastic, rubber, etc.) that is configured under actuator 2540 and may be coupled with actuator 2540 when depressible element 2510 and corresponding actuator 2540 are depressed, as shown in FIG. 25.

As depressible element 2510 is depressed, actuator 2540 pushes on flexible membrane 2550, which further pushes on ferrous membrane 2560, which provides resistance to the actuator from further traversing along the travel path within the housing. Collapsible membrane 2560 is configured to collapse and provide a haptic feedback in response to receiving a threshold force from actuator 2540. MR fluid 2580 can be configured inside of collapsible membrane 2560 and the viscosity of MR fluid 2580 can control the amount of resistance to buckling that collapsible membrane 2560 has in response to a force provided by actuator 2540. EPM/MR assembly 2590 can be controlled by one or more processors (not shown) that may cause coils 2592 to generate a current pulse that can cause magnets 2594 to generate a magnetic field 2596 with a particular polarity and intensity, as described in the many embodiments through this disclosure. Thus, when magnets 2494 are configured to have opposing poles, as shown in FIG. 25B, the magnetic field 2596 is conducted from a first magnetic pole through main casing 2570 (e.g., comprised of ferrite), through ferrous membrane 2560 that is filled, as least in part, with MR fluid 2580, through the opposite side of main casing 2570, and back to magnets 2494 at their second magnetic pole. In this configuration, the MR material is subject to a magnetic field and the resistance already provided by the mechanical integrity of the collapsible membrane 2560 is supplemented with additional resistance from the changing viscosity of the MR fluid. In some cases where the magnetic field intensity is sufficiently high, collapsible membrane 2560 may provide significant resistance to buckling such that a user may be unable to depress the button (e.g., when the user is operating the computer mouse in a typical manner and providing typical forces to button 2510). In cases where the magnets are not opposing (not shown, but similar to FIG. 12, left image), the magnetic field is contained with the EPM assembly 2590 and the collapsible membrane buckles as usual based on its own mechanical resistance and not subject to additional substantial resistance provided by the MR material. In some aspects, the viscosity and corresponding resistance provided by the MR material can be dynamically changed even during mid-depression to create a particular resistance profile, as would be appreciated by one of ordinary skill in the art with the benefit of this disclosure. In certain embodiments, a host computing device coupled to the computer mouse may operate software (e.g., a video game) that can control the EPM assembly 2590 (via one or more processors from system 200, 300, or both) to control the button press profile for button 2510 (e.g., button 2510 is not depressible when a game function associated with the particular button is not available in-game). One of ordinary skill in the art with the benefit of this disclosure would appreciate the many modifications, variations, and alternative embodiments thereof. Although FIG. 25B shows MR fluid 2580 inside collapsible membrane 2560, MR fluid may be contained throughout the entire collapsible membrane 2560, or in one or more subsections of collapsible membrane 2560. Thus, collapsible membrane 2560 may be hollow or may have hollow portions to contain the MR fluid. Alternatively or additionally, MR fluid may be contained within casing 2530 so that collapsible membrane is submerged in the MR fluid. In such cases, the magnetic field 2596 may be routed through the MR fluid through collapsible membrane 2560 or via another route, and typically via a ferrite material path. One of ordinary skill in the art with the benefit of this disclosure would appreciate the many modifications, variations, and alternative embodiments thereof.

It should be noted that while no sensing architecture is shown, any number or type of sensor can be used to detected when button 2510 is depressed, including but not limited to capacitive sensors, optical sensors, inductive sensors, Hall effect sensors, TMR (tunnel magnetoresistance sensors), galvanic contacts, etc. For example, TMR can be placed near the actuator (e.g., on the key plate) and the change in the magnetic field can be sensed when the collapsible element buckles.

By way of example, some embodiments of a computer mouse using an EPM/MR architecture can include a housing, a depressible element (e.g., a button) with a first side of the depressible element configured to be depressed by a user, an actuator coupled to a second side of the depressible element that opposes the first side where the actuator is configured to traverse along a travel path within the housing with at least one degree-of-freedom of movement when the depressible element is depressed by the user (e.g., the button moves substantially up and down), and collapsible membrane that provides a first resistance to the actuator from traversing along the travel path within the housing where the collapsible membrane is configured to collapse and provide a haptic feedback in response to receiving a threshold force from the actuator. In some aspects, the collapsible membrane is comprised of a ferrous material and includes a hollow portion. The computer mouse can include an EPM assembly coupled to the housing and may include a permanent magnet configured to generate a magnetic field and a magnetizing assembly configured to set the magnetic field generated by the permanent magnet. In some cases, MR material can be disposed within the hollow portion of the collapsible membrane. The housing can include a ferrite portion that creates a magnetic field conduction path that conducts the magnetic field from a first pole of the permanent magnet through the collapsible membrane and to a second pole of the permanent magnet. The MR material may be configured to cause the collapsible membrane to provide an additional resistance to the traversal of the actuator along the travel path within the housing, the additional resistance based on the magnetic field passing through the MR material in the hollow portion of the collapsible membrane that affects a viscosity of the MR material. In some embodiments, the magnetizing assembly is configured to set an intensity of the magnetic field of the permanent magnet, and the viscosity of the MR material is further based on the intensity of the magnetic field.

The computer mouse can further include one or more processors configured to cause the depressible element to operate according to at least two modes of operation including a first mode of operation wherein the magnetic field of the permanent magnet is set to cause the viscosity of the MR material within the hollow portion of the collapsible membrane to change to a first viscosity that provides a first additional resistance to the traversal of the actuator along the travel path within the housing, and a second mode of operation wherein the magnetic field of the permanent magnet is set to cause the viscosity of the MR material within the hollow portion of the collapsible membrane to change to a second viscosity that provides a second additional resistance to the linear traversal of the actuator along the travel path within the housing, the second additional resistance being greater than the first additional resistance. In further embodiments, the computer mouse can include a switch coupled to the one or more processors, the switch being configured to generate a control signal in response to being activated, wherein the switch is activated when the collapsible membrane collapses. The depressible element can be a left or right mouse button on the computer mouse, or any suitable input element.

Figure 26A:
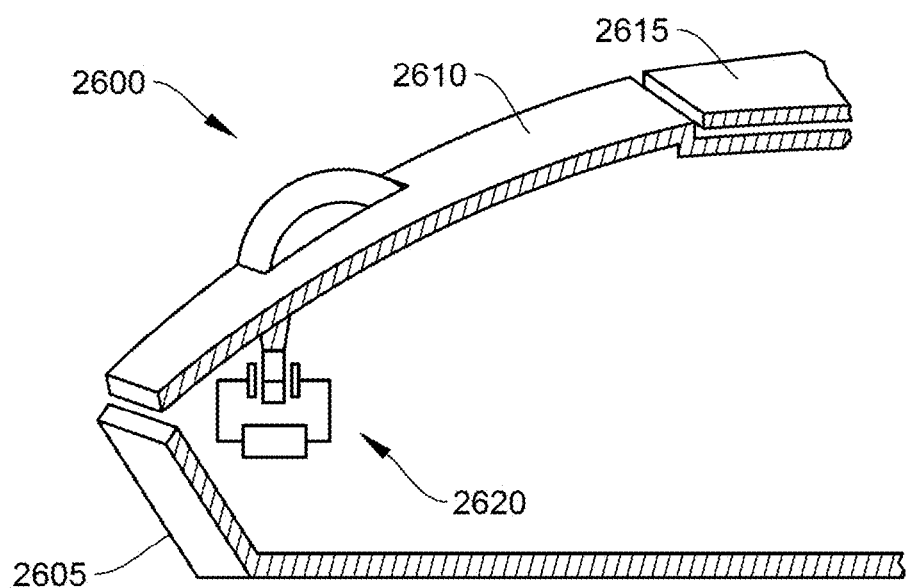
FIG. 26A shows an example of an input element architecture on a computer mouse that combines EPM and MR for improved performance characteristics, according to certain embodiments.
Figure 26B:
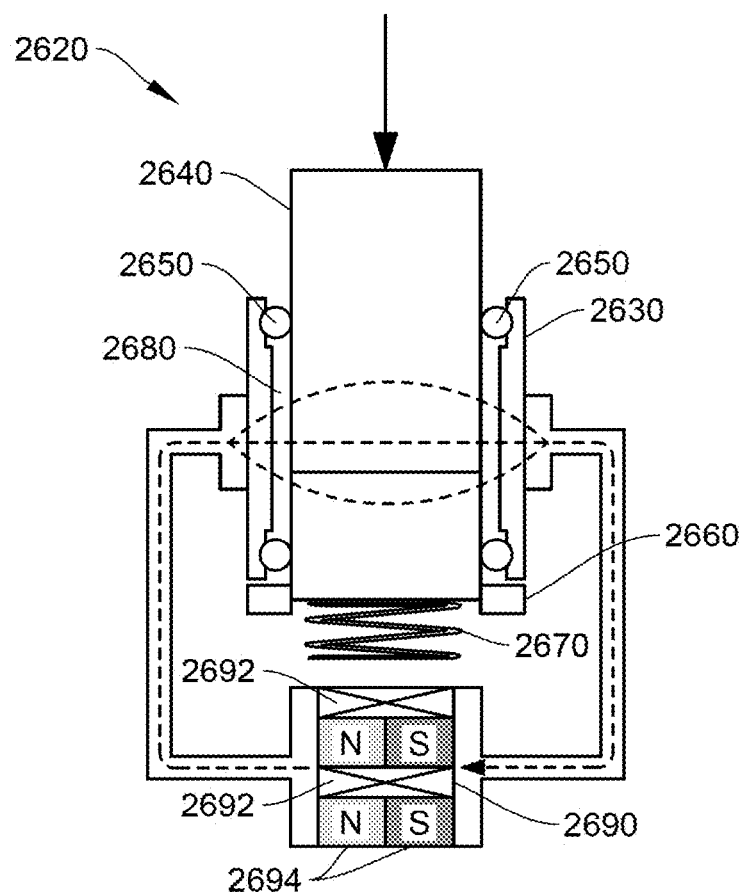
FIG. 26B shows a cross-sectional view of an input element architecture (EPM/MR structure 2620) on a computer mouse that combines EPM and MR for improved performance characteristics, according to certain embodiments.

In further embodiments, a computer mouse button can use a linear motion, key-based approach, as described above at least with respect to FIGS. 10-16 regarding EPM/MR-based keys of a keyboard, as shown in FIGS. 26A-26B. Similar to FIGS. 25A-25B, a single EPM assembly can be used for one button (e.g., left button), both buttons (e.g., left and right buttons), or even additional buttons/elements utilizing MR material (e.g., FIGS. 30A-32C). Also, although FIGS. 26A-26B show galvanic contacts for sensing a button press, other sensing implementations are possible, as noted above with respect to FIGS. 25A-25B.

FIG. 26A shows an example of an input element architecture on a computer mouse 2600 that combines EPM and MR for improved performance characteristics, according to certain embodiments. Computer mouse 2600 includes frame 2605, an depressible input element 2610 (e.g., left main button), and upper frame 2615. Frame 2605 and upper frame 2615 may couple together in a clam shell arrangement, as would be appreciated by one of ordinary skill in the art with the benefit of this disclosure. An EPM/MR structure 2620 can be coupled to input element 2510 to provide the resistance profile to input element 2610 as it is depressed (e.g., "clicked"), as further described below with respect to FIG. 26B.

FIG. 26B shows a cross-sectional view of an input element architecture (EPM/MR structure 2620) on a computer mouse that combines EPM and MR for improved performance characteristics, according to certain embodiments. EPM/MR structure 2620 includes casing 2630 (e.g., plastic, rubber, etc.), actuator 2640, o-rings 2650, galvanic contact 2660, biasing mechanism 2670, MR fluid 2680, and an EPM assembly 2690 with coils 2692 and magnets 2694 that generate a magnetic field 2696. FIGS. 26A and 26B may operate in a similar manner as described above with respect to FIG. 12, as would be appreciated by one of ordinary skill in the art with the benefit of this disclosure.

Figure 27:
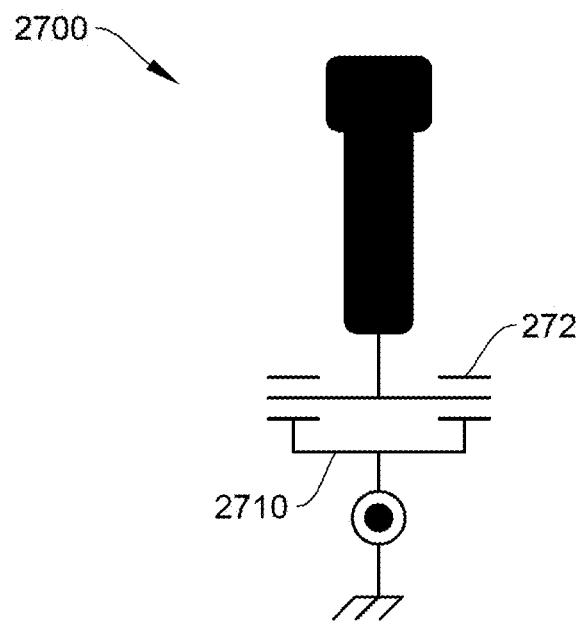
FIG. 27 shows a simplified image of a shifter and gimbal structure that incorporates EPM and MR for improved performance characteristics, according to certain embodiments.

FIG. 27 shows a simplified image of a gimbal/shifter system 2700 that incorporates EPM and MR for improved performance characteristics, according to certain embodiments. Gimbal/shifter system 2700 shows how a ball-type joint can be implemented using two hinge joints. For instance, a first hinge joint 2710 can provide a range of motion along a first axis (e.g., a x-axis) and a second hinge joint 2720 can provide a range of motion along a second axis (e.g., a y-axis). Typically, the first and second axes are normal to each other and may or may not be coplanar. Embodiments such as those in FIGS. 9A-9C can be used to provide such hinge joints and create the overall gimbal structure, as would be appreciated by one of ordinary skill in the art with the benefit of this disclosure.

Figure 28:
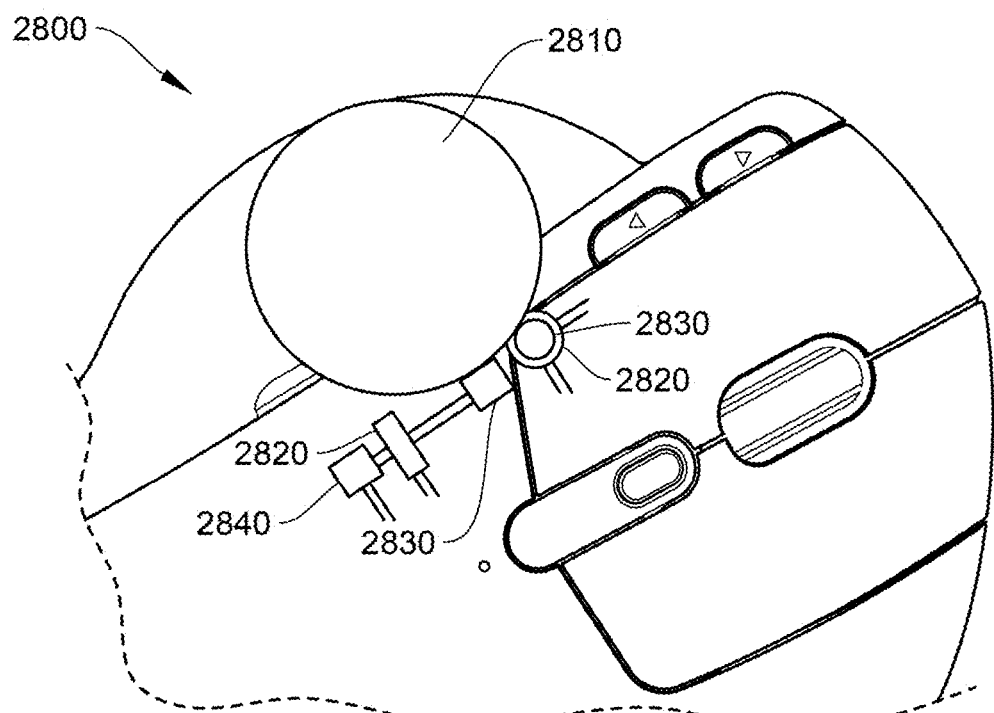
FIG. 28 shows an input device with a trackball that incorporates EPM and MR for improved performance characteristics, according to certain embodiments.

FIG. 28 shows an input device 2800 with a trackball that incorporates EPM and MR for improved performance characteristics, according to certain embodiments. Input device 2800 includes trackball 2810, magnetorheological bearings 2820, high-friction cylinders 2830, and position encoder 2840, among other various input elements (e.g., left/right button, scroll wheel, etc.), output elements (e.g., LEDs), and structural elements (e.g., input device housing, etc.). In some embodiments, two roller systems can be used for tracking movement of the trackball 2810 in two axes of rotation (one is shown). In operation, a first roller system (bearings 2820) is pushed against trackball 2810 and applies a "braking" force using an EPM with MR assembly, as described above. In a second independent roller system (not shown), a second roller system is pushed against trackball 2810. Each can track a different axis of rotation (e.g., X and Y axis, each normal to each other) using their corresponding position encoder, as would be appreciated by one of ordinary skill in the art with the benefit of this disclosure. In some embodiments, the EPM assembly can apply short current pulses to give a "ratchet" feedback as the ball moves, similar to the "bump" feedback described above with respect to FIG. 13.

Input Device Shape Adjustments and Shape Shifting

Many of the embodiments described above utilize an EPM assembly and MR fluid to control various input elements (e.g., keys, buttons, pedals, clutches, shifters, joints, support structures, and the like). In some aspects, an EPM assembly and MR fluid can be used to customize a surface of an electronic device (e.g., input device), which may improve the ergonomic interface between a user and the electronic device. For example, a palm rest on a computer mouse may be adjustable to conform to a user's preference by using MR material to set an orientation or contour of the palm rest. In some implementations, the palm rest may include a number of "zones" also referred to as "submodules" that each have a top surface that forms at least a part of the palm rest surface contour, as shown in FIG. 29A. The submodules may operate similar to a key structure or a multi-key structure, as described above with respect to FIGS. 10-16, and as shown in FIG. 29B. In some cases, the palm rest may be a singular plate as opposed to a plurality of submodules. For instance, the plate may be supported by a plurality of submodules configured underneath, such that the palm rest may be configured in a preferred orientations, as shown and further described below with respect to FIGS. 30A-32. Although the various examples presented herein apply to computer mice, the same concept may be applied to a keyboard palm rest, headset ear cushions, chair arms, or any other suitable surface. One of ordinary skill in the art with the benefit of this disclosure would appreciate the many modifications, variations, and alternative embodiments thereof.

FIG. 29A shows a computer mouse 2900 with an adjustable palm rest 2910, according to certain embodiments. Adjustable palm rest 2910 can include a surface that includes one or more submodules 2920 with can be depressed like the key structures described above. A user may apply force to palm rest 2910 (e.g., by resting their hand on the palm rest), which can cause each of submodules 2920 to be depressed a certain amount based on the amount of force applied. Different portions of the user's palm are likely to apply different amounts of force to the palm rest at different areas due the contours of the user's hand. Thus, in certain embodiments, once the submodules conform to a user's hand (when the MR fluid has a low viscosity and like little to no magnetic field passing through it), the user can then cause the EPM assembly to apply a magnetic field to the submodules 2910 to lock them in place, thus preserving the palm rest contour to the user's preference.

FIG. 29B shows a simplified cross-sectional view of a computer mouse 2900 with a plurality of EPM/MR controlled submodules 2920, according to certain embodiments. The submodules may operate similar to a key structure or a multi-key structure, as described above with respect to FIGS. 10-16, as would be appreciated by one of ordinary skill in the art with the benefit of this disclosure. In operation, each individual submodule can be spring-loaded and may be "unlocked" when the polarization of the magnets are such that the magnetic field generated by the EPM assembly magnets create a magnetic field circuit path that closes in on itself, as shown in the top image of FIG. 29B. When the polarization of the magnets oppose each other, the magnetic field may be routed through each submodule (or a portion thereof) to lock the submodule in place, as shown in the bottom image of FIG. 29B. In some aspects, each submodule can be linked through a single magnetic circuit and controlled with one EPM assembly, although some embodiments may employ multiple EPM assemblies. During operation, there is typically no power consumed except during the adjustment (after the current pulse is applied to set the magnetic field of the permanent magnets). This approach can be scaled with many submodules for a highly conformable computer mouse, or few submodules (e.g., less than five) for course adjustment of the palm region of the mouse. Note that although a palm region with submodules is described, the same concept can be applied to any portion of the computer mouse, or any input device as would be appreciated by one of ordinary skill in the art with the benefit of this disclosure.

Figure 30A:
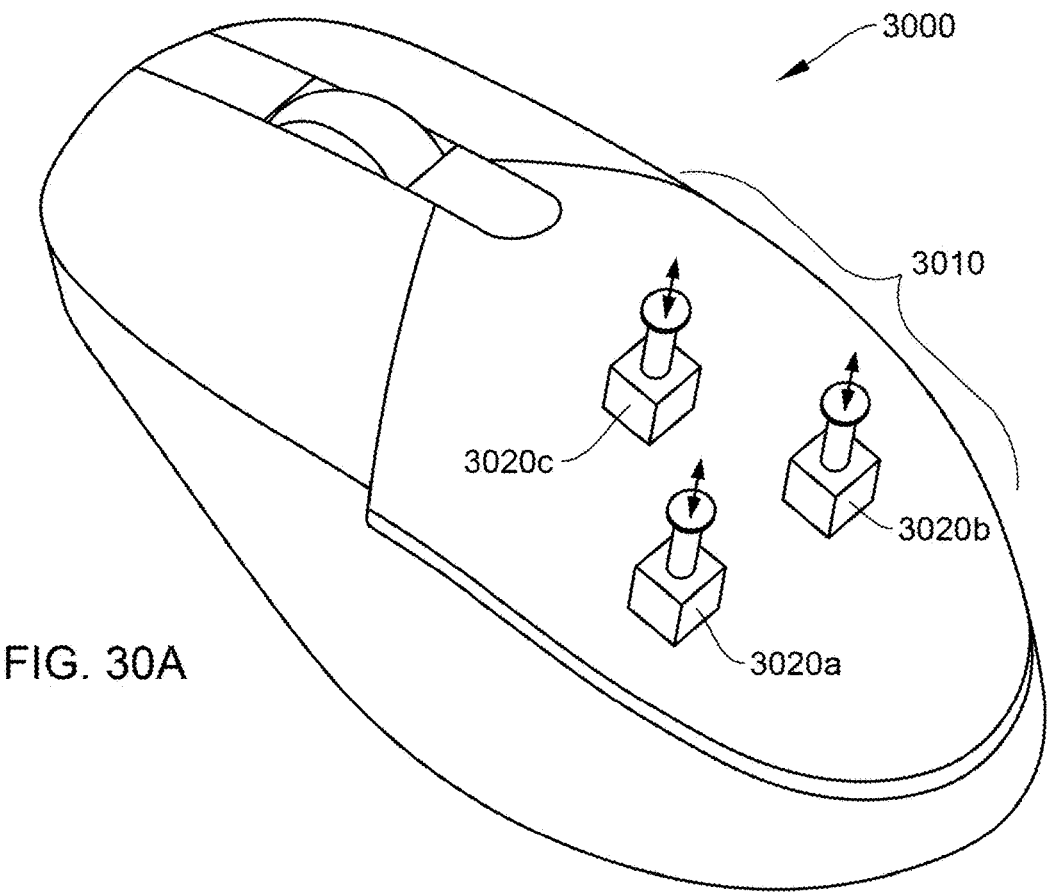
FIGS. 30A-30B show a computer mouse with a palm rest surface plate and a number of submodules disposed underneath, according to certain embodiments.
Figure 30B:
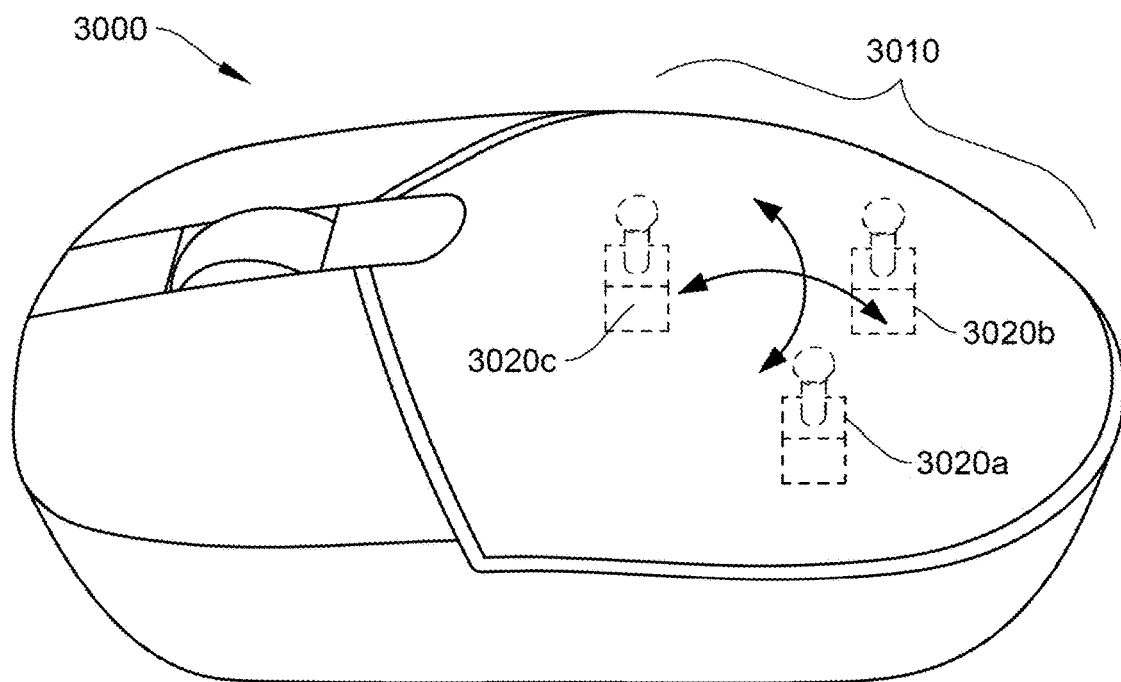
Figure 31A:
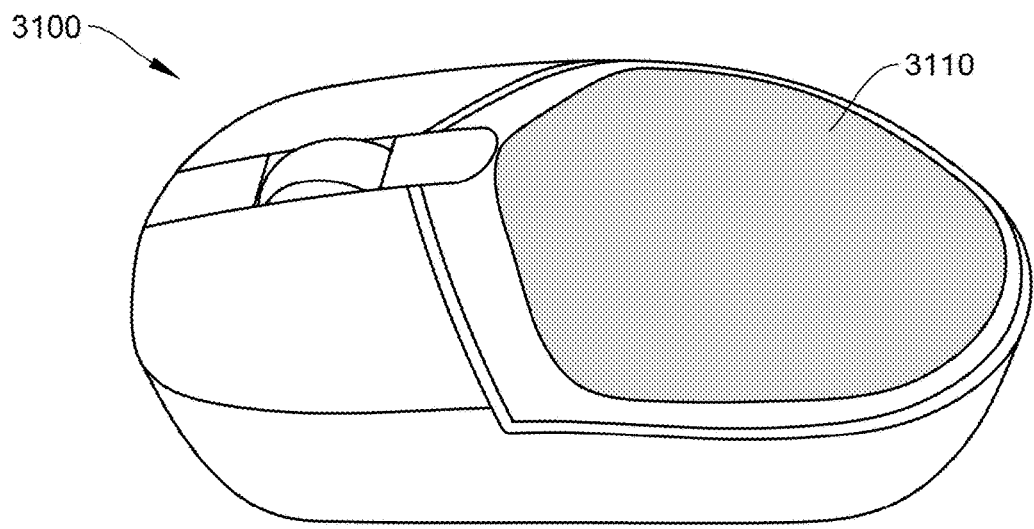
FIGS. 31A-31C show a computer mouse with a palm rest surface plate configured in a number of orientations, according to certain embodiments.
Figure 31B:
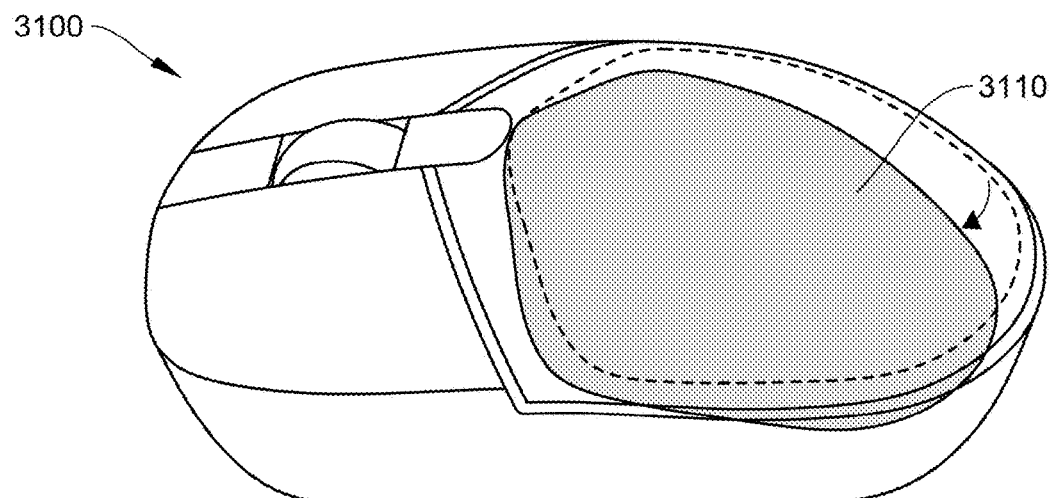
Figure 31C:
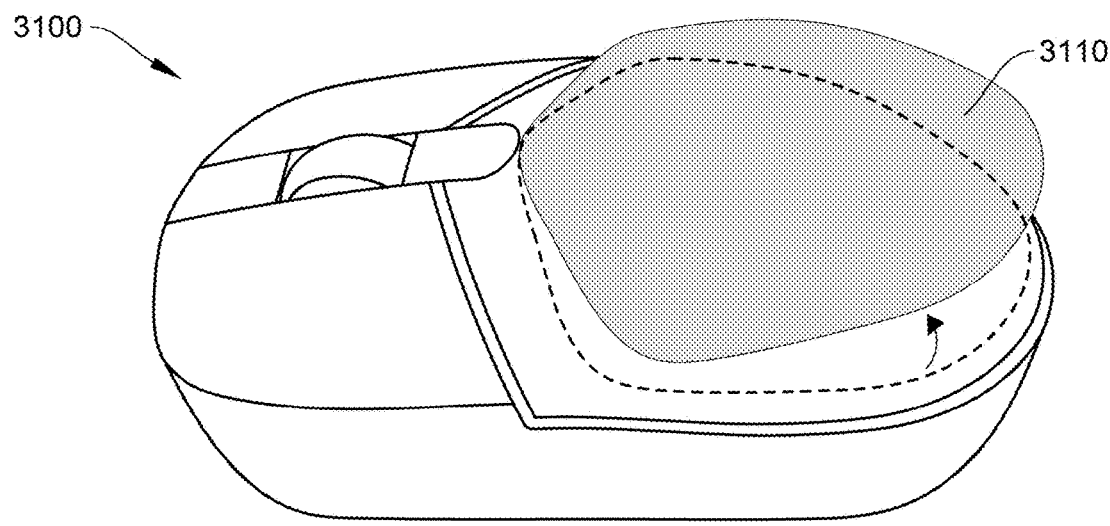

FIG. 30A shows a computer mouse 3000 with a palm rest surface plate 3010 and a number of submodules 3020a-c disposed underneath, according to certain embodiments. In this embodiment, the palm rest 3010 is a singular unit with a surface contour. Palm rest 3010 rests on a plurality of submodules 3020 (e.g., similar to submodules 3020) that support palm rest 3010. Palm rest 3010 can be adjustable in up to three degrees-of-freedom due to the movement of palm rest 3010 as a force is applied to the top of palm rest 3010 while the underlying subassemblies are depressed varying amounts based on the amount of force applied to them (e.g., while a magnetic field of sufficient intensity is passing through the submodules 3020 to allow them to be adjusted), as shown in FIG. 30B. For example, in FIG. 31A, computer mouse 3100 includes a palm rest 3110 supported by a plurality of underlying submodules (not shown), and the palm rest is in a neutral configuration. In FIG. 31B, palm rest 3110 is pushed down from the neutral position, In FIG. 31C, palm rest 3110 is moved up from the neutral position. One of ordinary skill in the art with the benefit of this disclosure would appreciate the many modifications, variations, and alternative embodiments thereof.

By way of example, in some embodiments an input device (e.g., computer mouse) can include a housing, and a palm region coupled to the housing and configured to receive a user's palm when the input device is operated by the user, where the palm region is formed, in part, by a plurality of submodules. Each of the submodules can include a frame, a plunger configured to traverse along a travel path within the frame, an EPM assembly coupled to the frame that includes a permanent magnet configured to generate a magnetic field and a magnetizing assembly configured to set the magnetic field generated by the permanent magnet, and MR material disposed within the frame and coupled to the plunger. The MR material can have a viscosity that changes based on the magnetic field, where the MR material is configured to provide a resistance to the traversal of the plunger along the travel path within the frame, the resistance based on the viscosity of the MR material. In some embodiments, the input device includes one or more processors configured to cause each of the submodules to operate according to at least two modes of operation including: a first mode of operation wherein the magnetic field of the permanent magnet is set to cause the viscosity of the MR material to change to a first viscosity that provides a first resistance to the traversal of the plunger along the travel path within the frame; and a second mode of operation wherein the magnetic field of the permanent magnet is set to cause the viscosity of the MR material to change to a second viscosity that provides a second resistance to the traversal of the plunger along the travel path within the housing, where the first resistance allows each of the submodules to traverse along the travel path in response to receiving an applied force along the travel path, and where the second resistance prevents each of the submodules from traversing along the travel path in response to receiving the applied force, the second resistance being higher than the first resistance. In some implementations, when each of the submodules are operating in the first mode of operation, the magnetic field generated by the permanent magnet does not pass through the MR material, and when each of the submodules are operating in the second mode of operation, the magnetic field generated by the permanent magnet passes through the MR material. Typically, the input device only consumes power by the EPM assembly when switching between the at least two modes of operation.

The input device can further include a cover plate coupled to the palm region, where the cover plate covers the palm region, where a first side of the cover plate forms a user-accessible surface of the palm region, and where a second side of the cover plate opposite of the first side is coupled to and supported by a top surface of each of the submodules, shown in FIGS. 30A-31C. In some cases, when each of the submodules are operating in the first mode of operation the cover plate is adjustable in at least two degrees-of-freedom, and when each of the submodules are operating in the second mode of operation the cover plate is not adjustable. The EPM assembly can be a single EPM assembly that is common to each of the plurality of submodules, or more than one EPM assembly can be used. In some aspects, the palm region can have a surface contour, and each submodule can include a top portion that forms a part of the surface contour of the palm region, as shown in FIGS. 29A-29B.

Figure 32:
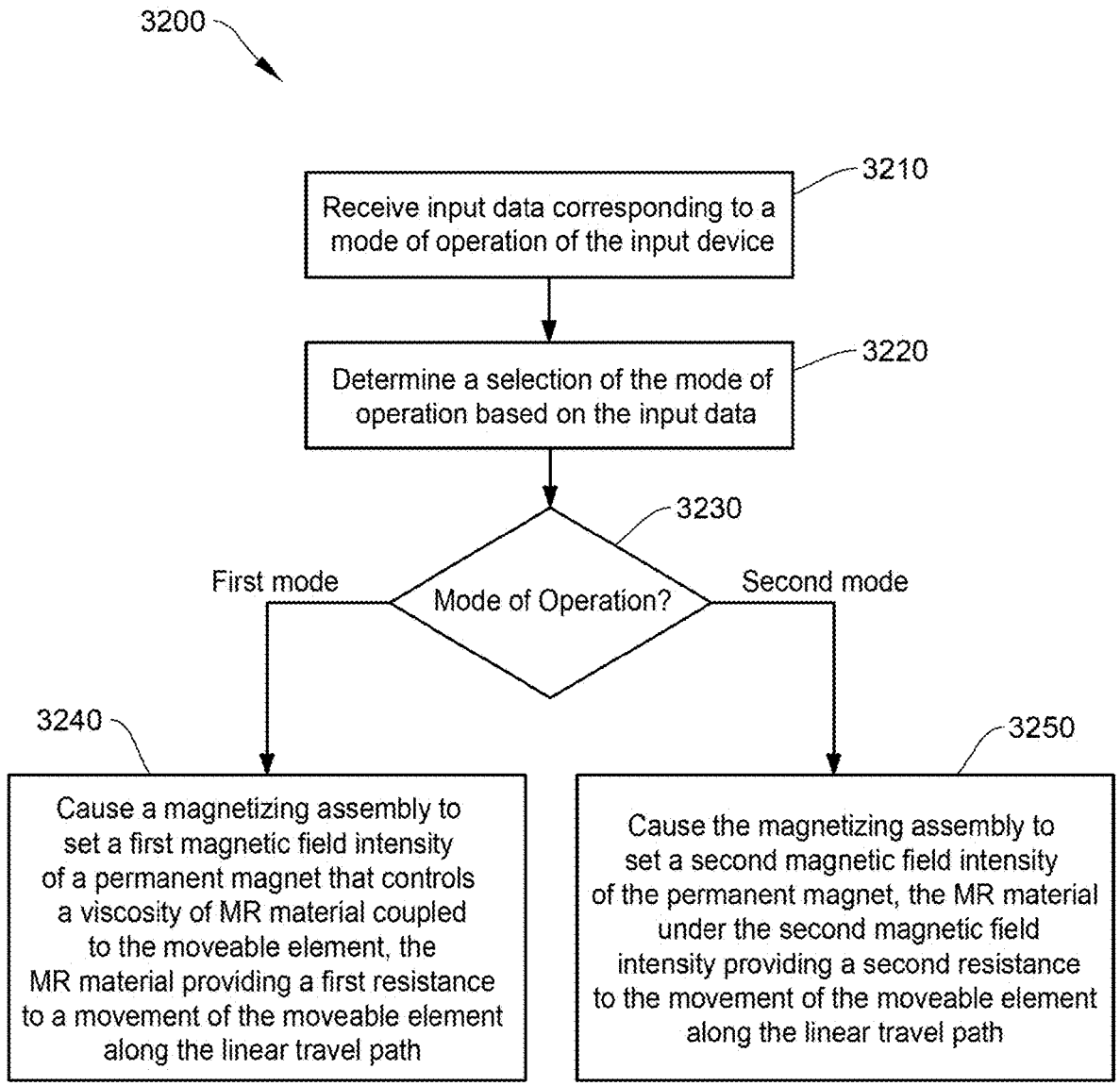
FIG. 32 is a simplified flow chart showing aspects of a method for controlling a surface contour of an input device, according to certain embodiments.

FIG. 32 is a simplified flow chart showing aspects of a method 3200 for controlling a surface contour of an input device, according to certain embodiments. Method 3200 can be performed by processing logic that may comprise hardware (e.g., circuitry, dedicated logic, etc.), software operating on appropriate hardware (such as a general purpose computing system or a dedicated machine), firmware (embedded software), or any combination thereof. In certain embodiments, method 3200 can be performed by aspects of system 200, 300, or a combination thereof.

At operation 3210, method 3200 can include receiving input data corresponding to a mode of operation of the input device, the mode of operation corresponding to a control of a surface contour of a palm region of the input device, the palm region formed, in part, by a plurality of submodules, wherein each submodule has a moveable element that is configured to traverse along a linear travel path within the frame, according to certain embodiments.

At operation 3220, method 3200 can include determining a selection of the mode of operation based on the input data, according to certain embodiments.

At operation 3230, in response to the input data corresponding to a first mode of operation, method 3200 can include causing a magnetizing assembly to set a first magnetic field intensity of a permanent magnet that controls a viscosity of MR material coupled to the moveable element, the MR material under the first magnetic field intensity providing a first resistance to a movement of the moveable element along the linear travel path, according to certain embodiments.

At operation 3240, in response to the input data corresponding to a second mode of operation, method 3200 can include causing the magnetizing assembly to set a second magnetic field intensity of the permanent magnet, the MR material under the second magnetic field intensity providing a second resistance to the movement of the moveable element along the linear travel path, according to certain embodiments. In some aspects, the second magnetic field intensity can be higher than the first magnetic field intensity or vice versa. In the first mode of operation, the MR material can have a minimum viscosity, and in the second mode of operation the MR material can have a maximum viscosity. In some aspects, the first resistance allows each of the submodules to traverse along the travel path in response to receiving an applied force along the linear travel path, and the second resistance prevents each of the submodules from traversing along the linear travel path in response to receiving the applied force, the second resistance being higher than the first resistance. In some cases, the input device includes a cover plate coupled to the palm region, where the cover plate covers the palm region, wherein a first side of the cover plate forms a user-accessible surface of the palm region, and a second side of the cover plate opposite of the first side is coupled to and supported by a top surface of each of the submodules. In certain embodiments, when each of the submodules are operating in the first mode of operation, the cover plate is adjustable in at least two degrees-of-freedom, and when each of the submodules are operating in the second mode of operation, the cover plate is not adjustable. The palm region can have a surface contour, and each submodule (or at least one submodule) can include a top portion that forms a part of the surface contour of the palm region. In some cases, the magnetizing assembly is a single magnetizing assembly that is common to each of the plurality of submodules.

It should be appreciated that the specific steps illustrated in FIG. 32 provide a particular method 3200 for controlling a surface contour of an input device, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Some embodiments may utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer mouse comprising:
 a housing;
 a depressible element, a first side of the depressible element configured to be depressed by a user;
 an actuator coupled to a second side of the depressible element that opposes the first side, the actuator configured to linearly traverse along a travel path within the housing with one degree-of-freedom of movement when the depressible element is depressed by the user;
 a collapsible membrane that provides a first resistance to the actuator from linearly traversing along the travel path within the housing, the collapsible membrane configured to collapse and provide a haptic feedback in response to receiving a threshold force from the actuator, the collapsible membrane being comprised of a ferrous material and having a hollow portion;
 an electropermanent magnet (EPM) assembly coupled to the housing, the EPM assembly including:
  a permanent magnet configured to generate a magnetic field; and
  a magnetizing assembly configured to set the magnetic field generated by the permanent magnet; and
 a magnetorheological (MR) material disposed within the hollow portion of the collapsible membrane,
 wherein the housing includes a ferrite portion that creates a magnetic field conduction path that conducts the magnetic field from a first pole of the permanent magnet through the collapsible membrane and to a second pole of the permanent magnet, and
 wherein the MR material is configured to cause the collapsible membrane to provide an additional resistance to the linear traversal of the actuator along the travel path within the housing, the additional resistance based on the magnetic field passing through the MR material in the hollow portion of the collapsible membrane that affects a viscosity of the MR material.

2. The computer mouse of claim 1 wherein the magnetizing assembly is configured to set an intensity of the magnetic field of the permanent magnet, and
 wherein the viscosity of the MR material is further based on the intensity of the magnetic field.

3. The computer mouse of claim 2 wherein the computer mouse includes one or more processors configured to cause the depressible element to operate according to at least two modes of operation including:
 a first mode of operation wherein the magnetic field of the permanent magnet is set to cause the viscosity of the MR material within the hollow portion of the collapsible membrane to change to a first viscosity that provides a first additional resistance to the linear traversal of the actuator along the travel path within the housing; and
 a second mode of operation wherein the magnetic field of the permanent magnet is set to cause the viscosity of the MR material within the hollow portion of the collapsible membrane to change to a second viscosity that provides a second additional resistance to the linear traversal of the actuator along the travel path within the housing, the second additional resistance being greater than the first additional resistance.

4. The computer mouse of claim 3 further comprising a switch coupled to the one or more processors, the switch being configured to generate a control signal in response to being activated, wherein the switch is activated when the collapsible membrane collapses.

5. The computer mouse of claim 1 wherein the depressible element is a left or right mouse button on the computer mouse.

6. An input device comprising:
 a housing;
 a palm region coupled to the housing, the palm region configured to receive a user's palm when the input device is operated by the user, the palm region formed, in part, by a plurality of submodules, wherein each submodule includes:
  a frame;
  a plunger configured to traverse along a travel path within the frame;
  an electropermanent magnet (EPM) assembly coupled to the frame, the EPM assembly including:
   a permanent magnet configured to generate a magnetic field; and
   a magnetizing assembly configured to set the magnetic field generated by the permanent magnet; and
  a magnetorheological (MR) material disposed within the frame and coupled to the plunger, the MR material having a viscosity that changes based on the magnetic field,
  wherein the MR material is configured to provide a resistance to the traversal of the plunger along the travel path within the frame, the resistance based on the viscosity of the MR material.

7. The input device of claim 6 wherein the input device includes one or more processors configured to cause each of the submodules to operate according to at least two modes of operation including:
 a first mode of operation wherein the magnetic field of the permanent magnet is set to cause the viscosity of the MR material to change to a first viscosity that provides a first resistance to the traversal of the plunger along the travel path within the frame; and
 a second mode of operation wherein the magnetic field of the permanent magnet is set to cause the viscosity of the MR material to change to a second viscosity that provides a second resistance to the traversal of the plunger along the travel path within the housing,
 wherein the first resistance allows each of the submodules to traverse along the travel path in response to receiving an applied force along the travel path, and
 wherein the second resistance prevents each of the submodules from traversing along the travel path in response to receiving the applied force, the second resistance being higher than the first resistance.

8. The input device of claim 7 wherein when each of the submodules are operating in the first mode of operation, the magnetic field generated by the permanent magnet does not pass through the MR material, and
 wherein when each of the submodules are operating in the second mode of operation, the magnetic field generated by the permanent magnet passes through the MR material.

9. The input device of claim 7 wherein the input device only consumes power by the EPM assembly when switching between the at least two modes of operation.

10. The input device of claim 8 further comprising:
 a cover plate coupled to the palm region,
 wherein the cover plate covers the palm region,
 wherein a first side of the cover plate forms a user-accessible surface of the palm region, and wherein a second side of the cover plate opposite of the first side is coupled to and supported by a top surface of each of the submodules.

11. The input device of claim 10 wherein when each of the submodules are operating in the first mode of operation the cover plate is adjustable in at least two degrees-of-freedom, and wherein when each of the submodules are operating in the second mode of operation the cover plate is not adjustable.

12. The input device of claim 6 wherein the EPM assembly is a single EPM assembly that is common to each of the plurality of submodules.

13. The input device of claim 6 wherein the palm region has a surface contour, and wherein each submodule includes a top portion that forms a part of the surface contour of the palm region.

14. A method of operating an input device, the method comprising:
receiving input data corresponding to a mode of operation of the input device, the mode of operation corresponding to a control of a surface contour of a palm region of the input device, the palm region formed, in part, by a plurality of submodules, wherein each submodule has a moveable element that is configured to traverse along a linear travel path within the frame;
determining a selection of the mode of operation based on the input data;
in response to the input data corresponding to a first mode of operation:
causing a magnetizing assembly to set a first magnetic field intensity of a permanent magnet that controls a viscosity of MR material coupled to the moveable element, the MR material under the first magnetic field intensity providing a first resistance to a movement of the moveable element along the linear travel path; and
in response to the input data corresponding to a second mode of operation:
causing the magnetizing assembly to set a second magnetic field intensity of the permanent magnet, the MR material under the second magnetic field intensity providing a second resistance to the movement of the moveable element along the linear travel path, wherein the second magnetic field intensity is higher than the first magnetic field intensity.

15. The method of claim 14 wherein in the first mode of operation the MR material has a minimum viscosity, and wherein in the second mode of operation the MR material has a maximum viscosity.

16. The method of claim 14 wherein the first resistance allows each of the submodules to traverse along the travel path in response to receiving an applied force along the linear travel path, and wherein the second resistance prevents each of the submodules from traversing along the linear travel path in response to receiving the applied force, the second resistance being higher than the first resistance.

17. The method of claim 16 wherein the input device includes a cover plate coupled to the palm region, wherein the cover plate covers the palm region, wherein a first side of the cover plate forms a user-accessible surface of the palm region, and wherein a second side of the cover plate opposite of the first side is coupled to and supported by a top surface of each of the submodules.

18. The method of claim 17 wherein when each of the submodules are operating in the first mode of operation the cover plate is adjustable in at least two degrees-of-freedom, and wherein when each of the submodules are operating in the second mode of operation the cover plate is not adjustable.

19. The method of claim 16 wherein the palm region has a surface contour, and wherein each submodule includes a top portion that forms a part of the surface contour of the palm region.

20. The method of claim 14 wherein the magnetizing assembly is a single magnetizing assembly that is common to each of the plurality of submodules.

* * * * *